United States Patent
Bao et al.

(10) Patent No.: US 9,999,068 B2
(45) Date of Patent: *Jun. 12, 2018

(54) RESOURCE SCHEDULING METHOD AND DEVICE

(71) Applicant: BEIJING NUFRONT MOBILE MULTIMEDIA TECHNOLOGY CO. LTD., Beijing (CN)

(72) Inventors: Dongshan Bao, Beijing (CN); Jing Wang, Beijing (CN); Shenfa Liu, Beijing (CN); Yongbo Zeng, Beijing (CN); Yubao Zhou, Beijing (CN); Zhigang Yan, Beijing (CN); Jun Lei, Beijing (CN); Lijun Pan, Beijing (CN); Feifei Wang, Beijing (CN)

(73) Assignee: BEIJING NUFRONT MOBILE MULTIMEDIA TECHNOLOGY CO. LTD., Beijing (CN)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/130,384

(22) Filed: Apr. 15, 2016

(65) Prior Publication Data

US 2016/0234858 A1 Aug. 11, 2016

Related U.S. Application Data

(63) Continuation of application No. 14/007,598, filed as application No. PCT/CN2012/072773 on Mar. 22, 2012, now Pat. No. 9,351,315.

(30) Foreign Application Priority Data

Mar. 25, 2011 (CN) ............................ 2011 1 0074598
Mar. 31, 2011 (CN) ............................ 2011 1 0080637

(Continued)

(51) Int. Cl.
*H04W 4/00* (2018.01)
*H04W 72/12* (2009.01)
(Continued)

(52) U.S. Cl.
CPC ......... *H04W 72/1268* (2013.01); *H04L 5/006* (2013.01); *H04W 72/12* (2013.01);
(Continued)

(58) Field of Classification Search
CPC ......... H04W 72/1268; H04W 74/0833; H04W 72/1289; H04W 72/12; H04W 28/06; H04L 5/006
See application file for complete search history.

(56) References Cited

U.S. PATENT DOCUMENTS 7,885,604 B2  2/2011  Wee et al.
7,978,732 B2  7/2011  Kim et al.
(Continued)

FOREIGN PATENT DOCUMENTS

CN    101924721 A    12/2010

*Primary Examiner* — Clemence Han
(74) *Attorney, Agent, or Firm* — Anova Law Group, PLLC

(57) ABSTRACT

Provided are a resource scheduling method and device; the method comprises: scheduling resource according to the transmission demands; and configuring a frame structure with a non-fixed frame length matching the scheduled resource. The method according to the present invention prevents wastage of wireless resources caused by competition conflict or random back-off, and can better adapt to the demands of different kinds of data services with varied features in the future.

10 Claims, 15 Drawing Sheets

(30) Foreign Application Priority Data

| May 19, 2011 | (CN) | .......................... 2011 1 0130194 |
| Jan. 16, 2012 | (CN) | .......................... 2012 1 0012030 |
| Feb. 16, 2012 | (CN) | .......................... 2012 1 0035783 |
| Feb. 21, 2012 | (CN) | .......................... 2012 1 0041650 |
| Feb. 21, 2012 | (CN) | .......................... 2012 1 0041651 |
| Feb. 21, 2012 | (CN) | .......................... 2012 1 0041655 |

(51) Int. Cl.
   *H04L 5/00* (2006.01)
   *H04W 74/08* (2009.01)
   *H04W 28/06* (2009.01)

(52) U.S. Cl.
   CPC ... *H04W 72/1289* (2013.01); *H04W 74/0833* (2013.01); *H04W 28/06* (2013.01)

(56) References Cited

U.S. PATENT DOCUMENTS

| 8,089,911 | B2 | 1/2012 | Huang et al. |
| 8,326,324 | B2 | 12/2012 | Wu et al. |
| 8,374,115 | B2 | 2/2013 | Huang et al. |
| 8,446,869 | B2 | 5/2013 | Lee et al. |
| 8,483,152 | B1 | 7/2013 | Mueller et al. |
| 8,982,750 | B2 | 3/2015 | Palanki et al. |
| 2002/0151319 | A1 | 10/2002 | Joeressen |
| 2004/0180679 | A1 | 9/2004 | Porter et al. |
| 2005/0265436 | A1 | 12/2005 | Suh et al. |
| 2008/0075032 | A1 | 3/2008 | Balachandran et al. |
| 2009/0073915 | A1* | 3/2009 | Zhang ................ H04B 7/2606 370/315 |
| 2009/0147706 | A1* | 6/2009 | Yu ...................... H04B 7/15542 370/277 |
| 2009/0175372 | A1 | 7/2009 | Moon et al. |
| 2009/0180410 | A1 | 7/2009 | Lee et al. |
| 2009/0185632 | A1 | 7/2009 | Cai et al. |
| 2009/0219875 | A1 | 9/2009 | Kwak et al. |
| 2009/0257366 | A1 | 10/2009 | Power et al. |
| 2010/0029288 | A1* | 2/2010 | Wang .................. H04B 7/0452 455/450 |
| 2010/0046464 | A1 | 2/2010 | Kwak et al. |
| 2010/0195629 | A1* | 8/2010 | Chen ................... H04L 1/1664 370/336 |
| 2010/0238878 | A1 | 9/2010 | Jang et al. |
| 2010/0260060 | A1* | 10/2010 | Abraham .......... H04L 25/03343 370/252 |
| 2011/0003608 | A1* | 1/2011 | Forenza .................. H04B 7/01 455/501 |

* cited by examiner

RESOURCE SCHEDULING METHOD AND DEVICE

CROSS-REFERENCE TO RELATED APPLICATION

This application is a continuation application of U.S. patent application Ser. No. 14/007,598, filed on Oct. 29, 2013. U.S. patent application Ser. No. 14/007,598 claims priority from PCT Patent Application No. PCT/CN2010/072773 FILED ON Mar. 22, 2012, which claims the priority of CN Application No. 201110074598.5 filed on Mar. 25, 2011 and titled "THE ADJUSTMENT METHOD AND SYSTEM OF THE DEMODULATION PILOT IN A WIRELESS COMMUNICATION SYSTEM", the entire content of which are incorporated herein by reference.

U.S. patent application Ser. No. 14/063,142 claims the priority of CN Application No. 201110080637.2 filed on Mar. 31, 2011 and titled "A SCHEDULING METHOD, WIRELESS COMMUNICATION SYSTEM AND DEVICE", which is incorporated herein by reference in its entirety.

U.S. patent application Ser. No. 14/063,142 claims the priority of CN Application No. 201110130194.3 filed on May 19, 2011 and titled "A COMMUNICATION SYSTEM", which is incorporated herein by reference in its entirety.

U.S. patent application Ser. No. 14/063,142 claims the priority of CN Application No. 201210012030.5 filed on Jan. 16, 2012 and titled "A RESOURCE SCHEDULING METHOD AND DEVICE", which is incorporated herein by reference in its entirety.

U.S. patent application Ser. No. 14/063,142 claims the priority of CN Application No. 201210035783.8 filed on Feb. 16, 2012 and titled "A RESOURCE SCHEDULING METHOD AND DEVICE", which is incorporated herein by reference in its entirety.

U.S. patent application Ser. No. 14/063,142 claims the priority of CN Application No. 201210041655.4 filed on Feb. 21, 2012 and titled "WIRELESS COMMUNICATION SYSTEM AND DEVICE USED FOR WIRELESS COMMUNICATION", which is incorporated herein by reference in its entirety.

U.S. patent application Ser. No. 14/063,142 claims the priority of CN Application No. 201210041650.1 filed on Feb. 21, 2012 and titled "DEVICE USED FOR WIRELESS COMMUNICATION", which is incorporated herein by reference in its entirety.

U.S. patent application Ser. No. 14/063,142 claims the priority of CN Application No. 201210041651.6 filed on Feb. 21, 2012 and titled "DEVICE USED FOR WIRELESS COMMUNICATION", which is incorporated herein by reference in its entirety.

TECHNICAL FIELD

The present invention relates to the field of wireless communication, especially relating to a method and device used for resource scheduling.

TECHNICAL BACKGROUND

Over the recent years, wireless communication systems used for short to medium communication distances include the wireless LAN technique WiFi that is based on the 802.11 standard, the Bluetooth system that is based on the 802.15 standard, the Femto technique that is directed to indoor applications and derived from the mobile communication system, etc.

The 802.11-based WiFi technique is currently the most widely used wireless network transmission technology, mainly used in a wireless local area network (LAN) environment, which may be either an indoor or outdoor environment. The 802.11 system was evolved into 802.11a and 802.11g based on OFDM technology from the original 802.11b based on CDMA transmission mechanism. In the latest 802.11n version, the physical peak rate of 802.11n is up to 600 MBPS by bringing in many antennas. In MAC layer, the 802.11 system always adopts the Carrier Sense Multiple Access with Collision Avoidance (CSMA/CA) protocol based random Multiple Access. The protocol adopts the "competition" mechanism. A CAP and the terminal or STA obtain the right to use the open air interface. Once the competition success, air interface will be exclusive to the CAP of competitive success, in the transmission cycle. Due to adopt the competition mechanism, access networks don't need a central control node. The CAP and the STA hollow resources are equal in the competition of the air interface resource. The efficiency of the WiFi system is low, and the wireless resource waste is high. The basic cause of this problem is the fact that the CSMA/CA mechanism is a contention-based random multiple access mechanism, and the right to use radio resources is contended between access points (CAPs) and stations (STAs) or among different STAs through the CSMA/CA mechanism, whilst wireless channels are contended at the same time, in which case collision occurs and waste of radio resources ensues. In order to avoid such collision, the CSMA/CA mechanism requires the CAPs or STAs to randomly retreat while contending for wireless channels, but when all the CAPs and STAs retreat, although there are idle wireless channels, they are not being used, and this is also a great waste of the wireless channels. Due to reasons specified above, the 802.11 system is relatively low in efficiency. For instance, the physical layer of the 802.11g system can reach a peak rate up to 54 Mbps, but the rate achievable by the transmission control protocol (TCP) layer under a large data packet downloading service for is not more than 30 Mbps, and the peak rate achievable thereby is even lower under a small data packet service due to increase in the overhead ratio. In spite of the aforementioned deficiencies, the 802.11 system is flexible and independent of any centralized control mechanism, so relatively low equipment cost can be achieved thereby.

Evolved from the mobile communication system, the Femto technique that is based on the 3GPP standard is a novel technology directed to indoor coverage. Based on data statistics of the 3G system, approximately 70% of all data services occur indoors, so the indoor high-speed data accessing scheme becomes of great importance. The Femto base station, also referred to as a pico base station, is small and exquisite in volume (similar to the case of Wi-Fi) and flexible for deployment. Since it is evolved from the mobile communication system, the Femto base station inherits almost the entire characteristics of the mobile communication system. The Femto equipment merely combines its application scenario characteristics such as limited coverage range, fewer accessing users and so on, to lower the processing capability of the equipment, to thereby reduce equipment cost. Considering from the perspective of the duplexing mode, like the mobile communication system, Femto base stations can be classified into two types of duplexing mechanisms—frequency division duplexing (FDD) and time division duplexing (TDD). The uplink and downlink carrier resources of the FDD are symmetrical, but the service characteristic of asymmetry in uplink and downlink data flows of data services causes certain waste of resources to the FDD system for data services. The uplink and downlink of the TDD system operate on the same carrier, and are allocated with different radio resources by dividing time resources, so the TDD system is better adapted to asymmetrical data services required by uplink and downlink services in comparison with the FDD. However, it is difficult for the TDD duplexing mode of the mobile communication system (including the Femto system) and the static allocation of uplink and downlink resources to achieve dynamic adaptation of service requirements and resource divisions for various data services with different requirements, such as webpage browsing, mobile videos, mobile games and machine-to-machine (M2M), etc. As compared with Wi-Fi, since Femto makes use of a scheduling-based centralized control mechanism, there is no waste of radio resources caused by contention collision and random retreat between base stations or CAPs and terminals, or among the terminals, so the link efficiency is relatively high.

the Femto technology, its multiple access mechanism distributes orthogonal access resources for the different STA, it has fundamentally different with CSMA/CA random multiple access oriented to competition. Femto technology requires central control node to distribute orthogonal wireless resources for the STA. The different STAs complete transmission through time, frequency, code word even multiplexing air interface resources at the same time. In the physical layer technology, Femto technology based on the 3G system adopts CDMA transmission mechanism, Femto technology oriented to LTE and WiMAX system adopts OFDM transmission mechanism. Because of the OFDM technology is the mainstream technology of the future broadband wireless communication system, Femto technology are mentioned in the present invention refers to LTE and WiMAX Femto. Because of TDD technology can better adapt to the mobile Internet asymmetric business to relative FDD technology, therefore the Femto mentioned in the present invention refers to TDD Femto technology.

Although the Femto system is also scheduled to perform uplink and downlink communication and to allocate radio resources for different terminals, its statically configured frame structure cannot match flexibly allocated radio resources of the uplink and downlink, and cannot self-adapt to service changes with small granularity. Imbalance in the allocation of services and resources may result in long time queuing, reduction of user experience, or waste of channel capacity.

Face to the future broadband and narrowband data, considering the short distance wireless communication scenario, whether Wi-Fi system based on 802.11 technology, or the Femto technology evolve from the mobile communication systems have some disadvantages.

(1) Technical Defects of Wi-Fi

Although 802.11n technology achieves a peak rate at the physical layer up to 600 Mbps through a MIMO-OFDM technology, the random multiple access mechanism based on CSMA/CA used by the MAC layer degrades its TCP throughput greatly. CSMA/CA is a multiple access mechanism with competitions, and the conflict of competition is inevitable in the system. If there are two or more terminals, or the terminal competes with a CAP for the air interface at the same time, either party will fail due to the competition. This is the conflict of competition. Obviously, the conflict of competition is a waste of air interface resources. In the case of the conflict of competition, in order to avoid the further conflict of competition, all parties of the competition will initiate the random backoff. During the backoff process, there will be the situation where multiple competing nodes are waiting. At this time, although services are waiting for transmission, the air interface resources have not been rationally used, which will cause a great waste of the air interface resources. The conflict of competition and random backoff are the important factors causing the low efficiency of the 802.11 system. More importantly, with the increase in the number of terminals, the conflict probability index increases and the system performance becomes worse.

(2) Technical Defects of TDD LTE Femto

The uplink and downlink wireless resources of a TDD LTE Femto system are configured by the frame structure format statically, with the scheduling cycle of 1 ms being used as the minimum configuration unit. Facing abundant types of data services, its asymmetry in the uplink and downlink services is not consistent, and further this frame format configured statically is unable to self-adapt to the demands on various types of data services. When the service feature changes, the uplink and downlink resources initially configured are redundant or insufficient to a certain extent, which will not only cause the waste of the wireless resources, but also increase the service delay. Although scheduling is carried out for uplink and downlink communication and assignment of the wireless resources for different terminals, the frame structure statically configured is not helpful in assigning uplink and downlink wireless resources and self-adapting to the service change with a small granularity. In case of unbalance between services and resource configuration, a long time queuing will be caused, thus user experience is degraded, or the waste of channel capacity will be caused.

SUMMARY OF INVENTION

In view of this, the technical problem to be solved in the present invention is to provide a method and device for resource scheduling, which is not restricted by the frame format and frame length, is applicable to assign the resources based on the transmission demand dynamically, and is adaptable to the future demand on data services of abundant types and different characteristics with excellent expansibility.

A brief summarization is given below to provide a basic understanding of some aspects of the embodiments disclosed. This summarization, which is not a general commentary, is not to determine the key/important component elements, or to describe the scope of these embodiments. The only object thereof is to simply present some concepts, acting as a preamble of the subsequent detailed illustration.

To solve the above technical problem, the invention provides a resource scheduling method, comprising:

carrying out resource scheduling according to a transmission demand; and configuring a frame structure which has an unfixed frame length and matches with scheduled resources.

To solve the above technical problem, the invention provides a resource scheduling device, comprising:

a scheduling module used to schedule resources according to a transmission demand; and a configuration module used to configure a frame structure which has an unfixed frame length and matches with the scheduled resources.

With the program put forward by the present invention, the following the functions will be realized:

1. The CAP centralizes the scheduling of its associated STAs to allocate the wireless resources for different STAs, to avoid the waste of wireless resources brought by the competition mechanism.

2. The dynamic configuration of the TDD frame length and flexible configuration of resource proportions are implemented, so that the efficiency of the various control information of the system is improved. The dynamic resource allocation based on the service demand enables better adaptation to the future demands on transmission data services of abundant types and different characteristics dynamically, without restriction by the fixed length or the frame cycle, thus the frame structure is flexible and variable.

3. The wireless resources can be allocated for the users and uplink and downlink communication with the smaller granularity, so that the resource allocation is better adaptable to the service change. The wireless resources allocated for different users and uplink and downlink communication are better adaptable to the service demands and channel transmission conditions.

4. It is possible to not only adapt to the significant change in demands on the service rate of different terminals, but also better adapt to the dynamic change in the wireless channel. The present invention is able to better adapt to the dynamic change in various types of demands on data service. The dynamic configuration of the channel capacity and service demand can achieve the better system efficiency. It is possible to balance between the service demand and the channel characteristics, and dynamically divide the uplink and downlink resources, and the wireless resources are dynamically allocated for different terminals considering the link self-adaptation.

5. In addition to the above characteristics, the status information delay of the channel and the demands on the processing time by different classes of devices are considered in the present invention. The above consideration is beneficial to improve the efficiency and performance of the system.

6. It is possible to implement the feedback in the same frame to reduce the MU-MIMO feedback delay.

7. It is possible to realize the scheduling in the same frame to reduce the service scheduling delay.

8. The frame structure is flexible and variable, to be adaptable to various types of demands on the uplink and downlink transmission of data services, without restriction by the fixed frame length or the frame cycle. At the same time, this system allows the cycle of uplink and downlink scheduling transmission to self-adapt to the change in uplink and downlink service demand, so that the service demand can match with the uplink and downlink channel capacity, to achieve the higher resource utilization rate.

9. The scheduling cycle can self-adapt to the change in the time selective fading of a wireless channel, thus avoiding the control overhead caused by unnecessary frequent scheduling; this system allows the frame length to be dynamically adjusted to self-adapt to the time selective fading of the wireless channel, so that the system scheduling cycle can be matched with the wireless channel, thus to reduce the control overhead caused by the frequent scheduling. The higher throughput and wireless resources utilization rate can be achieved.

To attain the above and related objects, one or more embodiments include the features that will be illustrated in detail below and specifically recited in the claims. The following illustration and drawings illustrate some exemplary aspects in detail; moreover, it only indicates some of the various modes in which the principle of each embodiment may be applied. Other benefits and novel features will be apparent from the following detailed illustration in conjunction with the drawings, and all the embodiments disclosed intend to contemplate all these aspects and their equivalents.

DETAILED DESCRIPTION OF EMBODIMENTS

The description below and accompanying drawings fully illustrate specific embodiments of the invention, to enable one skilled in the art to implement the embodiments. Modifications, such as structural, logical, electrical and process modifications, can be made in other embodiments. The embodiments only represent some possible variations. Individual components or functions are optional and the operation order is variable, unless it is otherwise stated specifically. A part and certain feature of some embodiments may be included in or replaced by a part and certain feature of other embodiment. The scope of the embodiments of the invention includes the whole scope of the claims and all obtainable equivalents thereof. Herein, these embodiments of the invention may be individually or generally represented by the term "invention" for the sake of convenience; moreover, if more than one invention is disclosed actually, it is not intended automatically to limit the application scope to any individual invention or inventive concept.

Figure 1:
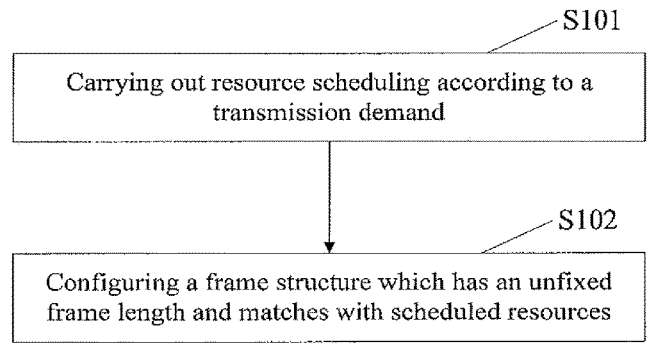
FIG. 1 is the flow chart indicating the resource scheduling method specified in the invention.

Considering the above applications, the present invention puts forward a resource scheduling method, as shown in FIG. 1, which may be particularly implemented by:

Step S101: carrying out resource scheduling according to a transmission demand; and Step S102: configuring a frame structure which has an unfixed frame length and matches with scheduled resources.

With the method in the present invention, there is no conflict of competition or the waste of wireless resources caused by random backoff. Different from the traditional mobile communication system (including the next generation mobile communication system such as LTE and WiMax, etc.), this system can divide the uplink and downlink wireless resources dynamically based on the service demand, to better adapt to the future demand on data services of abundant types and different characteristics dynamically.

Through the above method, the communication frame to be transmitted can be obtained.

The communication frame for transmission in the present invention is based on Time Division Duplexing (TDD) (on a certain fixed carrier, the base station or CAP performs reception and transmission between the terminal or STA through the time division of receiving and transmitting switching). According to the transmission direction of the data, a TDD frame can be divided into two parts for downlink (DL, i.e. the direction from the base station to the terminal or from the CAP to the STA) transmission and uplink (UL, i.e. the direction from the terminal to the base station or from the STA to the CAP) transmission, respectively. The frame length can be configured dynamically and the frame structure can be configured dynamically. That is, in the present invention, the resource scheduling is carried out according to the transmission demand, the frame format is determined by the scheduled resources, and the process of resource scheduling is not restricted by the frame length and the frame format, thus to achieve more rational resource assignment.

The following description explains how to carry out resource scheduling according to the transmission demand in details and accordingly configure the frame structure.

A First Embodiment

The frame structure in the present invention includes the downlink sub-frame and/or the uplink sub-frame, and the downlink sub-frame and the uplink sub-frame each are divided into different channels by functions. A guard interval (GI) exists between the downlink sub-frame and the uplink sub-frame, here, the transceiving guard interval from downlink to uplink is called a downlink guard interval (DGI), and the transceiving guard interval from uplink to downlink is called uplink guard interval (UGI).

The frame structure provided by the present invention is provided with at least a preamble sequence and a system information channel.

The preamble sequence is configured in the starting position of the frame structure, to realize the synchronization. The preamble sequence may be a short preamble sequence or a long preamble sequence. Among which, the short preamble sequence is mainly used for the coarse system synchronization, as well as frame detection, automatic gain control, coarse frequency synchronization or coarse symbol synchronization; while the long preamble sequence is mainly used for the fine system synchronization and channel estimation as well as the fine frequency synchronization and fine symbol synchronization, etc.

The system information channel is used to carry the information indicating the frame structure. Through detecting the information indicating the frame structure on the system information channel, all the STAs related to the CAP can obtain the structure of this frame. The system information channel is located after the preamble sequence, and its position is pre-determined by the CAP and the STAs. In addition, the system information channel is also used for broadcasting basic system configurations, such as a CAP identifier, a CAP antenna configuration, a frame number, and CRC check protection information.

When there is the transmission demand, the corresponding transmission resources are scheduled according to the transmission demand, and the frame structure that matches with the scheduled transmission resources is configured. The transmission demand in the present invention is carried by the scheduling information, and the CAP obtains and parses the scheduling information, to obtain the transmission demand, so that the resource scheduling is completed.

Among which, the uplink transmission demand is obtained by the CAP from the STA. Specifically, the CAP can obtain the uplink transmission demand through three manners below:

A manner 1: the uplink transmission demand is obtained through the request-response mode, specifically, the STA initiates the scheduling request, the CAP allocates the resources for feeding back the uplink transmission demand for the STA, and the STA feeds back the uplink transmission demand on the corresponding resources.

If using the first manner as described above, an uplink scheduling request channel is configured in the frame structure and used by the STA to send the uplink scheduling request to the CAP, to request the transmission resources for reporting the uplink transmission demand from the CAP.

When configuring the uplink scheduling request channel in the frame structure, the exclusive uplink transmission resources are scheduled for the STA, to enable the STA to initiate the uplink scheduling with a non-competitive manner; or the shared uplink transmission resources are scheduled for the STA, to enable the STA to initiate the uplink scheduling with a competitive manner. That is, when initiating the scheduling request, the STA is able to use the uplink transmission request mechanism without conflict, or use the uplink transmission request mechanism based on the competition.

When allocating the uplink scheduling request channel, the duration of the uplink scheduling request channel is calculated and configured according to the number of the STAs related to the CAP. For example, N uplink scheduling request channels are configured for N STAs related to the CAP, respectively, and each STA can initiate the uplink scheduling request on the corresponding channel based on the non-conflict uplink transmission request mechanism. Alternatively, M uplink scheduling request channels are configured for the N STAs related to the CAP, in which M is less than N, and the N STAs compete for the M uplink scheduling request channels to initiate the respective uplink scheduling requests.

In addition, the uplink scheduling request channel can be designed to feed back the switching volume, thus to realize the rapid feedback.

A manner 2: the uplink transmission demand is obtained through the polling mode, specifically, the CAP queries each STA periodically to receive the uplink transmission demand fed back by the STA.

A manner 3: the uplink transmission demand is obtained by means of carrying a report, specifically, when the STA transmits the uplink signaling, the STA carries the uplink transmission demand in the data frame and sends together with the uplink signaling to the CAP.

Among which, the downlink transmission demand is obtained from the MAC layer or a high layer of the CAP.

The transmission demands include the demand on uplink transmission and the demand on downlink transmission depending on the transmission direction. When there is the demand on uplink transmission, the uplink resources are scheduled according to the demand on uplink transmission, to configure the uplink transmission channel that matches with the scheduled uplink resource. When there is the demand on downlink transmission, the downlink resources are scheduled according to the demand on downlink transmission, to configure the downlink transmission channel that matches with the scheduled downlink resources.

Depending on the type of data for transmission, the transmission demand may be a demand on transmission of service data, a demand on transmission of signaling and a feedback demand, etc.

Based on this, scheduling the uplink transmission resources according to the demand on uplink transmission and configuring the matched uplink transmission channel further includes:

When there is the demand on transmission of uplink service, the uplink transmission resources are scheduled for the uplink service, so that the uplink service transmission channel is configured in the frame structure. The duration of the uplink service transmission channel is determined by total transmission resources required for each STA related to the CAP to transmit the uplink service.

When there is the demand on transmission of uplink signaling, the uplink transmission resources are scheduled for the uplink signaling, so that the uplink signaling channel is configured in the frame structure. The duration of the uplink signaling channel is determined by total transmission resources required for each STA related to the CAP to transmit the uplink signaling.

When there is the demand on feedback of the downlink service, the uplink transmission resources are scheduled for the downlink service feedback, so that the downlink service feedback channel is configured. The duration of the downlink service feedback channel is determined by total transmission resources required for feedback of the downlink service according to each STA related to the CAP.

If there is other demand on uplink transmission, the corresponding channel can be added in the uplink transmission channel, which is not further described in detail herein.

In this case, scheduling the downlink transmission resources according to the demand on downlink transmission and configuring the matched downlink transmission channel further includes as follows:

when there is the demand on transmission of the downlink service, the downlink transmission resources are scheduled for the downlink service, so that the downlink service transmission channel is configured in the frame structure, where the duration of the downlink service transmission channel is determined by total transmission resources required by the CAP to send downlink services to each STA related to the CAP;

when there is the demand on transmission of downlink signaling, the downlink transmission resources are scheduled for the downlink signaling, so that the downlink signaling channel is configured in the frame structure, where the duration of the downlink signaling channel is determined by total transmission resources required by the CAP to transmit the downlink signaling to each STA related to the CAP; and when there is the demand on feedback of the uplink service, downlink transmission resources are scheduled for the feedback of the uplink service, to configure the uplink service feedback channel, where the duration of the uplink service feedback channel is determined by total transmission resources required by the CAP for feeding back the uplink service to each STA related to the CAP.

If there is other demand on downlink transmission, the corresponding channel can be added in the downlink transmission channel, which is not further described in detail herein.

Preferably, in case of scheduling the transmission resources, the channel status should be considered to make the resource scheduling more rational. The resource scheduling can be carried out according to the CQI, or according to the CQI and CSI. Among which, the CSI is an H matrix (of an N×M order, with N receiving antennae and M transmitting antennae) of the transmission channel, or a V matrix (of an M×K order) obtained from the SVD decomposition of the H matrix of the transmission channel, or the compression information of such V matrix; CQI includes one or more of: a signal-to-noise ratio (SNR) or signal to interference and noise ratio (SINR) of the transmission channel, MCS (i.e. a modulation coding set employed for the downlink transmission), Nss (i.e. the number of spatial streams employed for the downlink transmission), PMI (i.e. pre-coding matrix indicator employed for the downlink transmission) and other related measurement scale.

When the capability of the STA supports the CAP to obtain the CQI, the CAP also obtains the CQI, and carries out the resource scheduling according to the transmission demand and the CQI. When the capability of the STA supports the CAP to obtain the CQI and the CSI, the CAP also obtains the CQI and the CSI, and carries out the resource scheduling according to the transmission demand, the CQI and the CSI.

Among which, the CQI can be either the CQI obtained from the measurement of the entire frequency band, or the CQI obtained from the measurement of the partial frequency band. The CSI can be either the CSI obtained from the measurement of the entire frequency band, or the CSI obtained from the measurement of the partial frequency band.

The following explains the resource scheduling and frame structure configuration in the present invention from the obtainment of the channel status and downlink channel status respectively:

When scheduling the uplink transmission resources, the resource scheduling is carried out according to the uplink CQI. To obtain the uplink CQI, the following design can be used:

Method 1: Measuring according to the uplink sounding channel. That is, when there is the demand on scheduling the uplink transmission resources, for example, when there is the demand on transmission of uplink service, the demand on transmission of uplink signaling or the demand on feedback of the downlink service, the resource scheduling is needed to obtain the uplink CQI, so that the uplink sounding channel is configured in the frame structure, to be used by the STA to send the uplink sounding signal to the CAP. When the CAP schedules the uplink transmission resources, the uplink CQI is calculated through the measurement of the uplink sounding signal on the uplink sounding channel, and the measured uplink CQI is used to carry out the resource scheduling.

Method 2: With the uplink and downlink reciprocity of the TDD system, the STA measures and feeds back the downlink CQI. CAP obtains the uplink CQI based on the system reciprocity. That is, when there is the demand on uplink transmission, the resource scheduling is needed to obtain the uplink CQI, so that the downlink sounding channel and the CQI feedback channel are configured in the frame structure. The downlink sounding channel is used by the CAP to send the downlink sounding signal to the STA. The CQI feedback channel is used by the STA to feed back the downlink CQI measured according to the downlink sounding signal to the CAP. When the CAP schedules the uplink transmission resources according to the demand on uplink transmission, the CAP determines the uplink CQI according to the downlink CQI fed back by the STA based on the uplink and downlink reciprocity. In addition, the uplink transmission resources are scheduled with combination of the uplink CQI.

When scheduling the uplink transmission resources, the resource scheduling is carried out according to the uplink CQI and the uplink CSI. To obtain the uplink CQI and the uplink CSI, the following design can be used:

Method 1: Measuring according to the uplink sounding channel. That is, when there is the demand on scheduling the uplink transmission resources, for example, when there is the demand on transmission of uplink service, the demand on transmission of uplink signaling or the demand on feedback of the downlink service, the resource scheduling is needed to obtain the uplink CQI and the uplink CSI, so that the uplink sounding channel is configured in the frame structure, to be used by the STA to send the uplink sounding signal to the CAP. When schedule the uplink transmission resources, the uplink CQI and the uplink CSI are calculated through the measurement of the uplink sounding signal on the uplink sounding channel, and the measured uplink CQI and the uplink CSI are used to carry out the resource scheduling.

Method 2: With the uplink and downlink reciprocity of the TDD system, the STA measures and feeds back the downlink CQI and the downlink CSI. CAP obtains the uplink CQI and the uplink CSI based on the system reciprocity. That is, when there is the demand on uplink transmission, the resource scheduling is needed to obtain the uplink CQI and the uplink CSI, so that the downlink sounding channel, the CQI feedback channel and the CSI feedback channel are configured in the frame structure. The downlink sounding channel is used by the CAP to send the downlink sounding signal to the STA. The CQI feedback channel is used by the STA to feed back the downlink CQI measured according to the downlink sounding signal to the CAP. The CSI feedback channel is used by the STA to feed back the downlink CSI measured according to the downlink sounding signal to the CAP. When schedule the uplink transmission resources according to the demand on uplink transmission, the CAP determines the uplink CQI according to the downlink CQI fed back by the STA based on the uplink and downlink reciprocity, and determines the uplink CSI according to the downlink CSI fed back by the STA. In addition, the uplink transmission resources are scheduled with combination of the uplink CQI and the uplink CSI.

Method 3: Obtaining the CQI by means of direct measurement, and obtaining the CSI by the system reciprocity; alternatively, obtaining the CSI by means of direct measurement, and obtaining the CQI by the system reciprocity. That is:

when there is the demand on transmission of uplink service, the resource scheduling is needed to obtain the uplink CQI and uplink CST, so that the uplink sounding channel, the downlink sounding channel and the CQI feedback channel are configured in the frame structure. The uplink sounding channel is used by the STA to send the uplink sounding signal to the CAP. The downlink sounding channel is used by the CAP to send the downlink sounding signal to the STA. The CQI feedback channel is used by the STA to feed back the downlink CQI measured according to the downlink sounding signal to the CAP; when scheduling the uplink transmission resources according to the demand on uplink transmission, the uplink sounding signal is measured on the uplink sounding channel to calculate the uplink CQI, and the uplink CQI is determined according to the downlink CQI fed back the STA based on the uplink and downlink reciprocity. In addition, the uplink CQI and uplink CSI are combined to schedule the uplink transmission resources.

Or, when there is the demand on transmission of uplink service, the resource scheduling is needed to obtain the uplink CQI and uplink CSI, so that the uplink sounding channel, the downlink sounding channel and the CSI feedback channel are configured in the frame structure. The uplink sounding channel is used by the STA to send the uplink sounding signal to the CAP. The downlink sounding channel is used by the CAP to send the downlink sounding signal to the STA. The CSI feedback channel is used by the STA to feed back the downlink CSI measured according to the downlink sounding signal to the CAP; when scheduling the uplink transmission resources according to the demand on uplink transmission, the uplink sounding signal is measured on the uplink sounding channel to calculate the uplink CQI, and the uplink CSI is determined according to the downlink CSI fed back the STA based on the uplink and downlink reciprocity. In addition, the uplink CQI and uplink CSI are combined to schedule the uplink transmission resources.

In case of scheduling the downlink transmission resources, the resource scheduling can be carried out according to the downlink CQI. To obtain the downlink CQI, the following design can be used:

Method 1: With the uplink and downlink reciprocity of the TDD system, the CAP measures the downlink CQI. Specifically, when there is the demand on scheduling of the downlink transmission resources, for example, when there is the demand on transmission of downlink service, the demand on transmission of downlink signaling or the demand on feedback of the uplink service, the resource scheduling is needed to obtain the downlink CQI, so that the uplink sounding channel is configured in the frame structure and used by the STA to send the uplink sounding signal to the CAP. When the CAP schedules the downlink transmission resources, the calculates the uplink CSI through the measurement of the uplink sounding signal on the uplink sounding channel, determines the downlink CQI based on the TDD system uplink and downlink reciprocity, and carries out resource scheduling with combination of the downlink CQI.

Method 2: The STA measures the downlink CQI and reports the measurement results to the CAP by means of a feedback so that the CAP obtains the downlink CQI. Specifically, when there is the demand on scheduling of the downlink transmission resources, for example, when there is the demand on transmission of downlink service, the demand on transmission of downlink signaling or the demand on feedback of the uplink service, the resource scheduling is needed to obtain the downlink CQI, so that a downlink sounding channel and a CQI feedback channel are configured in the frame structure. The downlink sounding channel is used by the CAP to send the downlink sounding signal to the STA, and the CQI feedback channel is used by the STA to feed back the downlink CQI measured by the downlink sounding signal to the CAP. For scheduling the downlink transmission resources, the resource scheduling is carried out according to the downlink CQI fed back by the STA.

Among which, the duration of the uplink sounding channel can be determined by the total number of antennae of the STA that report the uplink sounding signal.

In case of scheduling the downlink transmission resources, the resource scheduling can be carried out according to the downlink CQI and CSI. To obtain the downlink CQI and CSI, the following design can be used:

Method 1: With the uplink and downlink reciprocity of the TDD system, the CAP measures the downlink CQI and CSI. Specifically, when there is the demand on scheduling of the downlink transmission resources, for example, when there is the demand on transmission of downlink service, the demand on transmission of downlink signaling or the demand on feedback of the uplink service, the resource scheduling is needed to obtain the downlink CQI and the downlink CSI, so that the uplink sounding channel is configured in the frame structure and used by the STA to send the uplink sounding signal to the CAP. When schedule the downlink transmission resources, the calculates the uplink CQI and the uplink CQI through the measurement of the uplink sounding signal on the uplink sounding channel, determines the downlink CQI and the downlink CQI based on the TDD system uplink and downlink reciprocity, and carries out resource scheduling with combination of the downlink CQI and the downlink CQI.

Method 2: The STA measures the downlink CQI and the downlink CQI, and reports the measurement results to the CAP by means of a feedback so that the CAP obtains the downlink CQI and the downlink CQI. Specifically, when there is the demand on scheduling of the downlink transmission resources, for example, when there is the demand on transmission of downlink service, the demand on transmission of downlink signaling or the demand on feedback of the uplink service, the resource scheduling is needed to obtain the downlink CQI and the downlink CQI, so that a downlink sounding channel, a CQI feedback channel and a CSI feedback channel are configured in the frame structure. The downlink sounding channel is used by the CAP to send the downlink sounding signal to the STA, and the CQI feedback channel is used by the STA to feed back the downlink CQI measured by the downlink sounding signal to the CAP, and the CSI feedback channel is used by the STA to feed back the downlink CSI measured by the downlink sounding signal to the CAP. For scheduling the downlink transmission resources, the resource scheduling is carried out according to the downlink CQI and a downlink CSI fed back by the STA.

Preferably, after receiving the CQI fed back by the STA, the quality of the channel corresponding to the STA is calculated in combination with the resource assignment method. For example, if the method of resource assignment is based on time division or frequency division, the downlink CQI and the CSI fed back by the STA can be used directly for resource scheduling; if the method of resource assignment is based on space division, the space division transmission interference corresponding to the STA is calculated according to the CSI fed back by each STA. When using the CQI fed by each STA, the corresponding space division interference should be removed. In addition, the CQI fed back by each STA can be processed according to other adjustment factors, to obtain the CQI for resource scheduling.

Method 3: Considering the small data volume of the CQI, the large data volume of the CST, and that the precision of measurement on the downlink channel by the STA is higher than the that of the measurement on the channel by the CAP using the uplink and downlink reciprocity of the TDD system, such a design that the CAP uses the uplink and downlink reciprocity of the TDD system to measure the downlink CSI to save the transmission bandwidth. The STA measures the downlink CQI and reports the measurement results to the CAP by means of feedback, so that the CAP obtains the accurate CQI. Specifically, when there is the demand on scheduling of the downlink transmission resources, for example, when there is the demand on transmission of downlink service, the demand on transmission of downlink signaling or the demand on feedback of the uplink service, the resource scheduling is needed to obtain the downlink CQI and downlink CSI, so that an uplink sounding channel, a downlink sounding channel and a CQI feedback channel are configured in the frame structure. The uplink sounding channel is used by the STA to send the uplink sounding signal to the CAP; the downlink sounding channel is used by the CAP to send the downlink sounding signal to the STA, and the CQI feedback channel is used by the STA to feed back the downlink CQI measured by the downlink sounding signal to the CAP. For scheduling of the downlink transmission resources, when the resource scheduling is carried out according to one or more of the demand on downlink service transmission, the demand on downlink signaling transmission and the demand on feedback to the uplink service, the uplink sounding signal is measured on the uplink sounding channel to calculate the uplink CSI, the downlink CST determined based on the uplink and downlink reciprocity of the system, and the downlink transmission resources are scheduled according to the downlink CSI and the downlink CQI fed back by the STA.

Preferably, after receiving the CQI fed back by the STA, it is possible to calculate the quality of the channel corresponding to the STA in combination with the method of resource assignment. For example, if the method of resource assignment is based on time division or frequency division, the downlink CQI and CSI fed back by the STA can be used directly for resource scheduling; if the method of resource assignment is based on space division, the space division transmission interference corresponding to the STA is calculated according to the CSI fed back by each STA. When using the CQI fed by each STA, the corresponding space division interference should be removed. In addition, the CQI fed back by each STA can be processed according to other adjustment factors, to obtain the CQI for resource scheduling.

Preferably, if the current frame allows other STA to access the CAP, resources can be scheduled for the STA to access the CAP, so that the random access channel is configured in the frame structure for the STA to access the CAP, to establish the relation with the CAP. The duration of the random access channel is determined according to the maximum number of STAs which initiate the access at the same time. If the current frame no longer allows other STA to access the CAP, the random access channel cannot be configured for the current frame.

Among which, the downlink sounding channel can be located on either ends or in the middle of the downlink transmission channel. In the MU-MIMO (Multi-User Multiple-Input Multiple-Output) transmission plan, not only the performance of downlink MU-MIMO system is sensitive to the delay in status information of the downlink channel, but also the multi-user MIMO is related to the large signal processing complexity. Comprehensively considering the delay in the status information of the channel and the possible different processing complexities in different applications, it is more reasonable to locate the downlink sounding channel in the middle of the downlink transmission channel, according to the maximum processing time needed by the STA that needs feedback, the downlink sounding channel starts at the position of the maximum processing time before the uplink transmission. The specific position of the downlink sounding channel on the downlink transmission channel is indicated by the cyclic broadcast message in the system information channel. If the position of downlink sounding channel is fixed, the system information channel indicates whether the downlink sounding channel is present or not. If the STAs with different processing capabilities exist in the system, the position of downlink sounding channel is variable. Through the above dynamic or semi-static configuration of the position of downlink sounding channel, the STAs with different processing capabilities are provided with enough processing time.

Among which, two types of methods can be used to schedule the STA to send the uplink sounding signal on the uplink sounding channel: when the CAP is triggered, the STA is scheduled to transmit the sounding signal; or when the CAP is once scheduled, the STA transmits the sounding signal cyclically on the uplink sounding channel within a period.

According to the functions of channels configured in the frame structure, the uplink scheduling request channel, the uplink random access channel, the downlink sounding channel, the uplink sounding channel, the CQI feedback channel and the CSI feedback channel are called auxiliary channels.

Among which, when configuring the CQI feedback channel and/or the CSI feedback channel, the CQI feedback channel and/or the CSI feedback channel can be configured in the uplink transmission channel, that is, the CQI feedback channel and/or the CSI feedback channel are taken as a part of the uplink transmission channel. In addition, the CQI feedback channel and/or the CSI feedback channel can be configured to be separate from the uplink transmission channel as the auxiliary channel.

Preferably, the control channel can also be configured in the frame structure and used to carry the description information of one or more of the uplink transmission channel, the downlink transmission channel, the uplink sounding channel, the downlink sounding channel, the CQI feedback channel, the CSI feedback channel, the uplink scheduling request channel and the random access channel, thus to inform the STA related to the CAP of the specific transmission resource assignment of each channel in the frame structure.

Among which, the control channel is composed of the scheduling signaling, and the description information is carried in the scheduling signaling. The scheduling signaling is used to indicate the object of resource scheduling and the transmission resources scheduled for the object; here, the object is one STA or one group of STAs.

The duration of the control channel is determined by the total transmission resources required by the CAP to deliver scheduling signaling to all related STAs. The lengths of all the scheduling signaling may be summed to obtain the cycle of the control channel; alternatively, if the length of each signaling is fixed, the cycle of the control channel is calculate by multiplying the fixed length of signaling by the number of downlink scheduling signaling.

When carrying out the resource scheduling, the scheduling algorithms such as a Maximum Carrier to Interference Ratio algorithm, a Polling Scheduling algorithm and a Proportional Fair Scheduling algorithm can be used. The type of the scheduled resource can be based on one or more of the time division, frequency division, code division and space division. Therefore, each channel in the configured frame structure can use one or more of the time division, frequency division, code division and space division for multiplexing of the resources.

Figure 2:
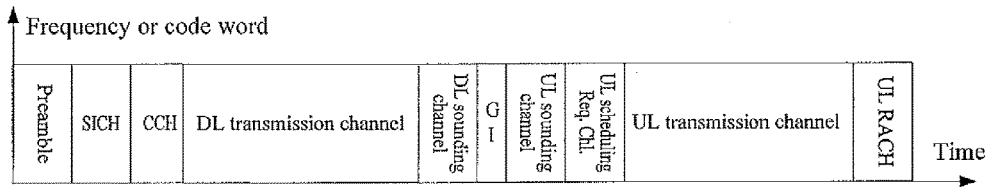
FIG. 2 is a schematic diagram indicating a frame structure specified in the invention.

To explain the configuration method of the frame structure in the present invention more vividly, FIG. 2 shows a frame structure including the downlink sub-frame and the uplink sub-frame. The downlink sub-frame includes a preamble sequence, a system information channel, a control channel, a downlink transmission channel and a downlink sounding channel. The uplink sub-frame includes an uplink sounding channel, an uplink scheduling request channel, an uplink transmission channel, and an uplink random access channel, and a guard interval GI is configured between the uplink sub-frame and the downlink sub-frame. The method of time-division multiplexing among channels is used to share the transmission resources.

Figure 3:
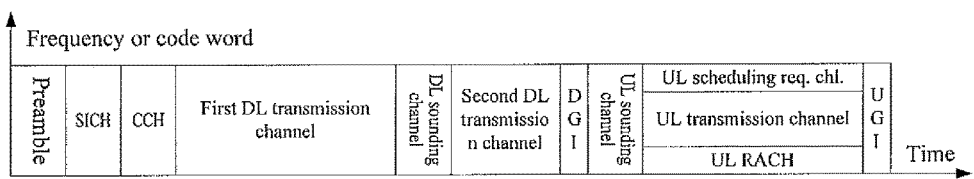
FIG. 3 is a schematic diagram indicating another frame structure specified in the invention.
Figure 4:
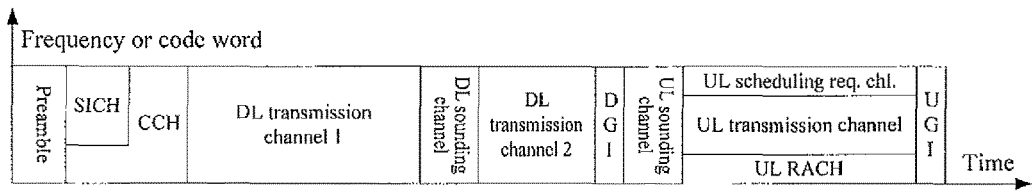
FIG. 4 is a schematic diagram indicating another frame structure specified in the invention.

FIG. 2 only shows an example of the frame structure. Actually, the corresponding channel may be dynamically configured in the frame structure according to the different system applications or plans. In addition, the resources multiplexing method among channels is determined by the resource type, for example, also as shown in FIG. 3, the uplink transmission channel (may include an uplink service transmission channel, an uplink signaling channel and a downlink service feedback channel, etc.), an uplink scheduling request channel and an uplink random access channel use frequency division and time division for multiplexing. For another example, also as shown in FIG. 4, based on FIG. 3, the system information channel and the control channel use the frequency division and time division for multiplexing. In addition, one or more of the time division, frequency division, code division and space division can be used among the resources assigned in the same channel for each STA, to share the transmission resources. Among which, the downlink sounding channel shown in FIG. 3 and FIG. 4 is located in the middle of downlink transmission channel, to divide the downlink transmission channel into a downlink transmission channel 1 and a downlink transmission channel 2.

In the frame structure, the frame structure may be indicated with bits in the system information channel, that is, indicating the existence and cycle of each channel. With the frame structure shown in FIG. 2 as an example, the indication method of the frame structure is explained below.

In the system information channel, 6 bits are used to indicate the duration of the control channel, which is up to 63 OFDM symbols, with the minimum assignment unit of the resources being 1 OFDM symbol; 9 bits are used to indicate the downlink transmission channel cycle, which is up to 512 OFDM symbols (including the dedicated demodulation pilot); 9 bits are used to indicate the uplink transmission channel cycle, which is up to 512 OFDM symbols (including the dedicated demodulation pilot); 1 bit is used to indicate the guard interval DGI, which is up to 1 OFDM symbol; 2 bits are used to indicate the configuration of the uplink sounding channel, to indicate 0, 1, 2, 4 OFDM symbols respectively; 2 bits are used to indicates the configuration of the uplink scheduling request channel, to indicate 1, 2, 3, 4 OFDM symbols respectively; 1 bit is used to indicate the configuration of the uplink random access channel, to indicate existence and non-existence respectively, and if any, with 1 OFDM symbol only; and 1 bit is used to indicate the guard interval, which is up to 1 OFDM symbol.

The control channel indicates the method of resource assignment on the downlink transmission channel or uplink transmission channel as follows:

On the control channel, N bits are used to indicate a certain STA about the starting position on the downlink transmission channel, and N bit are used to indicate the STA how many consecutive bits following the starting position are the resources assigned for it. For example, N=9, the control channel indicates the STA about the starting position, and if N bits are 000010000 which means the decimal 16, it is indicated that the starting position of the STA is the 16$^{th}$ OFDM symbol. If the length of the resources is 000100000 which means the decimal 32, it is indicated that the consecutive 32 symbols following such symbol (including such symbol) are assigned to the STA. On the control channel, M bit are used to indicate a certain STA about the starting position on the uplink transmission channel, and further M bits are used to indicate the STA how many consecutive bits following the starting position are the resources assigned for the STA.

Alternatively, the system information channel and the control channel indicate the frame structure jointly, with the example as follows:

In the system information channel, 6 bits are used to indicate the control channel cycle, which is up to 63 OFDM symbols. In the control channel, 9 bits are used to indicate the downlink transmission channel cycle, 9 bits are used to indicate the uplink transmission channel cycle, 1 bit is used to indicate the downlink guard interval DGI, 2 bits are used to indicate the configuration of the uplink sounding channel, 2 bits are used to indicate the configuration of the uplink scheduling request channel, 1 bit is used to indicate the configuration of the uplink random access channel, and 1 bit is used to indicate the uplink guard interval UGI.

In addition, the CAP can also calculate the frame length, and carry the indication information of the frame length on the system information channel or the control channel, so that the STA can directly obtain the frame length information.

The following explains how to carry out resource scheduling according to the demand and explain the configuration of the frame structure based on this in details with the embodiment example 1~5.

Application Example 1

Figure 5:
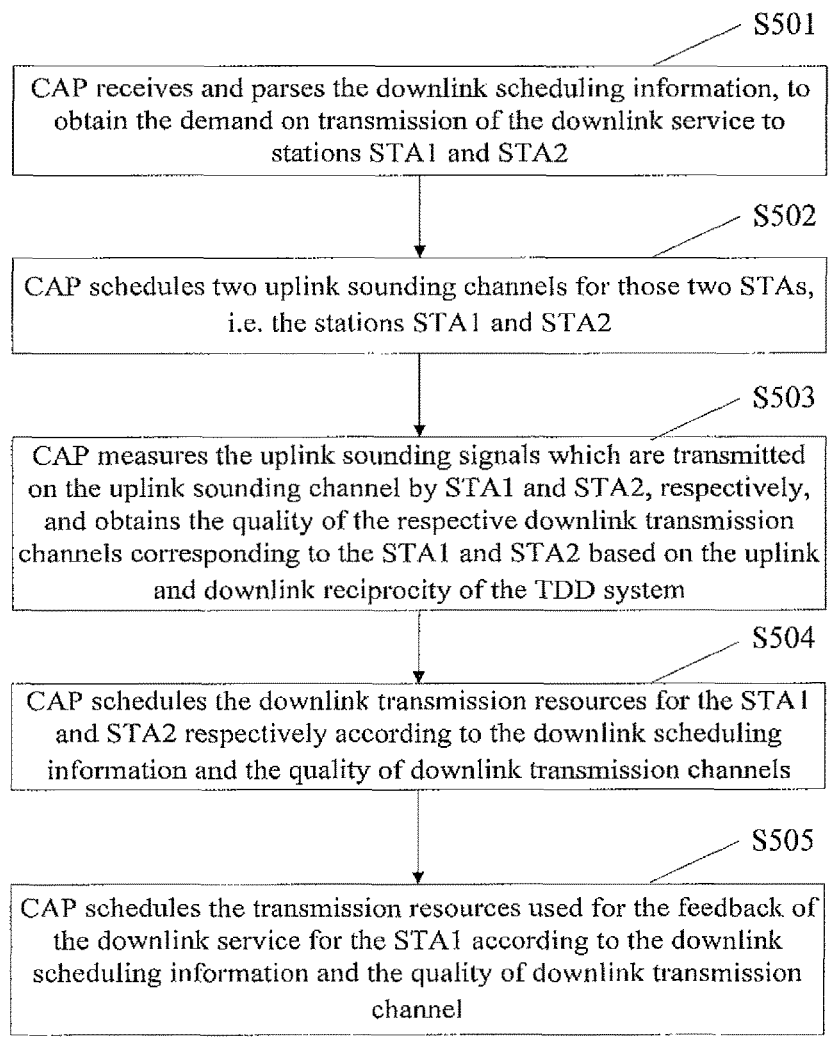
FIG. 5 is the flow chart indicating downlink scheduling method specified in the first application embodiment of the invention.

This application example provides a method for measuring the quality of a downlink channel through the uplink sounding channel based on uplink and downlink reciprocity (i.e. reciprocity between uplink and downlink) of the system to complete the downlink scheduling and transmission process, specifically as shown in FIG. 5, including the following steps:

Step S501: A CAP receives and parses the downlink scheduling information, to obtain the demand on transmission of the downlink service to stations STA1 and STA2.

The demand on transmission of downlink service includes the demand on scheduling of the STAs or different traffic flows of the STAs, for example, services to be scheduled and a queue length, demand on quality of service (QoS) of different services, and service priority. The demand on transmission of downlink service is carried by the downlink scheduling information.

Step S502: the CAP schedules two uplink sounding channels for those two STAs, i.e the stations STA1 and STA2.

Step S503: the CAP measures the uplink sounding signals which are transmitted on the uplink sounding channel by STA1 and STA2, respectively, and obtains the quality of the respective downlink transmission channels corresponding to the STA1 and STA2 based on the uplink and downlink reciprocity of the TDD system;

Step S504: the CAP respectively schedules the downlink transmission resources for the STA1 and STA2 according to the downlink scheduling information and the quality of downlink transmission channels.

Among which, the STA1 and STA2 share the downlink transmission resources through the combination of the time-division multiplexing method.

Step S505: the CAP schedules the transmission resources used for the feedback of the downlink service for the STA2 according to the downlink scheduling information and the quality of downlink transmission channel.

The downlink transmission of the STA2 in the Nth frame is not fed back with the ACK2 signaling in the uplink transmission of the same frame, the reason for this may be that: (1) the downlink transmission of the STA2 in the Nth frame is fed back in the (N+k)th frame; or (2) the downlink service of the STA2 does not need for feedback of ACK signaling.

The CAP configures the frame structure matching the scheduled transmission resources. The STA obtains the frame structure through parsing the system information channel and obtains the particular assignment situation of the transmission resources through parsing the control channel.

Figure 6:
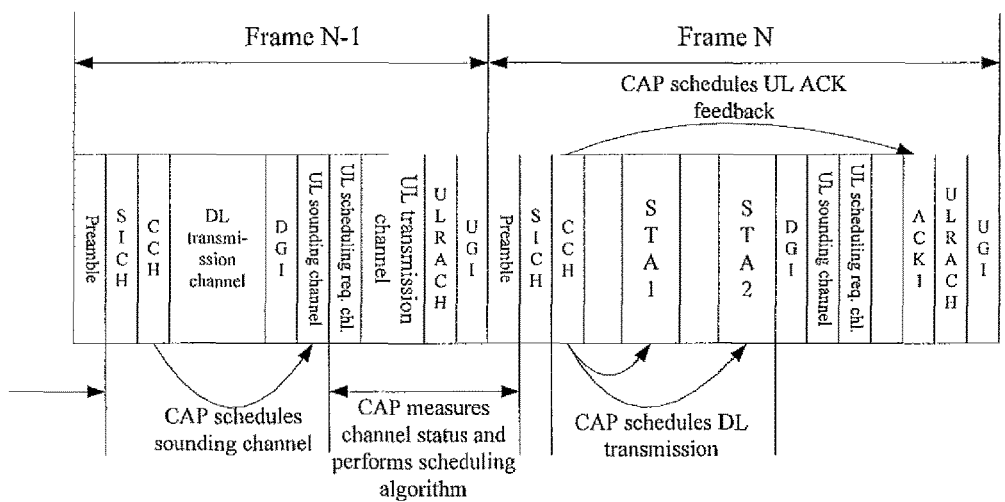
FIG. 6 is a schematic diagram indicating downlink scheduling process specified in the first application embodiment of the invention.

To explain the resource scheduling process of the application examples in the present invention more vividly, reference is made to FIG. 6, where the resource scheduling process for the downlink service transmission is completed through two frames and the frame structure is dynamically configured according to the scheduled resources.

Application Example 2

Figure 7:
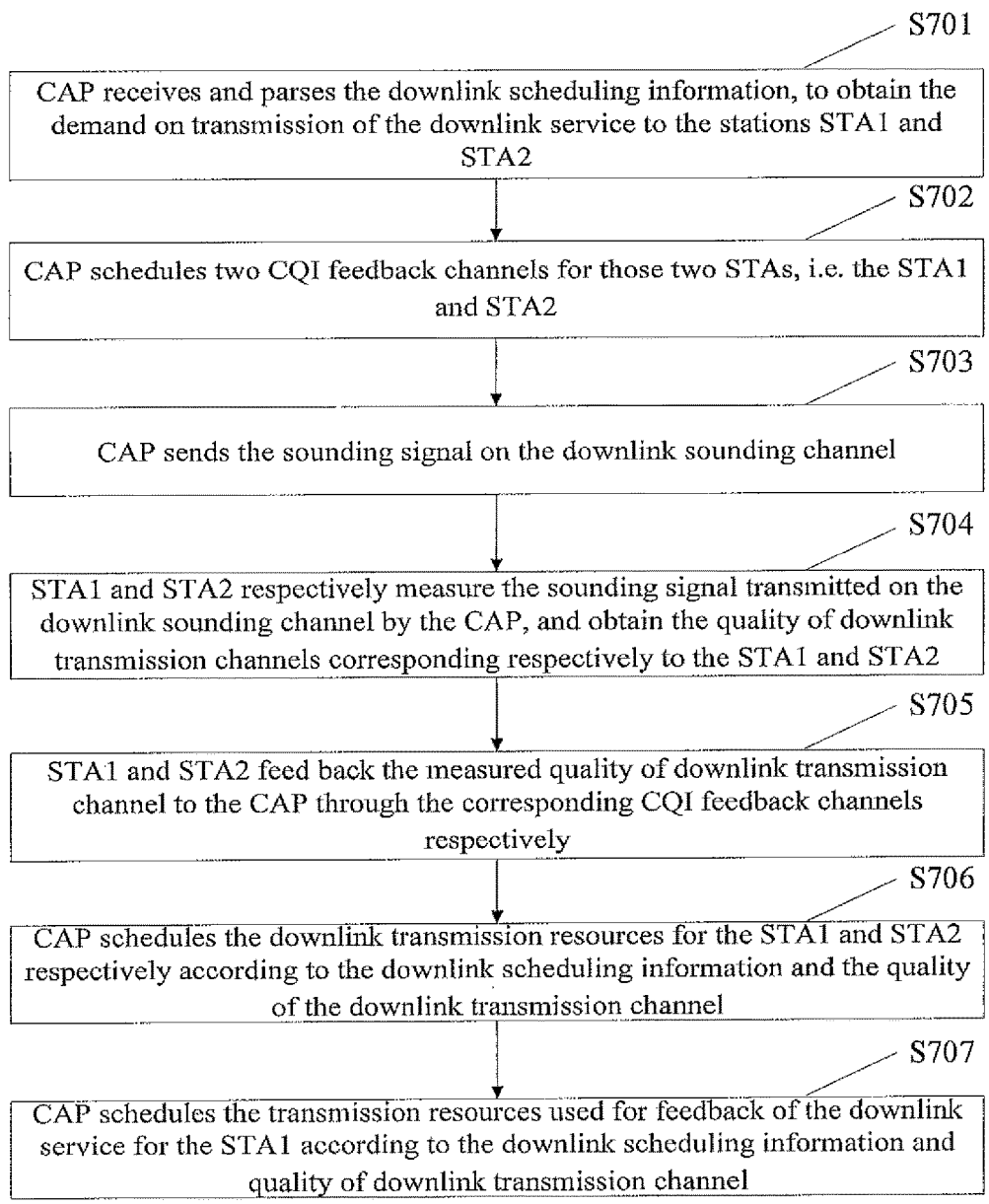
FIG. 7 is the flow chart indicating downlink scheduling method specified in the second application embodiment of the invention.

This application example provides a case where the quality information of the channel is measured by the STA and fed back to the CAP, and the CAP completes the uplink scheduling and transmission process according to the quality information of the channel as fed back, specifically shown in FIG. 7, including the following steps:

Step S701: The CAP receives and parses the downlink scheduling information, to obtain the demand on transmission of the downlink service to the stations STA1 and STA2.

The demand on transmission of downlink service includes the demand on scheduling of the STAs or different traffic flows of the STAs, for example, services to be scheduled and a queue length, a demand on QoS of different services, and a service priority. The demand on transmission of downlink service is carried by the downlink scheduling information.

Step S702: the CAP schedules two CQI feedback channels for those two STAs, i.e. the STA1 and STA2.

Step S703: the CAP sends the sounding signal on the downlink sounding channel.

Step S704: the STA1 and STA2 respectively measure the sounding signal transmitted on the downlink sounding channel by the CAP, and obtain the quality of downlink transmission channels corresponding respectively to the STA1 and STA2.

Step S705: the STA1 and STA2 feed back the measured quality of downlink transmission channel to the CAP through the corresponding CQI feedback channels respectively.

Step S706: the CAP schedules the downlink transmission resources for the STA1 and STA2 respectively according to the downlink scheduling information and the quality of the downlink transmission channel.

Step S707: the CAP schedules the transmission resources used for feedback of the downlink service for the STA1 according to the downlink scheduling information and quality of downlink transmission channel.

The downlink transmission of the STA2 in the Nth frame is not fed back with the ACK2 signaling in the uplink transmission of the same frame, the reason for this may be that: (1) the downlink transmission of the STA2 in the Nth frame is fed back in the (N+k)th frame; or (2) the downlink service of the STA2 does not need for feedback of ACK signaling.

The CAP configures the frame structure matching the scheduled transmission resources. The STA obtains the frame structure through parsing the system information channel and obtains the particular assignment situation of the transmission resources through parsing the control channel.

Figure 8:
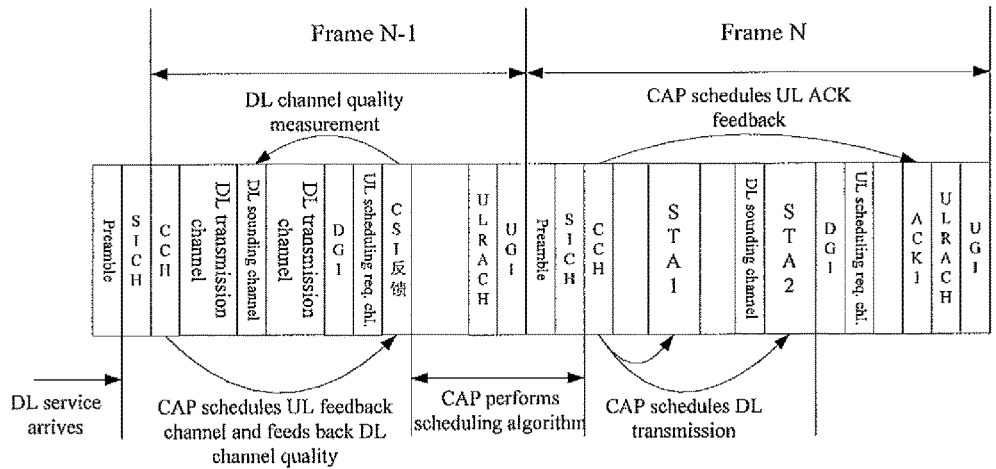
FIG. 8 is a schematic diagram indicating downlink scheduling process specified in the second application embodiment of the invention.

To explain the resource scheduling process of the application example in the present invention more vividly, reference is made to FIG. 8, where the resource scheduling process for the downlink service transmission is completed through two frames and the frame structure is dynamically configured according to the scheduled resources.

In the Application Example 1, considering obtaining of the quality of the downlink transmission channel through the reciprocity between TDD uplink and downlink channels, the uplink sounding channel is needed. While in Application Example 2, the STA measures the downlink sounding channel and feeds back the quality of the channel to the CAP, therefore, the uplink sounding channel is not needed any more. What kind of feedback mode is determined by the CAP scheduler according to the STA capability and the system configuration. The channels configured in the frame structure can self-adapt to the changes with the transmission demand, also better self-adapt and adjust with the time selective fading of wireless channel.

Application Example 3

Figure 9:
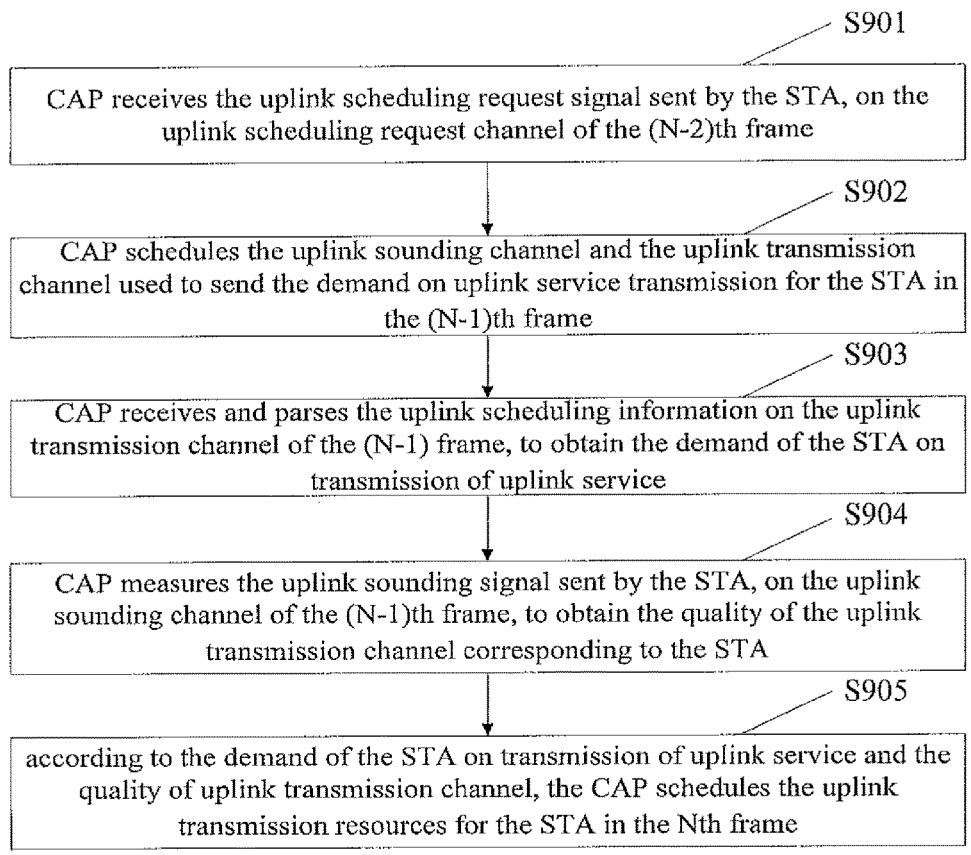
FIG. 9 is the flow chart indicating downlink scheduling method specified in the third application embodiment of the invention.

This application example provides an uplink scheduling and transmission process, as shown in FIG. 9, specifically including the following steps:

Step S901: The CAP receives the uplink scheduling request signal sent by the STA, on the uplink scheduling request channel of the (N−2)th frame.

Step S902: the CAP schedules the uplink sounding channel and the uplink transmission channel used to send the demand on uplink service transmission for the STA in the (N−1)th frame.

Step S903: the CAP receives and parses the uplink scheduling information on the uplink transmission channel of the (N−1) frame, to obtain the demand of the STA on transmission of uplink service.

The demand on transmission of uplink service includes the demand on scheduling of the STAs or different traffic flows of the STA, for example, services to be scheduled and a queue length, a demand on QoS of different services, and a service priority. The demand on transmission of uplink service is carried by the uplink scheduling information.

Step S904: the CAP measures the uplink sounding signal sent by the STA, on the uplink sounding channel of the (N−1)th frame, to obtain the quality of the uplink transmission channel corresponding to the STA.

Step S905: according to the demand of the STA on transmission of uplink service and the quality of uplink transmission channel, the CAP schedules the uplink transmission resources for the STA in the Nth frame.

The CAP configures the frame structure matching the scheduled transmission resources. The STA obtains the frame structure through parsing the system information channel and obtains the particular assignment situation of the transmission resources through parsing the control channel.

Figure 10:
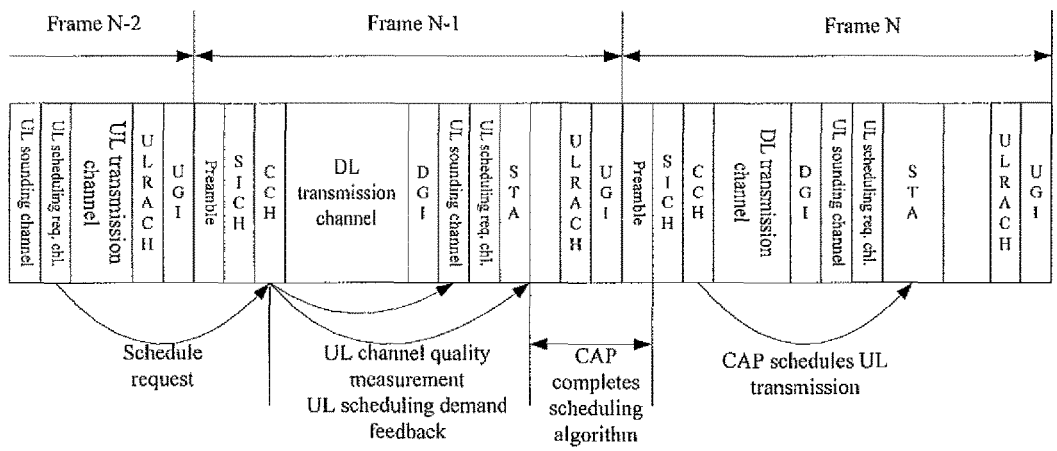
FIG. 10 is a schematic diagram indicating downlink scheduling process specified in the third application embodiment of the invention.

To explain the resource scheduling process of the embodiment examples in the present invention more vividly, reference is made to FIG. 10, where the resource scheduling process for the uplink service transmission is completed through three frames and the frame structure is dynamically configured according to the scheduled resources.

Application Example 4

Figure 11:
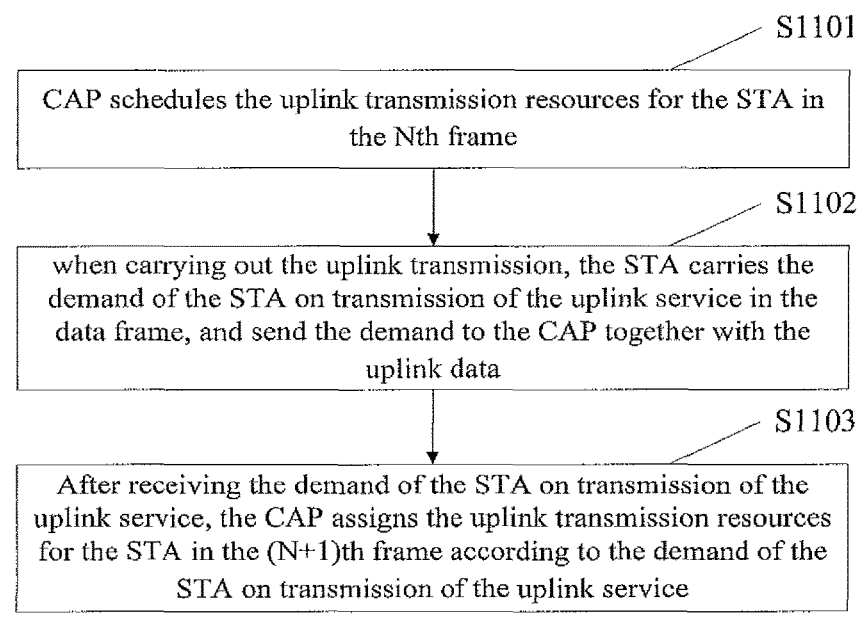
FIG. 11 is the flow chart indicating downlink scheduling method specified in the fourth application embodiment of the invention.

This application example provides another uplink scheduling and transmission process, as shown in FIG. 11, specifically including the following steps:

Step S1101: The CAP schedules the uplink transmission resources for the STA in the Nth frame.

Step S1102: when carrying out the uplink transmission, the STA carries the demand of the STA on transmission of the uplink service in the data frame, and send the demand to the CAP together with the uplink data.

Step S1103: After receiving the demand of the STA on transmission of the uplink service, the CAP assigns the uplink transmission resources for the STA in the (N+1)th frame according to the demand of the STA on transmission of the uplink service.

The CAP configures the frame structure matching the scheduled transmission resources. STA obtains the frame structure through parsing the system information channel and obtains the particular assignment situation of transmission resources through parsing the control channel.

Figure 12:
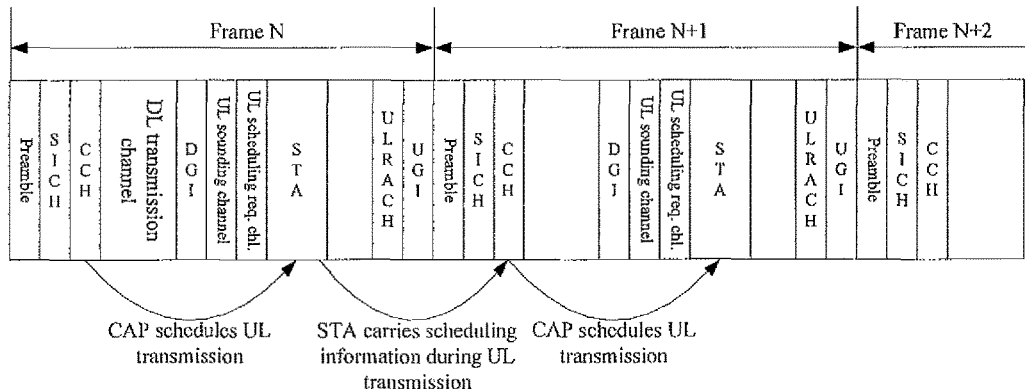
FIG. 12 is a schematic diagram indicating downlink scheduling process specified in the fourth application embodiment of the invention.

To explain the resource scheduling process of the embodiment examples in the present invention more vividly, reference is made to FIG. 12, where the resource scheduling process for the uplink service transmission is completed through two frames and the frame structure is dynamically configured according to the scheduled resources.

Application Example 5

Figure 13:
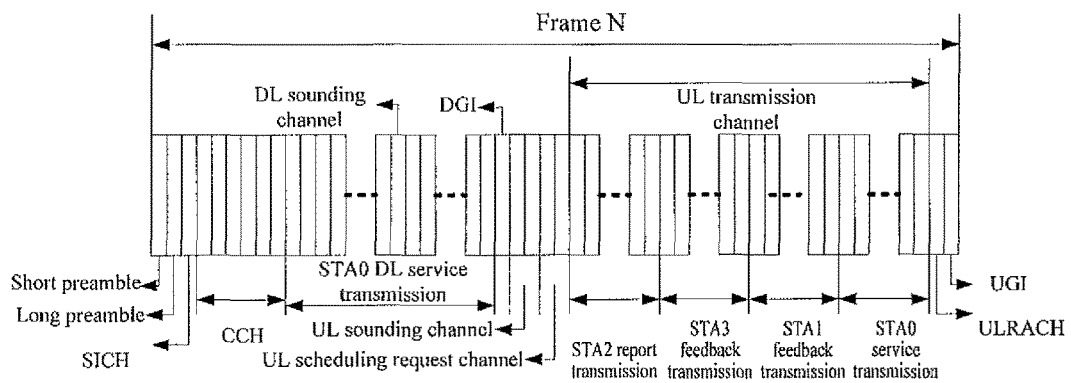
FIG. 13 is a schematic diagram indicating uplink and downlink scheduling transmission process specified in the fifth application embodiment of the invention.

FIG. 13 is the diagram of the system frame structure in an uplink and downlink scheduling transmission process provided by this embodiment example.

As shown in FIG. 13, the frame is divided into a preamble sequence, a system information channel, a control channel, a downlink service transmission channel, a downlink guard interval DGI, an uplink sounding channel, an uplink scheduling request channel, an uplink service transmission channel, an uplink random access channel and an uplink guard interval UGI.

Among which, the preamble sequence specifically includes a short preamble and a long preamble.

A certain CAP may is related to four STAs, i.e. STA0, STA1, STA2 and STA3.

In the (N−1)th frame, the STA0 carries out the uplink and downlink service transmission, but there is still packets queuing in the downlink transmission queue for each service of the STA0 and waiting for being scheduled; in the uplink service transmission, the STA0 carries upwards the number of packets waiting for scheduling in the uplink queue of each service of the STA0 after the end of the (N−1)th frame. To ensure the efficient downlink scheduling of the Nth frame, the CAP schedules the STA0 to feed back the quality of the downlink channel through the uplink transmission channel in the (N−1)th frame; to ensure the efficient uplink scheduling of the Nth frame, the CAP schedules, via the (N−1)th frame, the STA0 to transmit the uplink sounding signal on the uplink sounding channel 1, so that the CAP can measure the quality of uplink channel. In the (N−1)th frame, a new downlink service for the STA1 arrives and waits for being scheduled. The STA2 completes the random access process in the (N−1)th frame and waits for being scheduled, and the transmission capability and equipment configuration of the STA2 are reported to the CAP. The STA3 successfully initiates the uplink scheduling request on the uplink scheduling request channel of the (N−1)th frame.

In the Nth frame, during the downlink transmission process, the CAP schedules the downlink 384 OFDM symbols for the downlink service transmission for the STA0 according to the downlink transmission queue information of the STA0 and the quality of downlink transmission channel fed back in the (N−1)th frame. Since only the STA0 has a demand on the service transmission, 384 OFDM symbols in total are assigned for the downlink transmission channel in this frame, in which the OFDM symbols 1 to 384 are used by the CAP to transmit the downlink service to the STA0. To facilitate the CAP to downlink schedule the STA1 in the subsequent frames, the CAP initiates the downlink sounding signal and schedules the STA1 to feed back the status information of the channel in the uplink transmission process. Therefore, one OFDM symbol is configured for the downlink sounding channel in this frame.

In the Nth frame, during the uplink transmission process, according to the uplink transmission queue information fed back by the STA0 and the quality of uplink transmission channel measured by the CAP according to the uplink sounding channel 1, the CAP schedules 128 uplink OFDM symbols for the STA0 to be used for uplink service transmission. The CAP assigns 16 OFDM symbols for the STA2 to report the transmission capability and equipment configuration of the STA2. The CAP assigns 16 OFDM symbols for the STA3 to report the uplink scheduling channel. The STA2 and STA3 use the determined modulation coding format for feedback transmission, and the CAP does not need to consider the quality of the uplink transmission channel to assign the transmission format for the STA2 and STA3. After the transmission of the current frame ends, the STA0 has no more downlink service for transmission; therefore, the STA0 does not need to feed back the quality of downlink channel. However, the CAP estimates that the STA0 still has the uplink service waiting for transmission, and therefore schedules the STA0 to transmit the uplink sounding signal through the uplink sounding channel 1. At the same time, the CAP schedules the STA3 to transmit the uplink sounding signal on the uplink sounding channel 2, for the sake of scheduling the STA3 to conduct uplink transmission in the N+1 frame. In addition, the CAP assigns 64 OFDM symbols for the STA1 to feed back the quality of uplink channel. In conclusion, 128+16+16+64=224 OFDM symbols in total are required for the uplink sounding channel. Among which, OFDM symbols 1 to 16 are used by the STA2 to report the equipment capability; OFDM symbols 17 to 32 are used by the STA3 to feed back the uplink scheduling information; OFDM symbols 33 to 96 are used by the STA1 to feed back the quality of downlink channel; and OFDM symbols 98 to 224 are used by the STA0 for the uplink transmission. In addition, 2 uplink sounding channels are needed in the current frame, Since it is unknown whether another STA will initiate an uplink service scheduling request, 2 OFDM symbols are reserved for the uplink scheduling request channel; since it is unknown whether there will be a new STA to initiate the random access, 1 OFDM symbol is reserved for the uplink random access.

The CAP calculates the demands of control channel: 2 control sub-channels in total are required for the downlink scheduling transmission and the feedback of the ACK/NACK signaling for the STAID uplink transmission in the N−1 frames; the uplink scheduling transmission needs 6 control sub-channels, which are respectively used for scheduling of the STA0, STA1, STA2 and STA3 uplink transmission channels, as well as assignment of the STA0 and STA3 uplink sounding channels. In conclusion, the frame needs 6 OFDM symbols in total for the control channel transmission.

Based on the above scheduling, the frame configuration information of the Nth frame is as follows: 6 OFDM symbols are used for control channel transmission, 384 OFDM symbols are used for downlink service transmission, 1 OFDM symbol is used for downlink sounding channel transmission (downlink sounding channel position fixing), 2 OFDM symbols are used for the uplink sounding channel transmission, 2 OFDM symbols are used for the uplink scheduling request channel, 224 OFDM symbols are used for the uplink transmission channel, and 1 OFDM symbol is used for the uplink random access channel. In addition, considering that one OFDM symbol is allocated for each of the inherent short preamble, long preamble and system information channel of the system, and one OFDM symbol is allocated for each of the downlink to uplink guard interval DGI and the uplink to downlink guard interval UGI, the current frame includes totally 3+6+384+1+1+2+2+224+1+1=625 OFDM symbols.

Based on the above process, after receiving the communication frame, the STA0, STA1, STA2, and STA3 obtain, through the detection of broadcast information of the system information channel, the information that 6 OFDM symbols are included in the control channel cycle, 384 OFDM symbols are included in the downlink transmission channel cycle, 1 OFDM symbol is included in the DGI cycle, 1 OFDM symbol is included in the downlink sounding channel cycle, 2 OFDM symbols are included in the uplink sounding channel cycle, 2 OFDM symbols are included in the scheduling request channel cycle, 224 OFDM symbols are included in the uplink transmission channel cycle, 1 OFDM symbol is included in the random access channel and 1 OFDM symbol is included in the UGI cycle can be obtained, and then determines the frame length of the Nth frame by summing up the 2 OFDM symbols of the preamble sequence channel cycle (1 OFDM symbol for the short training sequence, and 1 OFDM symbol for long training sequence), 1 OFDM symbol of the system information channel cycle, the control channel cycle, the downlink transmission channel cycle, the downlink sounding channel cycle, the DGI cycle, the uplink sounding channel cycle, the scheduling request channel cycle, the uplink transmission cycle, the random access channel cycle and the UGI cycle, that is, 3+6+384+1+1+2+2+224+1+1=625 OFDM symbols.

With the method, system and device in the present invention, through the dynamic configuration of the frame structure and the uplink and downlink scheduling, it is possible to realize the dynamic division of the uplink and downlink wireless resources based on the service demand, and better adapt to the future demand on data services of abundant types and different characteristics. At the same time, the system is able to provide a small resource granularity, not only to adapt to the significant change in demand on the service rate of different terminals, but also to better adapt to the dynamic change in the wireless channel. In general, such system is able to balance between the service demand and the channel characteristics, dynamically divide the uplink and downlink resources, and assign the wireless resources dynamically for different terminals considering the link self-adaptation.

The Second Embodiment

Figure 14:
FIG. 14 is a equipment block diagram indicating a resource scheduling device specified in the second embodiment of the invention.

To realize the resource scheduling method provided in the first embodiment, the second embodiment of the present invention also provides a resource scheduling device, as shown in FIG. 14, including:

a scheduling module 1401 used to carry out resource scheduling according to a transmission demand; and a configuration module 1402, which is used to configure a frame structure which has an unfixed frame length and matches with scheduled resources.

The configuration module 1402 is used to configure at least the preamble sequence and the system information channel in the frame structure. The preamble sequence is used to realize the synchronization; and the system information channel is used to carry the information indicating the frame structure.

Further, the configuration module 1402 schedules the uplink transmission resources according to the demand on uplink transmission, to configure the uplink transmission channel in the frame structure; and further schedules the downlink transmission resources according to the demand on downlink transmission, to configure the downlink transmission channel in the frame structure.

Further, the demand on uplink transmission includes one or more of the demand on transmission of the uplink service, the demand on transmission of the uplink signaling and the demand on feedback of the downlink service. Correspondingly, the uplink transmission channel configured by the configuration module 1402 includes one or more of the uplink service transmission channel, the uplink signaling channel and the downlink service feedback channel.

Further, the demand on downlink transmission includes one or more of the demand on transmission of the downlink service, the demand on transmission of the downlink signaling and the demand on feedback of the uplink service. Correspondingly, the downlink transmission channel configured by the configuration module 1402 includes one or more of the downlink service transmission channel, the downlink signaling channel and the uplink service feedback channel.

Further, the configuration module 1402 is adapted to, when there is the demand on uplink transmission, configure an uplink sounding channel in the frame structure, and the uplink sounding channel is used by the STA to send the uplink sounding signal to the CAP; the scheduling module 1401 is used to, when scheduling the uplink transmission resources according to the demand on uplink transmission, measure the uplink sounding signal on the uplink sounding channel to obtain the uplink channel quality information CQI, and schedule the uplink transmission resources in combination with the measured uplink CQI.

Further, the configuration module 1402 is adapted to, when there is the demand on uplink transmission, configure the downlink sounding channel and CQI feedback channel in the frame structure. The downlink sounding channel is used by the CAP to send the downlink sounding signal to the STA, and the CQI feedback channel is used by the STA to feed back the downlink CQI measured by the downlink sounding signal to the CAP; the scheduling module 1401 is adapted to, when scheduling the uplink transmission resources according to the demand on uplink transmission, determine the uplink CQI according to the downlink CQI fed back by the STA based on the uplink and downlink reciprocity, and schedule the uplink transmission resources in combination with the measured uplink CQI.

Further, the configuration module 1402 is adapted to, when there is the demand on uplink transmission, configure an uplink sounding channel in the frame structure, and the uplink sounding channel is used by the STA to send the uplink sounding signal to the CAP; the scheduling module 1401 is used to, when scheduling the uplink transmission resources according to the demand on uplink transmission, measure the uplink sounding signal on the uplink sounding channel to obtain the uplink channel quality information CQI and the uplink channel state information CSI, and schedule the uplink transmission resources in combination with the measured uplink CQI and the uplink CSI.

Further, the configuration module 1402 is adapted to, when there is the demand on uplink transmission; configure the downlink sounding channel, CQI feedback channel and CSI feedback channel in the frame structure. The downlink sounding channel is used by the CAP to send the downlink sounding signal to the STA, the CQI feedback channel is used by the STA to feed back the downlink CQI measured by the downlink sounding signal to the CAP and the CSI feedback channel is used by the STA to feed back the downlink CSI measured by the downlink sounding signal to the CAP; the scheduling module 1401 is adapted to, when scheduling the uplink transmission resources according to the demand on uplink transmission, determine the uplink CQI according to the downlink CQI fed back by the STA and determine the uplink CSI according to the downlink CSI fed back by the STA based on the uplink and downlink reciprocity, and schedule the uplink transmission resources in combination with the measured uplink CQI and the uplink CSI.

Further, the configuration module 1402 is adapted to, when there is the demand on uplink transmission, configure the uplink sounding channel, downlink sounding channel and CQI feedback channel in the frame structure, where the uplink sounding channel is used by the STA to send the uplink sounding signal to the CAP, the downlink sounding channel is used by the CAP to send the downlink sounding signal to the STA, and the CQI feedback channel is used by the STA to feed back the downlink CQI measured by the downlink sounding signal to the CAP. The scheduling module 1401 is used to, when scheduling the uplink transmission resources according to the demand on uplink transmission, measure the uplink sounding signal on the uplink sounding channel to obtain the uplink channel quality information CSI, determine the uplink CQI according to the downlink CQI fed back by the STA based on the uplink and downlink reciprocity, and schedule the uplink transmission resources in combination with the uplink CQI and uplink CSI.

Further, the configuration module 1402 is adapted to, when there is the demand on uplink transmission, configure the uplink sounding channel, downlink sounding channel and CSI feedback channel in the frame structure, where the uplink sounding channel is used by the STA to send the uplink sounding signal to the CAP, the downlink sounding channel is used by the CAP to send the downlink sounding signal to the STA, and the CSI feedback channel is used by the STA to feed back the downlink CSI measured by the downlink sounding signal to the CAP. The scheduling module 1401 is used to, when scheduling the uplink transmission resources according to the demand on uplink transmission, measure the uplink sounding signal on the uplink sounding channel to obtain the uplink channel quality information CQI, determine the uplink CSI according to the downlink CSI fed back by the STA based on the uplink and downlink reciprocity, and schedule the uplink transmission resources in combination with the uplink CQI and uplink CSI.

Further, the configuration module 1402 is adapted to, when there is the demand on downlink transmission, configure the uplink sounding channel in the frame structure, used by the STA to send the uplink sounding signal to the CAP. The scheduling module 1401 is used to, when scheduling the downlink transmission resources according to the demand on downlink transmission, measure the uplink sounding signal on the uplink sounding channel to obtain the downlink CQI, based on the uplink and downlink reciprocity, and schedule the downlink transmission resources in combination with the downlink CQI.

Further, the configuration module 1402 is adapted to, when there is the demand on downlink transmission, configure the uplink sounding channel in the frame structure, used by the STA to send the uplink sounding signal to the CAP. The scheduling module 1401 is used to, when scheduling the downlink transmission resources according to the demand on downlink transmission, measure the uplink sounding signal on the uplink sounding channel to obtain the downlink CQI and the downlink CSI based on the uplink and downlink reciprocity, and schedule the downlink transmission resources in combination with the downlink CQI and the downlink CSI.

Further, the configuration module 1402 is adapted to, when there is the demand on downlink transmission, configure downlink sounding channel and CQI feedback channel in the frame structure, where the downlink sounding channel is used by the CAP to send the downlink sounding signal to the STA, and the CQI feedback channel is used by the STA to feed back the downlink CQI measured by the downlink sounding signal to the CAP. The scheduling module 1401 is used to, when scheduling the downlink transmission resources according to the demand on downlink transmission, schedule resources according to the downlink CQI fed back by the STA.

Further, the configuration module 1402 is adapted to, when there is the demand on downlink transmission, configure the downlink sounding channel, CQI feedback channel and CSI feedback channel in the frame structure, where the downlink sounding channel is used by the CAP to send the downlink sounding signal to the STA, the CQI feedback channel is used by the STA to feed back the downlink CQI measured by the downlink sounding signal to the CAP and the CSI feedback channel is used by the STA to feed back the downlink CSI measured by the downlink sounding signal to the CAP. The scheduling module 1401 is used to, when scheduling the downlink transmission resources according to the demand on downlink transmission, schedule the downlink transmission resources according to the downlink CQI and the downlink CSI fed back by the STA Further, the configuration module 1402 is adapted to, when there is the demand on downlink transmission, configure the uplink sounding channel, downlink sounding channel and CQI feedback channel in the frame structure, where the uplink sounding channel is used by the STA to send the uplink sounding signal to the CAP, the downlink sounding channel is used by the CAP to send the downlink sounding signal to the STA, and the CQI feedback channel is used by the STA to feed back the downlink CQI measured by the downlink sounding signal to the CAP. The scheduling module 1401 is used to, when scheduling the downlink transmission resources according to the demand on downlink transmission, measure the uplink sounding signal on the uplink sounding channel to obtain the downlink CSI based on the uplink and downlink reciprocity, and schedule the downlink transmission resources in combination with the downlink CQI fed by STA and the downlink CSI.

Among which, the CQI includes one or more of the SNR, SINR and modulation coding set of the transmission channel, the rank of a transmission channel matrix, and a pre-coded matrix set.

Among which, the CSI includes at least one of the transmission channel matrix H, a V matrix obtained from the SVD decomposition of the transmission channel matrix H, and the compression information of such V matrix.

Further, the configuration module 1402 is adapted to configure the uplink scheduling request channel in the frame structure, and the uplink scheduling request channel is used by the STA to send the uplink scheduling request, to request for the transmission resources required for reporting the demand on uplink transmission to the CAP.

Further, the scheduling module 1401 schedules the exclusive uplink transmission resources for the STA, so that the STA initiates the uplink scheduling with a non-competitive manner; or schedule the shared uplink transmission resources for the STA, so that the STA initiates the uplink scheduling with a competitive manner.

Further, the configuration module 1402 is adapted to configure the random access channel in the frame structure, and the random access channel is used by the STA to access CAP, to establish the relation with the CAP.

Further, the configuration module 1402 is adapted to configure the control channel in the frame structure, and the control channel is used to carry the description information of one or more of the uplink transmission channel, the downlink transmission channel, the uplink sounding channel, the downlink sounding channel, the CQI feedback channel, the CSI feedback channel, the uplink scheduling request channel and the random access channel.

Among which, the control channel is composed of the scheduling signaling, and the description information is carried in the scheduling signaling.

Further, when the frame structure is provided with the channels for the uplink transmission and the downlink transmission, the configuration module 1402 is adapted to configure the guard interval between the channel for the uplink transmission and the channel for downlink transmission.

Further, the scheduling module 1401 carries out resource scheduling using one or more of resource assignment methods based on the time division, frequency division, code division and space division.

Further, the system information channel and the control channel configured by the configuration module 1402 are based on time-division multiplexing, frequency-division multiplexing, code division multiplexing, frequency division and time division combined multiplexing, or code division and time division combined multiplexing.

Further, the uplink transmission channel, uplink scheduling request channel and uplink random access channel configured by the configuration module 1402 use time-division multiplexing, frequency-division multiplexing, frequency division and time division combined multiplexing, or code division and time division combined multiplexing.

Further, the frame length does not exceed the preset threshold.

A Third Embodiment

Based on the above resource scheduling method in the present invention, a solution of dynamically configuring the frame structure according to the transmission demand is provided, to better adapt to the future demand on the uplink and downlink transmission of various types of data services with different characteristics dynamically. At the same time, the inventive system offers a very small resource granularity, not only to adapt to the relatively significant change in demands on service rate of different terminals, but also to better adapt to the dynamic change in the wireless channel. The detailed introduction is made below.

Figure 15:
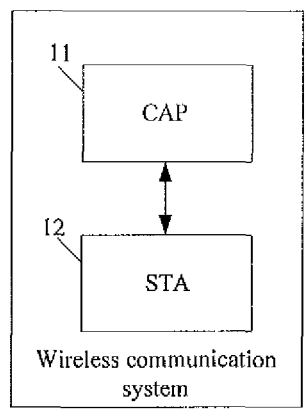
FIG. 15 is a structural diagram indicating the wireless communication system specified in the third embodiment of the invention.

FIG. 15 is the structural diagram of the system of the embodiment in the present invention, and such system includes:

a CAP 151, which determines the structure of current physical frame according to the scheduled transmission resources, and sends information indicating the structure of the current physical frame in the current physical frame; and, at least one STA 152 which is in communication with the CAP 151 and used to determine the structure of current physical frame according to the information indicating the structure of the current physical frame in the current physical frame.

Here, each physical frame has a length which is determined by its structure and not fixed.

Figure 16:
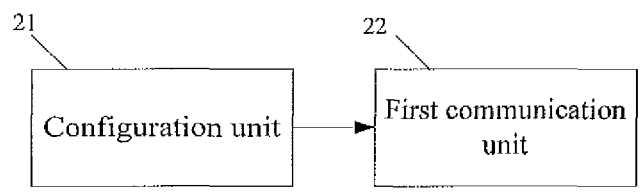
FIG. 16 is a structural diagram indicating the network device specified in the third embodiment of the invention.

FIG. 16 is the structural diagram of a network equipment in the embodiment of the present invention, and the network equipment includes a configuration unit 161 and a first communication unit 162.

The configuration unit 161 is used to determine the structure of the current physical frame according to the scheduled transmission resources.

The first communication unit 162 is used to send the information indicating the structure of the current physical frame in the current physical frame, and communicate with at least one terminal device.

Each physical frame has a length which is determined by its structure and not fixed.

In an alternative embodiment, in the current physical frame, the configuration unit 161 configures the preamble sequence for synchronization and the system information channel for sending the information indicating the structure of the current physical frame.

Correspondingly, the first communication unit 162 sends the preamble sequence, and sends the information indicating the structure of the current physical frame on the system information channel.

In another alternative embodiment, in the current physical frame, the configuration unit 161 configures the preamble sequence for synchronization and the system information channel for sending the information indicating the structure of the current physical frame, and configures at least one of the multiple channels of the current physical frame selectively.

The above multiple channels may be composed as follow.

1) The above multiple channels include: a first downlink transmission channel used for transmission of the downlink service and/or downlink signaling and/or uplink signaling feedback; the downlink sounding channel used for transmission of the downlink sounding signal; and a second downlink transmission channel used for transmission of the downlink service and/or downlink signaling and/or uplink service feedback.

Based on this, correspondingly, the first communication unit 162 sends the preamble sequence, sends the information indicating the structure of the current physical frame on the system information channel, and carries out correlated transmission on the selectively configured channel.

Based on this, the configuration unit 161 determines the structure of the current physical frame by configuring the control channel for the current physical frame, which is used for transmitting information indicating the assignment and scheduling of transmission resources and the transmission format of the channel occupying the transmission resources. Correspondingly, the first communication unit 162 is used to: send the preamble sequence, to send the information indicating the structure of the current physical frame on the system information channel; send the information indicating the assignment and scheduling of transmission resources and the transmission format of the channel occupying the transmission resources on the control channel; and carry out correlated transmission on the selectively configured channel. Alternatively, the first communication unit 162 is used to: send the preamble sequence; send a part of the information indicating the structure of the current physical frame on system information channel, with the part of information including at least the duration of the control channel, and send the other part of the information indicating the structure of the current physical frame on the control channel; send the information indicating the assignment and scheduling of transmission resources and the transmission format of the channel occupying the transmission resources on the control channel; and carry out correlated transmission on the selectively configured channel.

1) The above multiple channels include: the uplink sounding channel used for transmission of the uplink sounding signal; the uplink scheduling request channel used for transmission of the uplink scheduling request; the uplink transmission channel used for transmission of the uplink service, and/or uplink signaling, and/or downlink signaling feedback, and/or the downlink CQI feedback, and/or the downlink CST feedback; and, uplink random access channel used for transmission of the uplink random access request.

The above multiple channels include: the uplink sounding channel used for transmission of the uplink sounding signal; the uplink scheduling request channel used for transmission of the uplink scheduling request; the uplink transmission channel used for transmission of the uplink service, and/or uplink signaling, and/or downlink signaling feedback; CQI feedback channel used for transmission of the downlink CQI feedback; CSI feedback channel used for transmission of the downlink CSI feedback; and, uplink random access channel used for transmission of the uplink random access request.

Based on this, correspondingly, the first communication unit 162 sends the preamble sequence, sends the information indicating the structure of the current physical frame, and carries out correlated reception on the selectively configured channel.

Based on this, the configuration unit 161 determines the structure of the current physical frame by configuring the control channel for the current physical frame, which is used for transmitting information indicating the assignment and scheduling of transmission resources and the transmission format of the channel occupying the transmission resources. Correspondingly, the first communication unit 162 is used to: send the preamble sequence, to send the information indicating the structure of the current physical frame on the system information channel; send the information indicating the assignment and scheduling of transmission resources and the transmission format of the channel occupying the transmission resources on the control channel; and carry out correlated reception on the selectively configured channel. Alternatively, the first communication unit 162 is used to: send the preamble sequence; send a part of the information indicating the structure of the current physical frame on system information channel, with the part of information including at least the duration of the control channel, and send the other part of the information indicating the structure of the current physical frame on the control channel; send the information indicating the assignment and scheduling of transmission resources and the transmission format of the channel occupying the transmission resources on the control channel; and carry out correlated reception on the selectively configured channel.

Figure 17:
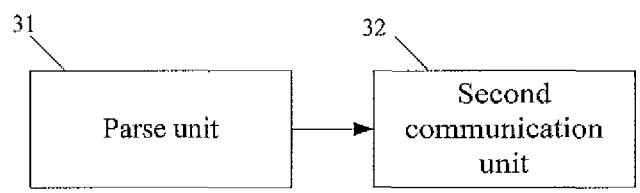
FIG. 17 is a structural diagram indicating the terminal device specified in the third embodiment of the invention.

FIG. 17 is the structural diagram of the terminal device of the embodiment in the present invention, and such terminal device includes a parse unit 171 and a second communication unit 172.

The parse unit 171 parses the information indicating the structure of the current physical frame in the current physical frame, and determines the structure of current physical frame.

The second communication unit 172 is adapted to communicate with the network equipment in the current physical frame.

Among which, each indicated physical frame has a length which is determined by its structure and not fixed.

In an alternative embodiment, the current physical frame is composed of the preamble sequence and the system information channel carrying the information indicating the structure of the current physical frame.

Based on this, correspondingly, the second communication unit 172 receives the preamble sequence and receives the information indicating the structure of the current physical frame on the system information channel.

In another alternative embodiment, the current physical frame includes the preamble sequence, the system information channel carrying the information indicating the structure of the current physical frame, and at least one of the selectively configured channels.

the selectively configured channels may be composed as follow:

1) The above selectively configured channels include: the uplink sounding channel used for transmission of the uplink sounding signal; the uplink scheduling request channel used for transmission of the uplink scheduling request; the uplink transmission channel used for transmission of the uplink service, and/or uplink signaling, and/or downlink signaling feedback, and/or the downlink CQI feedback, and/or the downlink CSI feedback; and, uplink random access channel used for transmission of the uplink random access request.

The above selectively configured channels include: the uplink sounding channel used for transmission of the uplink sounding signal; the uplink scheduling request channel used for transmission of the uplink scheduling request; the uplink transmission channel used for transmission of the uplink service, and/or uplink signaling, and/or downlink signaling feedback; CQI feedback channel used for transmission of the downlink CQI feedback; CSI feedback channel used for transmission of the downlink CST feedback; and, uplink random access channel used for transmission of the uplink random access request.

Based on this, the second communication unit 172 receives the preamble sequence, sends the information indicating the structure of the current physical frame, and carries out correlated transmission on the selectively configured channel.

Based on this, the current physical frame further includes: the control channel, which is used for transmitting information indicating the assignment and scheduling of transmission resources and the transmission format of the channel occupying the transmission resources. Correspondingly, the second communication unit 172 is used to: receive the preamble sequence, to receive the information indicating the structure of the current physical frame on the system information channel; receive the information indicating the assignment and scheduling of transmission resources and the transmission format of the channel occupying the transmission resources on the control channel; and carry out correlated transmission on the selectively configured channel. Alternatively, the second communication unit 172 is used to: receive the preamble sequence; receive a part of the information indicating the structure of the current physical frame on system information channel, with the part of information including at least the duration of the control channel, and send the other part of the information indicating the structure of the current physical frame on the control channel; receive the information indicating the assignment and scheduling of transmission resources and the transmission format of the channel occupying the transmission resources on the control channel; and carry out correlated transmission on the selectively configured channel.

2) The above selectively configured channels include: a first downlink transmission channel used for transmission of the downlink service and/or downlink signaling and/or uplink signaling feedback; the downlink sounding channel used for transmission of the downlink sounding signal; and a second downlink transmission channel used for transmission of the downlink service and/or downlink signaling and/or uplink service feedback.

Based on this, correspondingly, the second communication unit 172 receives the preamble sequence, receives the information indicating the structure of the current physical frame on the system information channel, and carries out correlated reception on the selectively configured channel.

Based on this, the current physical frame further includes: the control channel, which is used for transmitting information indicating the assignment and scheduling of transmission resources and the transmission format of the channel occupying the transmission resources. Correspondingly, the second communication unit 172 is used to: receive the preamble sequence, to receive the information indicating the structure of the current physical frame on the system information channel; receive the information indicating the assignment and scheduling of transmission resources and the transmission format of the channel occupying the transmission resources on the control channel; and carry out correlated reception on the selectively configured channel. Alternatively, the second communication unit 172 is used to: receive the preamble sequence; receive a part of the information indicating the structure of the current physical frame on system information channel, with the part of information including at least the duration of the control channel, and send the other part of the information indicating the structure of the current physical frame on the control channel; receive the information indicating the assignment and scheduling of transmission resources and the transmission format of the channel occupying the transmission resources on the control channel; and carry out correlated reception on the selectively configured channel.

Thus, in the embodiment of the present invention, the network device configures the structure of the current physical frame according to the scheduled transmission resources, and sends the information indicating the structure of the current physical frame on the current physical frame, while the terminal device can determine the structure of current physical frame according to the information indicating the structure of the current physical frame.

The description below is made by taking the CAP as the network device and the STA as the terminal device, for example.

In the embodiment of the present invention, a CAP can send the information indicating the structure of the current physical frame through the following two methods.

Method 1: sending the information indicating the structure of the current physical frame on the system information channel.

The information indicating the structure of the current physical frame includes one or more of: information indicating the existence of the channel, information indicating the existence and duration of the channel, and information indicating the duration of the channel.

The STA related to the CAP parses the information indicating the structure of the current physical frame in the system information channel, determines the structure of current physical frame, and obtains the frame length of the current physical frame by summing up the durations of all channel in the current physical frame.

Alternatively, the CAP can also send the frame length information of current physical frame on the system information channel; at this time, the STA related to the CAP can directly determine the frame length of current physical frame, without calculation.

Method 2: sending the information indicating the structure of the current physical frame on the system information channel and the control channel.

The information indicating the structure of the current physical frame includes one or more of: information indicating the existence of the channel, information indicating the existence and duration of the channel, and information indicating the duration of the channel.

The CAP sends a part of the information indicating the structure of the current physical frame on system information channel, and this part of the information indicating the structure of the current physical frame at least includes the duration of the control channel, and the CAP further sends the other part of the information indicating the structure of the current physical frame on the control channel.

The STA related to the CAP parses the information indicating the structure of the current physical frame to determine the structure of current physical frame, and obtain the frame length of the current physical frame by adding the duration of all channels in the current physical frame together.

Further, the CAP can also send the frame length information of the current physical frame on the system information channel, so that the STA related to the CAP can directly obtain the frame length of the current physical frame, without calculation. Alternatively, the CAP can also send the frame length information of the current physical frame on the system information channel and the control channel, so that the STA related to the CAP may obtain the frame length of the current physical frame by adding the two frame lengths sent in the system information channel and the control channel together.

Several specific application examples are given below, by taking an example where the downlink CQI feedback and the downlink CSI feedback are implemented through the uplink transmission channel.

Application Example 6

Figure 18:
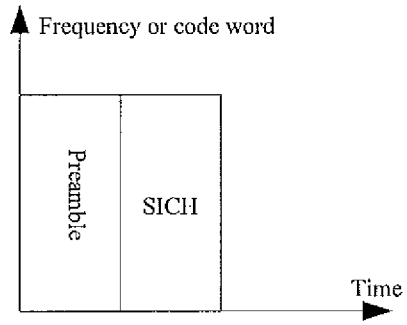
FIG. 18 is a structural diagram indicating physical frame specified in the sixth application embodiment of the invention.

FIG. 18 is the structural diagram of the physical frame of Application Example 6 in the present invention, in which x-coordinate indicates time, and y-coordinate indicates frequency or code word, and the physical frame includes a preamble sequence and a system information channel.

The CAP performs the following operations of: sending the preamble sequence; and sending the information indicating the structure of the current physical frame on the system information channel.

The system information channel in this application example 6 includes the following fields:

(1) a field indicating the duration of the control channel, which indicates the duration of the control channel, the field indicating the duration of the control channel can be 6 bits and indicate up to 63 OFDM symbols, which one OFDM symbol being the minimum unit of resource assignment. For example, such 6 bits may be 010000 which means a decimal 16 and corresponds to 16 OFDM symbols;

(2) a field indicating the duration of the downlink transmission channel, which indicates the duration of a downlink transmission channel, the field indicating the duration of the downlink transmission channel can be 9 bits and indicate up to 511 OFDM symbols. For example, such 9 bits may be 100000000 which means a decimal 256 and corresponds to 256 OFDM symbols;

(3) a field indicating the duration of the uplink transmission channel indicates the duration of an uplink transmission channel, and field indicating the duration of the uplink transmission channel can be 9 bits and indicate up to 511 OFDM symbols.

(4) a downlink sounding channel configuration field indicating the existence or not of the downlink sounding channel. In this application example 6, the duration of a downlink sounding channel is fixed, and the downlink sounding channel configuration field can be 1 bit; when this bit indicates the existence of the downlink sounding channel, it is equivalent to indirectly indicate that the downlink sounding channel has a fixed duration.

(5) an uplink sounding channel configuration field indicating the existence or nor and the duration of the uplink sounding channel. The uplink sounding channel configuration field can be 2 bits, for example, these 2 bits of 00 indicate the non-existence of the uplink sounding channel, these 2 bits of 01 indicate an uplink sounding channel occupying 1 OFDM symbol, these 2 bits of 10 indicate an uplink sounding channel occupying 2 OFDM symbols, and these 2 bits of 11 indicate an uplink sounding channel occupying 4 OFDM symbols.

(6) an uplink scheduling request channel configuration field indicating the existence or not and the duration of the uplink scheduling request channel. The uplink scheduling request channel configuration field can be 2 bit, for example, these 2 bits of 00 indicate the non-existence of an uplink scheduling request channel, these 2 bits of 01 indicate an uplink scheduling request channel occupying 1 OFDM symbol, these 2 bits of 10 indicate an uplink scheduling request channel occupying 2 OFDM symbols, and these 2 bits of 11 indicate an uplink scheduling request channel occupying 4 OFDM symbols.

(7) an uplink random access channel configuration field indicating the existence or not of the uplink random access channel. In this application example 6, the duration of an uplink random access channel is fixed, and the uplink random access channel configuration field can be 1 bit; when such bit indicates the existence of the uplink sounding channel, it is equivalent to indirectly indicate that such uplink random access channel has a fixed duration.

It can be seen that the fields (1)-(3) in the system information channel indicate the duration information of the channel, the fields (4) and (7) indicate the existence information of the channel, and the fields (5) and (6) indicate the existence and duration information of the channel.

In other applications, the above downlink sounding channel and the uplink random access channel may have unfixed durations. At this time, the downlink sounding channel configuration field and the uplink random access channel configuration field also can use several bits to indicate the existence and the duration of the channel, or indicate the duration information of the channel.

Since the physical frame structure in this application example 6 does not include a control channel, a downlink transmission channel, a downlink sounding channel, an uplink transmission channel, an uplink sounding channel, an uplink random access channel and an uplink scheduling request channel, the CAP indicates a duration of 0 in the field indicating the duration of the control channel, the field indicating the duration of the downlink transmission channel and the field indicating the duration of the uplink transmission channel, fill a value indicating the non-existence of channel in the downlink sounding channel configuration field and the uplink random access channel configuration field, and fill a value indicating the non-existence of channel in the uplink sounding channel configuration field and the uplink scheduling request configuration field.

In this application example 6, the durations of the preamble sequence and the system information channel are preset, the CAP and the STA both know the situation of such presetting; therefore, the STA parses the information indicating the structure of the current physical frame from the system information channel, and determines that the current physical frame includes the preamble sequence and the system information channel only, and hence determines no sending operation is performed via the current physical frame, but the related receiving operation is performed.

Application Example 7

Figure 19:
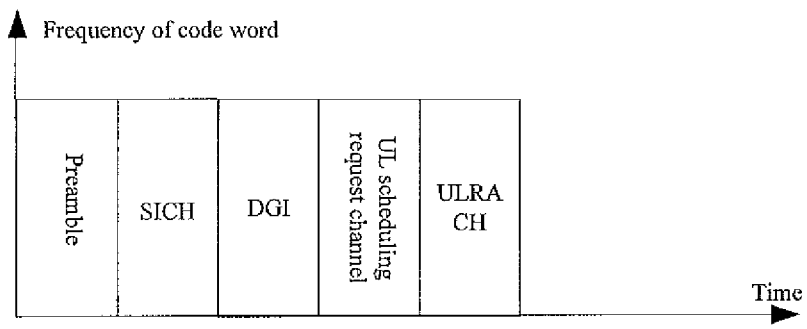
FIG. 19 is a structural diagram indicating physical frame specified in the seventh application embodiment of the invention.

FIG. 19 is the structural diagram of physical frame of Application Example 7 in the present invention, in which x-coordinate indicates time and y-coordinate indicates frequency or code word, and the physical frame includes a preamble sequence, a system information channel, a downlink guard interval, an uplink scheduling request channel and an uplink random access channel.

CAP performs the following operation of: sending the preamble sequence; and sending the information indicating the structure of the current physical frame on the system information channel.

As an alternative embodiment, the CAP can carry the duration of the downlink guard interval in this application example 7 in the information indicating the structure of the current physical frame. At this time, the system information channel also includes a field indicating the guard interval in addition to all the fields listed in Application Example 6. Such field can use multiple bits to indicate the duration of the downlink guard interval, alternatively, in the case that the guard interval has the fixed duration, such field can also use 1 bit only to indicate the existence of the downlink guard interval.

As another alternative embodiment, the CAP can also carry the duration of the downlink guard interval in this application example 7 in a broadcast channel frame (BCF) which is cyclically broadcasted on the downlink transmission channel, 2 bits in the BCF are used to indicate the duration of the downlink guard interval. These 2 bits of a value of 0 indicate a downlink guard interval of 2 OFDM symbols, and these 2 bits of a value of 1 indicate a downlink guard interval of 4 OFDM symbols. During the process of accessing to the wireless network including the CAP and after the access succeeds, the STA obtains the duration of the downlink guard interval through cyclically detecting the BCF; at this time, the CAP does not need to indicate the duration of the downlink guard interval in each physical frame any more, to save the overhead of the system information channel.

The STA determines the structure of current physical frame, and determines from the structure that the following sending operations can be selectively performed in addition to the related receiving operation in the current physical frame:

sending the random access request sequence on the uplink random access channel, to trigger the CAP to assign the resources for sending the random access request; and sending the uplink scheduling sequence on the uplink scheduling request channel, to trigger the CAP to assign the resources for sending the uplink scheduling request; alternatively, sending the rapid signaling feedback on the uplink scheduling request channel.

In this application example 7, the STA obtains the transmission resources of the uplink random access channel and the uplink scheduling request channel by means of competition; therefore, the CAP does not need to send the resources indication of these two channels on the control channel, without configuring the control channel.

Alternatively, the physical frame structure in this application example 7 can include only one of the uplink random access request channel and the uplink scheduling request channel.

Application Example 8

Suppose the application scenario of this application example 8 include that: the CAP has a demand on the downlink service transmission to the STA; channel sounding shall be performed before the downlink service transmission; the STA has no demand on uplink service, uplink signaling or downlink service feedback.

Figure 20A:
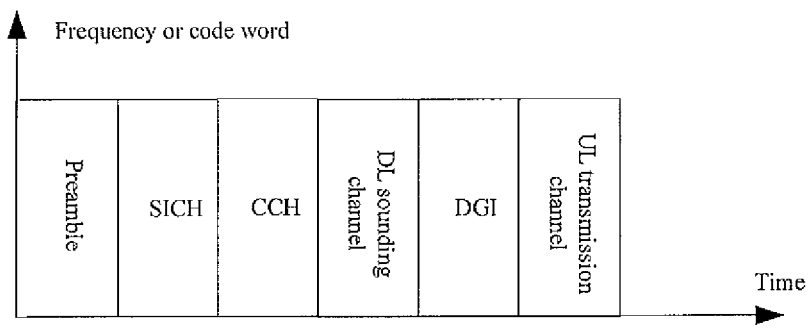
FIG. 20a is a first structural diagram indicating the first physical frame specified in the eighth application embodiment of the invention.
Figure 20B:
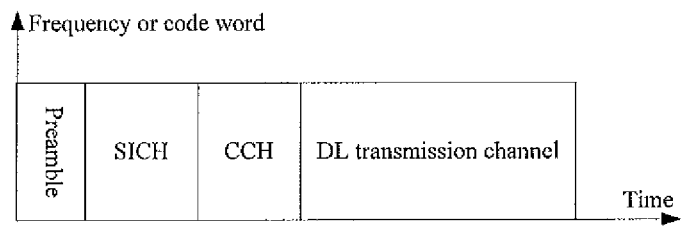
FIG. 20b is a structural diagram indicating the second physical frame specified in the eighth application embodiment of the invention.

In a first alternative embodiment, the CAP completes the downlink service transmission through two physical frames, as shown in FIG. 20a and FIG. 20b, in which x-coordinate indicates time and y-coordinate indicates frequency or code word.

In the first physical frame, the CAP performs the following sending operation of: sending the preamble sequence; sending the information indicating the structure of the current physical frame on the system information channel; sending the information indicating the assignment and scheduling of transmission resources and the transmission format of the channel occupying the transmission resources on the control channel; and sending the downlink sounding signal on the downlink sounding channel. The STA determines the structure of the first physical frame through the information indicating the structure of the current physical frame, and determines the following sending operations to be performed over the first physical frame according to the structure of the first physical frame:

feeding back the measurement results of downlink channel on the uplink transmission channel to the CAP. Here, the measurement results of the downlink channel, including downlink CQI or including downlink CQI and downlink CSI, are obtained by the STA through the measurement of the downlink channel based on the downlink sounding signal sent by the CAP. In the second physical frame, the CAP performs the following sending operations of: sending the preamble sequence; sending the information indicating the structure of the current physical frame on the system information channel; sending the information indicating the assignment and scheduling of transmission resources and the transmission format of the channel occupying the transmission resources on the control channel; and sending the downlink service data on the downlink transmission channel.

The STA determines the structure of the second physical frame through the information indicating the structure of the current physical frame, and determines that the sending operations are not performed in the second physical frame according to the structure of the second physical frame.

Figure 21:
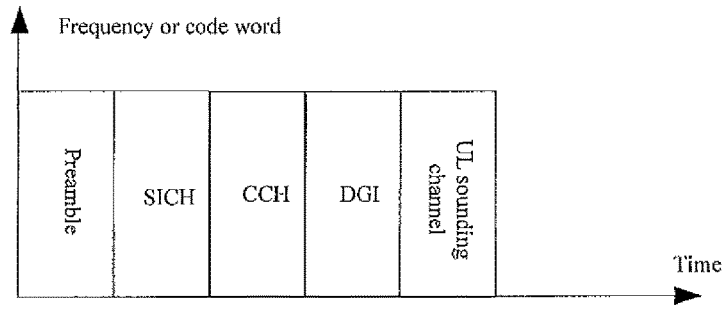
FIG. 21 is a second structural diagram indicating the first physical frame specified in the eighth application embodiment of the invention.

As the second alternative embodiment, the CAP needs to complete the downlink service transmission through two physical frames, as shown in FIGS. 21 and 20b, in which x-coordinate indicates time, and y-coordinate indicates frequency or code word.

In the first physical frame, the CAP performs the following sending operation of: sending the preamble sequence; sending the information indicating the structure of the current physical frame on the system information channel; and send the information indicating the assignment and scheduling of transmission resources and the transmission format of the channel occupying the transmission resources on the control channel.

The STA determines the structure of the first physical frame and determines that the following sending operation can be performed in the first physical frame based on the structure:

sending the uplink sounding signal on the uplink sounding channel to the CAP by the STA, so that the CAP uses such uplink sounding signal to carry out the measurement of the uplink channel quality, or carry out the measurement of the uplink channel quality and the uplink channel status, and obtains the CQI of the downlink channel or obtain the CQI and CSI of the downlink channel according to the principle of the uplink and downlink reciprocity.

In the second physical frame, the CAP performs the following sending operation of: sending the preamble sequence; sending the information indicating the structure of the current physical frame on the system information channel; sending the information indicating the assignment and scheduling of transmission resources and the transmission format of the channel occupying the transmission resources on the control channel; and sending the downlink service data on the downlink transmission channel.

The STA determines the structure of the second physical frame through the information indicating the structure of the current physical frame, and accordingly determines that the sending operation is not performed in the second physical frame.

The above two embodiments are explained from the perspective that the CAP and the STA perform the sending operations. When the CAP performs the sending operation, the STA performs the related receiving operation; and when the STA performs the sending operation, the CAP performs the related receiving operation.

In above two embodiments, the CAP can indicate the downlink guard interval through two alternative embodiments the same as those in Embodiment Example 7. In the first one of the two embodiments, the system information channel also includes a field indicating the guard interval in addition to the fields listed in Embodiment Example 6. For such field, multiple bits may be used to indicate the duration of the downlink guard interval, alternatively, in the case that the guard interval has the fixed duration, one bit can be used for such field to indicate the existence of the downlink guard interval. In the second one of the two embodiments, the system information channel has the fields same as those in the present embodiment.

In the above two embodiments, if the CAP uses the method 2 indicated previously to send the information indicating the structure of the current physical frame, and the second physical frame is taken as an example, the corresponding value is filled in the filed indicating the duration of the control channel on the system information channel, and 9 bits are used to indicate the duration of the downlink transmission channel on the control channel.

In above two embodiments, if the channel sounding is not carried out before the downlink service transmission, the CAP can complete the downlink service transmission through one physical frame shown in FIG. 20b.

In above two embodiments, the first physical frame and the second physical frame can be consecutive or non-consecutive.

In addition to the above two embodiments, before the downlink service transmission, the channel sounding may be carried out based on both the downlink sounding channel and the uplink sounding channel, that is, the downlink sounding channel, the uplink sounding channel and the uplink transmission channel are all configured in the first physical frame; at this time, the CAP uses the uplink sounding signal sent by the STA to carry out the measurement of uplink channel status, obtains the downlink CSI based on uplink and downlink reciprocity, and receives the downlink CQI fed back by the STA on the uplink transmission channel; alternatively, the CAP uses the uplink sounding signal sent by the STA to carry out the measurement of uplink channel quality, obtains the downlink CQI based on uplink and downlink reciprocity, and receives the downlink CSI fed back by the STA on the uplink transmission channel.

In above two embodiments, the channel sounding is completed in one physical frame, for example. Actually, the channel sounding may also be completed through multiple physical frames, which is not further described here.

Application Example 9

The application conditions in this application example 9 include: the STA has the demand on uplink service transmission; the channel sounding is needed before the uplink service transmission; and the CAP has no demand on downlink service, downlink signaling or uplink service feedback.

Figure 22:
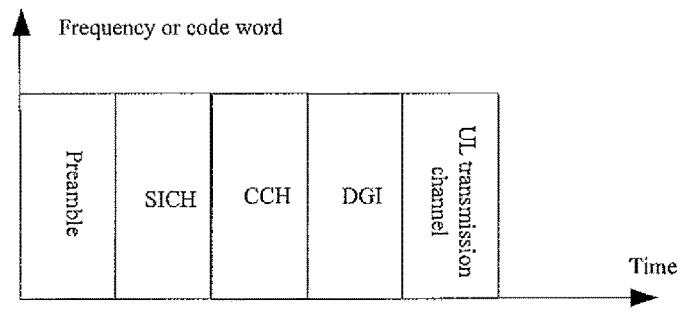
FIG. 22 is a structural diagram indicating the second physical frame specified in the ninth application embodiment of the invention.

As the first alternative embodiment, under the premise that the CAP knows that the STA has the demand on uplink service transmission, the STA needs to complete the uplink transmission through two physical frames, as shown in FIGS. 21 and 22, in which x-coordinate indicates time, and y-coordinate indicates frequency or code word.

In the first physical frame, the CAP performs the following sending operations of: sending the preamble sequence; sending the information indicating the structure of the current physical frame on the system information channel; and sending the information indicating the assignment and scheduling of transmission resources and the transmission format of the channel occupying the transmission resources on the control channel.

The STA determines the structure of the second physical frame and determines that the following sending operations can be performed in the first physical frame based on the structure:

sending the uplink sounding signal on the uplink sounding channel to the CAP, so that the CAP uses such uplink sounding signal to carry out the measurement of the quality of uplink channel to obtain the uplink CQI, or carry out the measurement of the quality of uplink channel and status of the uplink channel to obtain the uplink CQI and CSI.

In the second physical frame, the CAP performs the following sending operations of: sending the preamble sequence; sending the information indicating the structure of the current physical frame on the system information channel; and sending the information indicating the assignment and scheduling of transmission resources and the transmission format of the channel occupying the transmission resources on the control channel.

The STA determines the structure of current physical frame, and determines that the following sending operations can be performed in the current physical frame based on the structure:

sending uplink signaling data on the uplink transmission channel.

As the second alternative embodiment, under the premise that the CAP knows that the STA has the demand on uplink service, the STA needs to complete the uplink transmission through two physical frames, as shown in FIGS. 20a and 22, in which x-coordinate indicates time, and y-coordinate indicates frequency or code word.

In the first physical frame, the CAP performs the following sending operations of: sending the preamble sequence; sending the information indicating the structure of the current physical frame on the system information channel; and sending the information indicating the assignment and scheduling of transmission resources and the transmission format of the channel occupying the transmission resources on the control channel; and sending downlink sounding signal on the downlink sounding channel.

The STA determines the structure of the second physical frame and determines that the following sending operations can be performed in the first physical frame based on the structure:

sending the downlink CQI or sending the downlink CQI and CSI on the uplink transmission channel to the CAP, thus CAP obtain the uplink CQI, or obtain the downlink CQI and CSI based on the uplink and downlink reciprocity.

In the second physical frame, the CAP performs the following sending operations of: sending the preamble sequence; sending the information indicating the structure of the current physical frame on the system information channel; and sending the information indicating the assignment and scheduling of transmission resources and the transmission format of the channel occupying the transmission resources on the control channel.

The STA determines the structure of current physical frame, and determines that the following sending operations can be performed in the current physical frame based on the structure:

sending uplink signaling data on they uplink transmission channel.

In above two embodiments, description is made in an example where the CAP and the STA perform the sending operations. When the CAP performs the sending operation, the STA performs the related receiving operation; and when the STA performs the sending operation, the CAP performs the related receiving operation.

In above two embodiments, the CAP can indicate the downlink guard interval through two alternative embodiments the same as those in Embodiment Example 7. In the first one of the two embodiments, the system information channel also includes a field indicating the guard interval in addition to the fields listed in Embodiment Example 6. For such field, multiple bits may be used to indicate the duration of the downlink guard interval, alternatively, in the case that the guard interval has the fixed duration, one bit can be used for such field to indicate the existence of the downlink guard interval. In the second one of the two embodiments, the system information channel has the fields same as those in the present embodiment. In the above two embodiments, if the CAP uses the method 2 indicated previously to send the information indicating the structure of the current physical frame, and the second physical frame is taken as an example, the corresponding value is filled in the filed indicating the duration of the control channel on the system information channel, and 9 bits are used to indicate the duration of the downlink transmission channel on the control channel.

In above two embodiments, if the uplink channel measurement is not carried out, the CAP may not configure the uplink sounding channel, and complete the uplink service transmission through one physical frame shown in FIG. 22.

In above two embodiments, the CAP can also configure the downlink sounding channel, the uplink sounding channel and the uplink transmission channel in the first physical frame at the same time; at this time, the CAP uses the uplink sounding signal sent by the STA on the uplink sounding channel of the first physical frame to carry out the measurement of uplink channel status to obtain the uplink CSI, receives the downlink CQI fed back by the STA on the uplink transmission channel of the first physical frame, and obtains the uplink CQI based on uplink and downlink reciprocity; alternatively, the CAP uses the uplink sounding signal sent by the STA on the uplink sounding channel of the first physical frame to carry out the measurement of uplink channel quality to obtain the uplink CQI, receives the downlink CSI fed back by the STA on the uplink transmission channel of the first physical frame, and obtains the uplink CSI based on uplink and downlink reciprocity.

In above two embodiments, description is made in an example where the channel sounding is completed in one physical frame. Actually, the channel sounding may also be completed through multiple physical frames, which is not further described here.

From the above embodiment example 6 to embodiment example 9, respectively aiming at the easiest applications, take several types of possible physical frame structures as the example, the goal is to explain that in the physical frame of the embodiment in the present invention, the incidence of transmission channel and the corresponding sounding channel, while the actual applications are likely to be more complicated, for example, multiple STAs exist in the system, the CAP and each STA have different transmission demands, based on whether the STA supports the channel sounding, carry out the channel sounding before transmission of the uplink and downlink, and the channel sounding may not be needed before transmission of the uplink and downlink, and the following embodiment examples list the possible physical frame structures in other applications.

Application Example 10

Figure 23:
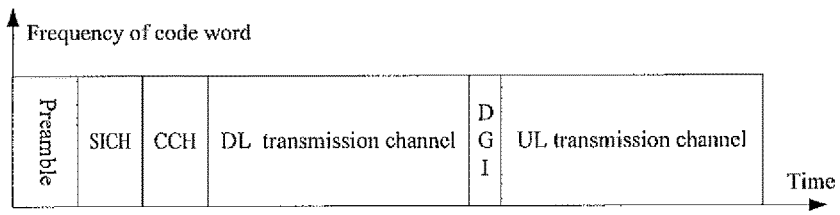
FIG. 23 is a structural diagram indicating physical frame specified in the tenth application embodiment of the invention.

FIG. 23 is the structural diagram of the physical frame of Application Example 10 in the present invention.

As shown in FIG. 23, physical frame includes the downlink sub-frame and uplink sub-frame: the downlink sub-frame includes the preamble sequence, system information channel, control channel and downlink transmission channel, and the uplink sub-frame includes the uplink transmission channel.

Each STA shares the uplink transmission resources through the time division, frequency division, code division, space division or the combination of the above multiplexing methods.

For an alternative embodiment, the CAP can send the information indicating the structure of the current physical frame on the system information channel, with the example as follows:

6 bits indicate the duration of control channel, and such 6 bits can indicate maximum 63 OFDM symbols. For example, if such 6 bits are 010000, converted to decimal 16, corresponding to 16 OFDM symbols.

In the system information channel, 9 bits indicate the duration of downlink transmission channel, maximum 511 OFDM symbols. For example, if such 9 bits are 100000000, converted to decimal 256, corresponding to 256 OFDM symbols.

In the system information channel, 9 bits indicate the duration of uplink transmission channel, maximum 511 OFDM symbols.

In the system information channel, 1 bit indicates the guard interval with 1 OFDM symbol. Alternatively, system information channel does not indicate the guard interval, while configured with the system. For another alternative embodiment, the CAP can send the information indicating the structure of the current physical frame on system information channel and control channel, with the example as follows:

In the system information channel, 6 bits are used to send the duration of control channel; in the control channel, 9 bits are used to send the duration of downlink transmission channel, and 9 bits are used to send the duration of uplink transmission channel.

The physical frame structure based on FIG. 23 can separate the signaling and service in the uplink and downlink transmission.

Application Example 11

Figure 24:
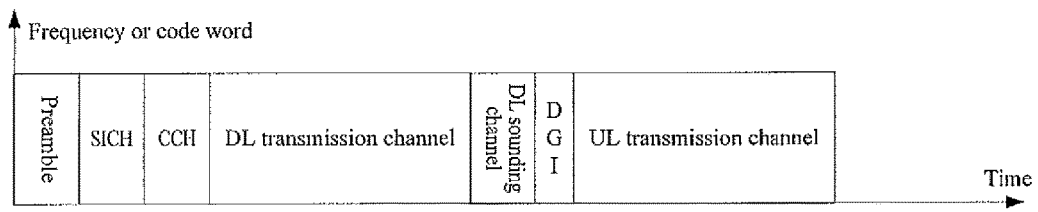
FIG. 24 is a structural diagram indicating physical frame specified in the eleventh application embodiment of the invention.

FIG. 24 is the structural diagram of the physical frame of Application Example 11 in the present invention.

As shown in FIG. 24, based on FIG. 23, configure the downlink sounding channel in the downlink sub-frame. The existence information of the downlink sounding channel is included in the information indicating the structure of the current physical frame sent by the CAP, which can be realized by 1 bit, sent in the system information channel. As shown in FIG. 24, the downlink sounding channel can be located at the rear of the downlink transmission channel.

Application Example 12

Figure 25:
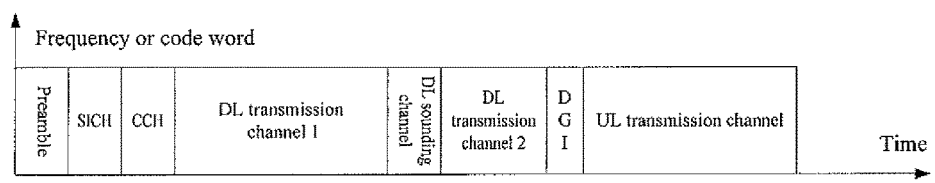
FIG. 25 is a structural diagram indicating physical frame specified in the twelfth application embodiment of the invention.

FIG. 25 is the structural diagram of the physical frame of Application Example 12 in the present invention, and the downlink sounding channel is located in the middle of the downlink transmission channel.

In the MU-MIMO transmission plan, since the performance of downlink MU-MIMO system is not only sensitive to the delay in status information of the downlink channel, but the multi-user MIMO is related to the large signal processing complexity. Comprehensively considering the delay in the status information of the channel, and the possible different processing complexities in different applications, it is more reasonable to locate the downlink sounding channel in the middle of the downlink transmission channel, If the position of downlink sounding channel is fixed, 1 bit indicates the existence of downlink sounding channel in the system information channel. If the STAs with different processing capabilities exist in the system, the position of downlink sounding channel is variable. At this time, it is not necessary to indicate the existence of downlink sounding channel in the system information channel, but also indicate the durations of two downlink transmission channels shown in FIG. 25. The indication of the durations of two downlink transmission channels can use the following three types of methods:

Respectively indicate the duration of downlink transmission channel 1 and downlink transmission channel 2;

Respectively indicate the total time of downlink transmission channel and the duration of downlink transmission channel 1;

Respectively indicate the total time of downlink transmission channel and the duration of downlink transmission channel 2.

Through the above dynamic or semi-static configuration of the position of downlink sounding channel, provide the STAs with different processing capabilities with enough processing time.

For an alternative embodiment, CAP sends the information indicating the structure of the current physical frame on the system information channel, for example, 6 bits indicates the duration of control channel; 9 bits indicate the total time of downlink transmission channel, 7 bits indicate the duration of downlink transmission channel 2; 9 bits indicate the duration of uplink transmission channel; 2 bits indicate the downlink sounding channel, respectively indicating none downlink sounding channel, position 1 of downlink sounding channel, position 2 of downlink sounding channel and position 3 of downlink sounding channel, used to match different Sounding bandwidths. The position 1, 2 and 3 on the downlink sounding channel are the determined positions defined by the system.

For another alternative embodiment, the CAP can send the information indicating the structure of the current physical frame on the system information channel and control channel, for example, on the system information channel, the CAP uses 6 bits to indicate the duration of control channel; on the control channel, 9 bits indicate the total time of downlink transmission channel, 7 bits indicate the duration of downlink transmission channel 2, 9 bits indicate the duration of uplink transmission channel, and 2 bits indicate the position of downlink sounding channel.

Application Example 13

Figure 26:
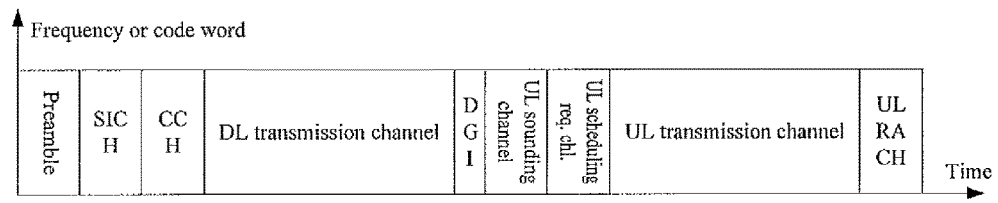
FIG. 26 is a structural diagram indicating physical frame specified in the thirteenth application embodiment of the invention.

FIG. 26 is the structural diagram of the physical frame of Application Example 13 in the present invention.

This Application example 13 sets some auxiliary channels in the uplink sub-frame, for example, setting one or more of the uplink sounding channel, uplink scheduling request channel and uplink random access channel in the uplink sub-frame. FIG. 26 is only one example including three types of auxiliary channels, and in the actual situation, according to different system applications or plans, certain auxiliary channel may not be taken into the consideration.

For an alternative embodiment, CAP can send the information indicating the structure of the current physical frame on the system information channel, for example, in the system information channel, 6 bits indicate the duration of control channel; 9 bits indicate the duration of downlink transmission channel; 9 bits indicate the duration of uplink transmission channel; 2 bits indicate the existence and time of uplink sounding channel, indicating 0, 1, 2, and 4 OFDM symbols respectively; 2 bits indicates the existence and time of uplink scheduling request channel, indicating 1, 2, 3, and 4 OFDM symbols respectively; 1 bit indicates the existence of uplink random access channel, indicating existence respectively, if any, fixed as 1 OFDM symbol.

For another alternative embodiment, CAP can send the information indicating the structure of the current physical frame on the system information channel and control channel, for example, In the system information channel, 6 bits indicate the duration of control channel, 1 bit indicates the existence of uplink random access channel; in the control channel, 9 bits indicate the duration of downlink transmission channel, 9 bits indicate the duration of uplink transmission channel, 2 bits indicate the existence and time of uplink sounding channel, 2 bits indicate the existence and time of the uplink scheduling request channel.

Application Example 14

Figure 27:
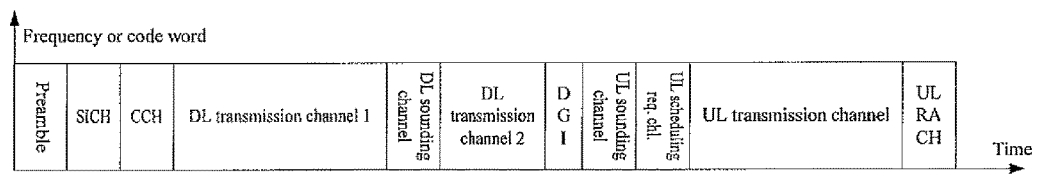
FIG. 27 is a structural diagram indicating physical frame specified in the fourteenth application embodiment of the invention.

FIG. 27 is the structural diagram of the physical frame of Application Example 14 in the present invention.

Set the downlink sounding channel in the downlink sub-frame, and set the uplink sounding channel, uplink scheduling request channel and uplink request channel in the uplink sub-frame at the same time. However, in the actual situation, according to different system applications or plans, certain auxiliary channel may not be taken into the consideration.

Figure 28:
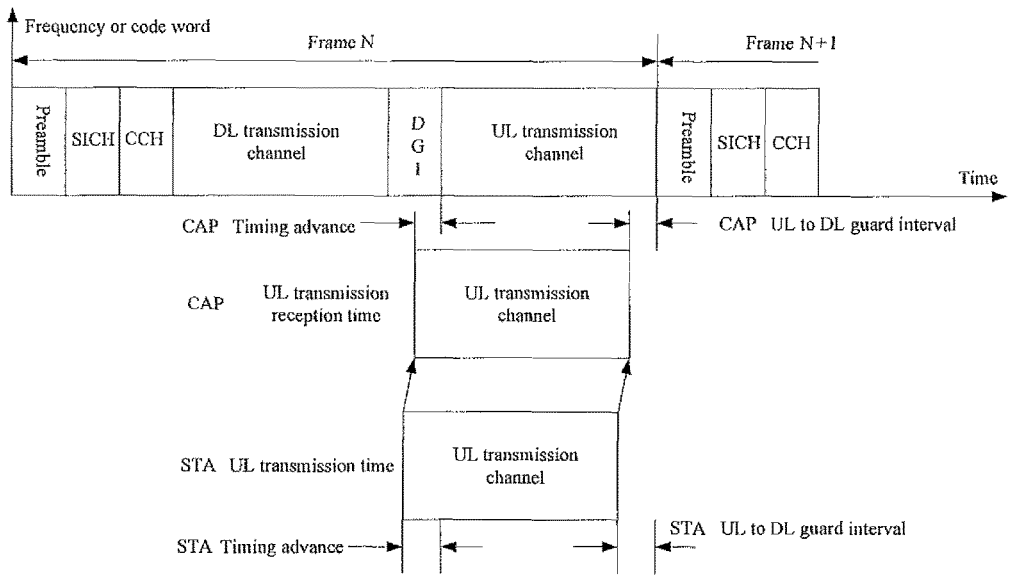
FIG. 28 is a schematic diagram indicating to reserve, the uplink guard interval in advance through the transmission in the fourteenth application embodiment of the invention.

Alternatively, uplink guard interval is reserved in advance through transmission, that is: arrange the uplink transmission time in advance to reserve the guard interval of uplink to downlink conversion for the CAP and the STA, specifically as shown in FIG. 28, the CAP can inform the timing advance through the resource indication sent in the control channel in the access phase of the STA, in the later uplink transmission operation of the STA, carry out transmission in advance according to such timing advance. In the ease that the uplink guard interval is reserved in advance through the transmission, the indication downlink to uplink converted downlink guard interval should not be smaller than the sum of the maximum downlink to uplink receiving and sending and the uplink to downlink receiving and sending protection time between the CAP and the STA or the STA and the CAR Application Example 15

Figure 29:
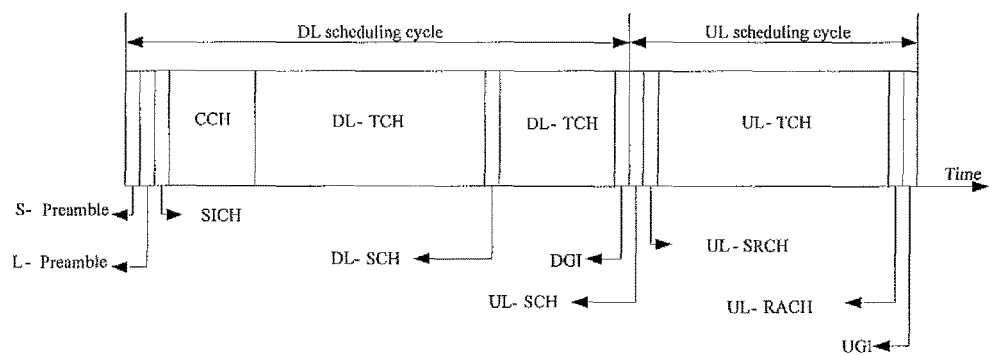
FIG. 29 is a structural diagram indicating physical frame specified in the fifteenth application embodiment of the invention.

FIG. 29 is the structural diagram of the physical frame of Application Example 15 in the present invention, in which x-coordinate indicates time, and y-coordinate indicates frequency or code word.

In the current physical frame, the CAP performs the following sending operations of: sending the preamble sequence; sending the information indicating the structure of the current physical frame on the system information channel; sending the information indicating the assignment and scheduling of transmission resources and the transmission format of the channel occupying the transmission resources on the control channel; sending one or more of the downlink service data, downlink signaling and uplink service feedback on a first downlink transmission channel; sending the downlink sounding signal on the downlink sounding channel; and sending one or more of the downlink service data, downlink signaling and uplink service feedback on a second downlink transmission channel.

The STA determines the structure of current physical frame, and determines that the following sending operation can be performed in the current physical frame based on this:

Send the uplink sounding signal on the uplink sounding channel;

Initiate the uplink scheduling request on the uplink scheduling request channel;

Send the uplink signaling, and/or uplink signaling, and/or uplink feedback on the uplink transmission channel;

Initiate the random access on the uplink random access channel.

Alternatively, the uplink guard interval and downlink guard interval can be indicated according to the method similar to that of Embodiment Example 7.

Figure 30:
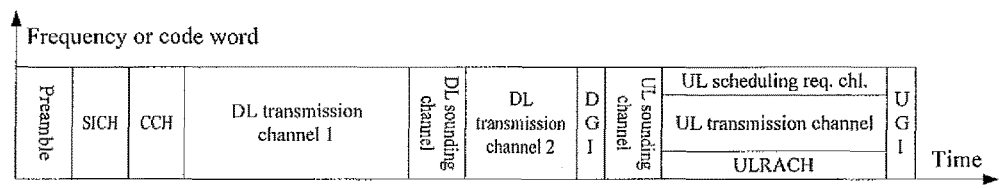
FIG. 30 is a schematic diagram indicating resource reuse among the uplink transmission channel, uplink scheduling request channel and uplink random access channel, specified in the fifteenth application embodiment of the invention.

In the above specific Embodiment Example, when uplink transmission channel, uplink scheduling request channel and uplink random access channel exist in the physical frame, uplink transmission channel, uplink scheduling request channel and uplink random access channel reuse the resource through one method or the combination method among the time-division multiplexing, frequency-division multiplexing, code-division multiple access. With the physical frame structure in Embodiment Example 15 as an example, FIG. 30 is an example for such multi multiplexing. Such multiplexing method can be preset, known by the CAP and the STA; at this time, it is not necessary to indicate such multiplexing method in the physical frame, or indicated on the control channel, for example, 4 bits indicate the number of sub-carriers of the uplink scheduling request channel in the uplink transmission channel, up to the maximum 16 sub-carriers, located on the upper band edge of the uplink transmission channel; 4 bits indicate the number of sub-carrier of the uplink random access channel in the uplink transmission channel, up to the maximum 16 sub-carriers, on the lower band edge of the uplink transmission channel.

Figure 31:
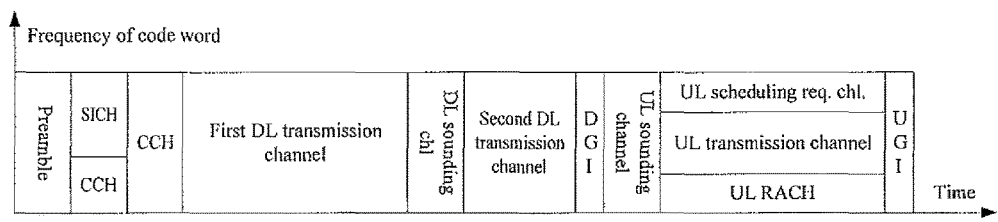
FIG. 31 is a schematic diagram indicating resource reuse between the control channel and system information channel, specified in the fifteenth application embodiment of the invention.

Further, when the control channel and system information channel exist in the physical frame, the control channel and system information channel reuse the resource through one method or the combination method among the time-division multiplexing, frequency-division multiplexing, code-division multiple access. With the physical frame structure in Embodiment Example 15 as an example, FIG. 31 is an example for such multi multiplexing. The system information channel and control channel use the frequency division and time division multiplexing. Such multiplexing method presets, known by the CAP and STA; therefore, it is not necessary to indicate such multiplexing method in the physical frame. The control channel and system information channel can only use the method of frequency division for multiplexing.

In addition, one or more of the time division, frequency division, code division and space division can be used among the resources assigned in the same channel for each STA, to share the transmission resources.

Application Example 16

The information indicating the structure of the current physical frame includes: information indicating the existence of the first channel, which is carried in at least one channel of the physical frame.

In an alternative embodiment, the first channel is the downlink sounding channel.

In this case, the information indicating the structure of the current physical frame also includes: information indicating the duration of the second channel, which is carried in at least one channel of the physical frame. The second channel is the downlink transmission channel or the uplink transmission channel.

In such alternative embodiment, when there is the demand on uplink transmission, the downlink channel sounding is carried out, and then the uplink channel measurement result is obtained based on the uplink and downlink reciprocity. When there is the demand on downlink transmission, the downlink channel sounding is carried out, to directly obtain the downlink channel measurement results.

In another alternative embodiment, the first channel is the uplink random access channel.

Application Example 17

The information indicating the structure of the current physical frame includes: information indicating the existence and duration of the first channel, which is carried in at least one channel of the physical frame.

In an alternative embodiment, the first channel is the uplink scheduling request channel.

In another alternative embodiment, the first channel is the uplink sounding channel.

In this case, the information indicating the structure of the current physical frame also includes: information indicating the duration of the second channel, which is carried in at least one channel of the physical frame. The second channel is the uplink transmission channel or the downlink transmission channel.

In such alternative embodiment, when there is the demand on downlink transmission, the uplink channel sounding is carried out, and then the downlink channel measurement result is obtained based on the uplink and downlink reciprocity. When there is the demand on uplink transmission, the uplink channel sounding is carried out, to directly obtain the uplink channel measurement results.

Application Example 18

The information indicating the structure of the current physical frame includes: information indicating the duration of the first channel, where the duration is greater than or equal to 0, and the information indicating the duration of the first channel is carried in at least one channel of the physical frame.

In the first alternative embodiment, the first channel is the control channel used to indicate the assignment and scheduling of the transmission resources and the transmission format of the channel occupying the transmission resources.

In the second alternative embodiment, the first channel is the downlink transmission channel.

In this case, the information indicating the structure of the current physical frame also includes: information indicating the existence and duration of the second channel. The information indicating the existence and duration of the second channel is carried in at least one channel of the physical frame. The second channel is an uplink sounding channel used for transmission of the uplink transmission signal.

In such alternative embodiment, when there is the demand on downlink transmission, the measurement of uplink channel is carried out, and then the measurement result of the downlink channel is obtained based on the uplink and downlink reciprocity.

In the third alternative embodiment, the first channel is the downlink transmission channel. In this case, the information indicating the structure of the current physical frame also indicates: the information indicating the existence of the second channel, which is carried in at least one channel of the physical frame. The second channel is the downlink sounding channel used for transmission of the downlink sounding signal.

In such alternative embodiment, when there is the demand on downlink transmission, the measurement of downlink channel is carried out, to obtain the measurement result of the downlink channel.

In the fourth alternative embodiment, the first channel is the uplink transmission channel.

In this case, the information indicating the structure of the current physical frame also includes: information indicating the existence and duration of the second channel, which is carried in at least one channel of the physical frame. The second channel is an uplink sounding channel used for transmission of the uplink sounding signal.

In such alternative embodiment, when there is the demand on uplink transmission, the measurement of uplink channel is carried out to obtain the measurement result of the uplink channel.

In the fifth alternative embodiment, the first channel is the uplink transmission channel. In this case, the information indicating the structure of the current physical frame also indicates: information indicating the existence of the second channel, which is carried in at least one channel of the physical frame. The second channel is the downlink sounding channel used for transmission of the downlink sounding signal.

In such alternative embodiment, when there is the demand on uplink transmission, the measurement of downlink channel is carried out, and the measurement result of the uplink channel is obtained based on the uplink and downlink reciprocity.

The Fourth Embodiment Example

The embodiment in the present invention also provides an indication method of specifically indicating the assignment of each channel resource in the frame structure as follows:

1. System Information Channel and Control Channel:
Definition of Fields of System Information Channel The system information channel uses MCS0 for transmission, without the space-time coding. The definitions of fields of the system information are shown in Table 1 below.

TABLE 1

Definitions of system information fields

| Bits | Definition | Note |
| --- | --- | --- |
| $b_7 b_6 \ldots b_0$ | 8 least significant bits of MAC address of CAP | CAP identifier and scrambler seed |
| $b_{20} b_{19} \ldots b_8$ | reserved | reserved |
| $b_{23} b_{22} b_{21}$ | CAP antenna configuration | 000, 1 antenna<br>001, 2 antennae<br>...<br>111, 8 antennae |
| $b_{29} b_{28} \ldots b_{24}$ | control channel cycle indication | control channel cycle, ≤63 OFDM symbols |
| $b_{31} b_{30}$ | reserved | reserved |
| $b_{40} b_{39} \ldots b_{32}$ | downlink transmission channel cycle indication | downlink transmission channel cycle, ≤511 OFDM symbols |
| $b_{47} b_{46} \ldots b_{41}$ | reserved | reserved |
| $b_{56} b_{55} \ldots b_{48}$ | uplink transmission channel cycle indication | uplink transmission channel cycle, ≤511 OFDM symbols |
| $b_{63} b_{62} \ldots b_{57}$ | reserved | reserved |
| $b_{64}$ | downlink sounding channel configuration | 0, none downlink sounding channel<br>1, configure downlink sounding channel |
| $b_{66} b_{65}$ | reserved | reserved |
| $b_{68} b_{67}$ | uplink sounding channel configuration | 00, none uplink sounding channel<br>01, uplink sounding channel is represented by 1 OFDM symbol<br>10, uplink sounding channel is represented by 2 OFDM symbols<br>11, uplink sounding channel is represented by 4 OFDM symbols |
| $b_{70} b_{69}$ | uplink scheduling request channel configuration | 00, non-scheduling request channel<br>01, scheduling request channel is represented by 1 OFDM symbol<br>10, scheduling request channel is represented by 2 OFDM symbols<br>11, scheduling request channel is represented by 4 OFDM symbols |

TABLE 1-continued

Definitions of system information fields

| Bits | Definition | Note |
| --- | --- | --- |
| $b_{71}$ | uplink random access channel configuration | 0, no uplink random access channel<br>1, uplink random access channel is configured |
| $b_{75} b_{74} \ldots b_{72}$ | reserved | reserved |
| $b_{87} b_{86} \ldots b_{76}$ | frame number | 0~4095, frame number counting |
| $b_{103} b_{102} \ldots b_{88}$ | 16-bit CRC | CRC check protection |
| $b_{111} b_{110} \ldots b_{104}$ | Return-to-zero bits of convolution code encoder | Reset the ending status of the convolution code to zero |

Among which, the system information channel uses 16-bit CRC check, and the CRC generation polynomial is $g(D)=D^{16}+D^{12}+D^{5}+1$. The initial status of the register is 0xFF, and the register status is reversed and used as the CRC check sequence for output after the end of the operation. The output of a high-order register corresponds to the most significant bit ($b_{103}$), and the output of a low-order register corresponds to the least significant bit ($b_{88}$).

2. Definition of Control Channel Fields:

The control channel uses the MCS1 for transmission, without the space-time coding. The control channel is composed of multiple unicast and broadcast scheduling signaling. The fields of the uplink and downlink unicast scheduling signaling are shown in Table 2.

TABLE 2

Definitions of downlink and uplink scheduling signaling field

| Bits | Definition | |
| --- | --- | --- |
| | DL | UL |
| $b_0$ | $b_0 = 1$, downlink scheduling<br>$b_0 = 0$, uplink scheduling | |
| $b_1$ | $b_1 = 0$, time division resource scheduling<br>$b_1 = 1$, reserved | |
| $b_5 b_4 \ldots b_2$ | [$b_5 b_4 \ldots b_2$], Bit Map indicating the position of a valid 20 MHz sub-channel of the scheduling signaling | |
| $b_7 b_6$ | Indicating the transmission manner of the current scheduling<br>00: open-loop SU-MIMO transmission<br>01: closed-loop SU-MIMO transmission (dedicated demodulation pilot mode)<br>10: closed-loop MU-MIMO transmission (valid only when $b_0 = 1$)<br>11: closed-loop SU-MIMO transmission (common demodulation pilot mode) | |
| $b_{16} b_{15} \ldots b_8$ | starting OFDM symbol index of user resource group, field value: 0~510 | |
| $b_{23} b_{22} \ldots b_{17}$ | MCS of code word I and the number of parallel spatial flows (≤4) indication | |
| $b_{32} b_{31} \ldots b_{24}$ | number of consecutive OFDM symbols of the user resource group, field value: 1~511 | |
| $b_{39} b_{38} \ldots b_{33}$ | MCS of code word II and number of parallel spatial flows indication<br>1111111, this transmission is SU-MIMO without code word II<br>1111110, this transmission is 2-flow MU-MIMO<br>1111101, this transmission is 3-flow MU-MIMO<br>1111100, this transmission is 4-flow MU-MIMO<br>1111011, this transmission is 5-flow MU-MIMO<br>1111010, this transmission is 6-flow MU-MIMO<br>1111001, this transmission is 7-flow MU-MIMO<br>1111000, this transmission is 8-flow MU-MIMO<br>0000000~1100011, MCS and flow number of SU-MIMO code word II | $b_{36} b_{35} \ldots b_{33}$, BitMap indicating CQI, CSI, or BFM feedback sub-channel<br>$b_{39} b_{38} b_{37}$, for the CSI feedback, indicating the number of rows of feedback matrix; for the BFM feedback, indicating the number of columns of feedback matrix |
| $b_{42} b_{41} b_{40}$ | SU-MIMO: 000<br>MU-MIMO: starting position index of the spatial flow, field value 0~7 | $b_{40} = 1$, request CQI feedback<br>$b_{42} b_{41} = 01$, request CSI feedback<br>$b_{42} b_{41} = 10$, request BFM feedback<br>$b_{42} b_{41} = 11$, reserved |

TABLE 2-continued

Definitions of downlink and uplink scheduling signaling field

| Bits | DL | UL |
|---|---|---|
| $b_{44}b_{43}$ | | 00, BCC code |
| | | 01, LDPC code length 1 (1344 bits) |
| | | 10, LDPC code length 2 (2688 bits) |
| | | 11, LDPC code length 3 (5376 bits) |
| $b_{45}$ | | 0, time-domain demodulation pilot interval 0 (short demodulation pilot interval) |
| | | 1, time-domain demodulation pilot interval 1 (long demodulation pilot interval) |
| $b_{47} b_{46}$ | | 00, frequency domain demodulation pilot pattern 1 (DPI = 1) |
| | | 01, frequency domain demodulation pilot pattern 2 (DPI = 2) |
| | | 10, frequency domain demodulation pilot pattern 3 (DPI = 4) |
| | | 11, reserved |
| $b_{54} b_{53} \ldots b_{48}$ | | $b_{48}$ = 0, $b_{54} \ldots b_{49}$ indicating the resources used for signaling and feedback transmission in this user resource group, field value: 0~63 |
| | | $b_{48}$ = 1, $b_{54} \ldots b_{49}$ reserved |
| $b_{55}$ | | 0, without STBC transmission |
| | | 1, with STBC transmission |
| $b_{71} b_{70} \ldots b_{56}$ | | CRC check protection and STA ID identifier |

Among which, $b_{71} b_{70} \ldots b_{56}$ is equal to the unique 12-bit ID of the local cell assigned by the CAP subjected to the exclusive-or operation by the CRC check code of the unicast scheduling signaling field.

$$[b_{71}b_{70} \ldots b_{56}] = [0\ 0\ 0\ 0 d_{11}d_{10} \ldots d_D]_{STAID} \oplus [c_{15}c_{14} \ldots c_0]_{CRC}$$

The control channel uses 16-bit CRC check, and a CRC generation polynomial is $g(D)=D^{16}+D^{12}+D^5+1$. The definition is the same as that in Table 1.

3. Uplink and Downlink Transmission Channel:

Type of Resource Assignment of Uplink and Downlink Transmission Channels:

On the uplink and downlink transmission channels, this part supports multiplexing scheduling of time division resources.

Time-Division Multiplexing Resource Assignment:

The time frequency resources assigned for each STA on the uplink or downlink transmission channels are called a resource group.

In case of the time-division multiplexing, the OFDM symbol indexes in the STA resource group are from 0 to $D(b_{32} b_{31} \ldots b_{24})-1$ along the time increasing direction. Among which, $D(b_{32} b_{31} \ldots b_{24})$ indicates the decimal corresponding to the bits $b_{32} b_{31} \ldots b_{24}$.

Resource indication of uplink and downlink transmission channels:

Time-Division Multiplexing Resource Assignment:

In the STA scheduling signaling (Table 2), $[b_{16} b_{15} \ldots b_8]$ indicates the starting OFDM symbol index of the STA resource group, having a field value 0~510; $[b_{32} b_{31} \ldots b_{24}]$ indicates the number of consecutive OFDM symbols occupied by the STA resource group.

The resource group assigned for the STA includes the resources occupied by the demodulation pilot.

Demodulation Pilot of Transmission Channel

This part can dynamically adjust the pattern of the demodulation pilot. Through the control channel scheduling signaling $b_{45}$ (Table 2), it is possible to configure different time domain pilot intervals; through the control channel scheduling signaling $b_{47}b_{46}$ (Table 2), it is possible to configure different frequency domain pilot patterns.

If $b_1 b_6$ is 01 or 10, the demodulation pilot needs to be processed by pre-coding (dedicated demodulation pilot); if $b_7 b_6$ is 00 or 11, demodulation pilot does not need to be processed by pre-coding (common demodulation pilot).

The demodulation pilot pattern is as follows:

The demodulation pilot pattern is shown in Table 3.

TABLE 3

Demodulation pilot pattern

| Index | $N_{sts}$ | $DPI_F$ | $DP_{num}$ |
|---|---|---|---|
| 1 | 1 | 1 | 1 |
| 2 | 1 | 2 | 1 |
| 3 | 2 | 1 | 2 |
| 4 | 2 | 2 | 1 |
| 5 | 3 | 1 | 3 |
| 6 | 3 | 2 | 2 |
| 7 | 3 | 4 | 1 |
| 8 | 4 | 1 | 4 |
| 9 | 4 | 2 | 2 |
| 10 | 4 | 4 | 1 |
| 11 | 5 | 1 | 5 |
| 12 | 5 | 2 | 3 |
| 13 | 5 | 4 | 2 |
| 14 | 6 | 1 | 6 |
| 15 | 6 | 2 | 3 |
| 16 | 6 | 4 | 2 |
| 17 | 7 | 1 | 7 |
| 18 | 7 | 2 | 4 |
| 19 | 7 | 4 | 2 |
| 20 | 8 | 1 | 8 |
| 21 | 8 | 2 | 4 |
| 22 | 8 | 4 | 2 |

Among which, (1) a pilot interval $DPI_F$ refers to the pilot symbol sub-carrier cycle in the same space time flow. For example, $DPI_F=2$ indicates that one demodulation pilot is provided for every two adjacent occupied sub-carriers.

(2) number of pilot symbols, $DP_{num}$, refers to the number of consecutive OFDM symbols occupied by the demodulation in the time domain.

Table 4 defines the position of a sub-carrier corresponding to each pilot symbol in the demodulation pilot pattern.

TABLE 4

Position of demodulation pilot

| Carrier aggregation mode | bandwidth | Demodulation pilot sub-carrier set |
|---|---|---|
| 1 | 20 MHz | $SC_{dp}^{sti} = [\pm(1+sti-(l-1)\cdot DPI), \pm(1+DPI+sti-(l-1)\cdot DPI), \ldots, \pm(N+sti-(l-1)\cdot DPI)]_{l=\lfloor\frac{sti}{DPI}\rfloor+1}$<br><br>$N = 1 + DPI \cdot \lfloor(N_{sr} - sti + (l-1)\cdot DPI - 1)/DPI\rfloor$<br>$DPI = 1, 2, 4, 8$<br>$sti = 0 \sim 7$<br>$N_{sr} = 115$ |
| | 40 MHz | $SC_{dp}^{sti} = \begin{cases} 128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1} \\ -128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1} \end{cases}$<br><br>$N = 1 + DPI \cdot \lfloor(N_{sr} - sti + (l-1)\cdot DPI - 1)/DPI\rfloor$<br>$DPI = 1, 2, 4, 8$<br>$sti = 0 \sim 7$<br>$N_{sr} = 115$ |
| | 80 MHz | $SC_{dp}^{sti} = \begin{cases} 384 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1} \\ 128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1} \\ -128 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1} \\ -384 + [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1} \end{cases}$<br><br>$N = 1 + DPI \cdot \lfloor(N_{sr} - sti + (l-1)\cdot DPI - 1)/DPI\rfloor$<br>$DPI = 1, 2, 4, 8$<br>$sti = 0 \sim 7$<br>$N_{sr} = 115$ |
| 2 | 40 MHz | $SC_{dp}^{sti} = [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1}$<br><br>$N = 1 + DPI \cdot \lfloor(N_{sr} - sti + (l-1)\cdot DPI - 1)/DPI\rfloor$<br>$DPI = 1, 2, 4, 8$<br>$sti = 0 \sim 7$<br>$N_{sr} = 243$ |
| | 80 MHz | $SC_{dp}^{sti} = [\pm(1+sti-(l-1)\cdot DPI)), \pm(1+DPI+sti-(l-1)\cdot DPI)), \ldots, \pm(N+sti-(l-1)\cdot DPI))]_{l=\lfloor\frac{sti}{DPI}\rfloor+1}$<br><br>$N = 1 + DPI \cdot \lfloor(N_{sr} - sti + (l-1)\cdot DPI - 1)/DPI\rfloor$<br>$DPI = 1, 2, 4, 8$<br>$sti = 0 \sim 7$<br>$N_{sr} = 499$ |

Among which, $SC_{dp}^{sti}$ is the demodulation pilot sub-carrier index set of the sti space time flow; l=1, . . . , $DP_{num}$ indicates the OFDM symbols occupied by the demodulation pilot; DPI in the Table is the demodulation pilot interval of frequency domain, that is, $DPI_F$.

The design of demodulation pilot interval is as follows:

Through the control channel, schedule the signaling $b_{45}$ (0) to configure the different intervals of time frequency pilot, to self-adapt to the different wireless communication environments. The time frequency pilot is configured with interval, $DPI_T$, that is: A group of demodulation pilot is inserted each $DPI_T$ OFDM symbols. $b_{45}=0$ is short $DPI_T$ and $b_{45}=1$ is long $DPI_T$. Long and short $DPI_T$ are indicated in BCF frame at MAC layer.

Sequence of Demodulation Pilot

The pilot sequence generation polynomial is $1+X^{11}+X^{15}$. The generating sequence obtains the pilot symbol sequence $\{s_i\}$ i=0, 1, . . . , 32767 by BPSK modulation. The initial status of register is:

[0 0 1 0 1 0 1 1 $a_6$ $a_5$ $a_4$ $a_3$ $a_2$ $a_1$ $a_0$]

MSB is on the left, and LSB is on the right, $a_6$ $a_5$ . . . $a_0$ is the MAC address lowest 7 bits of the CAP.

The demodulation pilot is mapped to the time frequency resources according to the following rules. Now make:

```
i = 231 · l + (k+115)
In the formula: k = -115,...,+115; l = 0,1,...,DP_num -1 .
i = 0
for l = 0 : 1 : DP_num -1
    for k = -115 : 1 :+115
        if k ∈ SC_dp^sti
            p^sti_{k,l} = s_i
        else
            p^sti_{k,l} = 0
        end
        i = i+1
    end
end
```

Multi-Antenna Plan for the Downlink Transmission Channel:

In the multi-antenna transmission mode, the base band of time frequency of the ti antenna port is:

$$r_{Field}^{(ti)}(t) = \frac{1}{\sqrt{N_{Field}^{Tone} \cdot N_{sts}}} w_T(t) \sum_{\substack{k=-N_{fft}/2 \\ k \in SC_{l'}}}^{N_{fft}/2-1} \sum_{si=1}^{N_{sts}} [Q_k]_{ti,si} \tilde{x}_k^{(si)} \exp(j2\pi k \Delta \mathrm{ft})$$

In the formula: $w_T(t)$ is the window function of time frequency, $\tilde{x}_k^{(si)}$ is the loading symbol of the k sub-carrier in the si space flow, $[Q_k]_{ti,si}$ indicates the element in the ti line and si column of the pre-coding matrix $Q_k \in C^{N_{TX} \times N_{ss}}$.

The downlink multi-antenna transmission mode supported by this part includes:

Mode 1: open-loop SU-MIMO
Mode 2: closed-loop SU-MIMO
Mode 3: closed-loop MU-MIMO Among which:

Mode 1: Open-Loop SU-MIMO

In case of open-loop SU-MIMO, the STA can parallelly receive two code words. The pre-coding matrix $Q_k \in C^{N_{TX} \times N_{sts}}$ in the open-loop mode is column orthogonal matrix, and $\|Q_k\| = \sqrt{N_{sts}}$.

Mode 2: Closed-Loop SU-MIMO

In case of closed-loop SU-MIMO, the STA can parallelly receive two code words, and take the sub-carrier group as the unit pre-coding. The block of the pre-coding matrix is degfined as follows: the number of pre-coding division of useful sub-carrier is $N_g$, the sub-carrier sequence set in the g block is $\Omega_g$, such group uses the same pre-coding matrix. The number of sub-carrier $|\Omega_g|$ in the same pre-coding division group in the SU-MIMO mode is determined according to the following formula.

$$|\Omega_g| = 4 \cdot DPI_F$$

In which, $DPI_F$ definition is in the Appendix B. In case of using pre-coding division group, the value of $DPI_F$ includes type 1 and type 2.

When $DPI_F = 1$, blocks each including 4 sub-carriers are as follows:

[−115,−113][−112,−10911,−108,−10511−104,−101][−100,−97][−96,−93][−92,−89][−88,−85] [−84,−81] [−80,−77] [−76,−73] [−72,−69] [−68,−65] [−64,−61] [−60,−57] [−56,−53] [−52,−49][−48,−45][−44,−41] [−40,−37][−36,−33] [−32,−29][−28,−25] [−24,−21] [−20,−17] [−16,−13][−12,−9] [−8,−5][−4,−1] [1,4] [5,8] [9,12] [13,16] [17,20][21, 24][25,28] [29,32] [33,36] [37,40][41,4 4] [45,48] [49,52] [53,56] [57,60] [61,64] [65,68] [69,72] [73,76] [77,80] [81,84] [85,88] [89,9 2][93,96][97,100][101,104][105,108] [109,112][113,115]

When $DPI_F = 2$, blocks each including 8 sub-carriers are as follows:

[−115, −105] [−104,−97] [−96,−89] [−88,−81] [−80,−73] [−72,−65] [−64,−57] [−56,−49] [−48,−41] [−40,−33] [−32,−25] [−24,−17] [−16,−9] [−8,−1] [1,8][9,16][17,24] [25,32] [33,40] [41, 48] [49,56] [57,64] [65,72] [73,80] [81,88] [89,96] [97,104] [105,115]

Under the closed-loop SU-MIMO, the STA can indicate the feedback channel information according to the MAC layer.

Mode 3: Closed-Loop MU-MIMO

In case of closed-loop MU-MIMO, each STA can receive only one code word, and take the sub-carrier group as the unit pre-coding. The block of the pre-coding matrix is defined as follows: the number of pre-coding division of useful sub-carrier is $N_g$, the sub-carrier sequence set in the g block is $\Omega_g$, such group uses the same pre-coding matrix. The number of sub-carrier $|\Omega_g|$ in the same pre-coding division group in the MU-MIMO mode is determined according to the following formula.

$$|\Omega_g| = DPI_F$$

In which, $DPI_F$ definition is in the Appendix B. When using the MU-MIMO pre-coding block fed back based on the CSI matrix, the value of $DPI_F$ is 1.

In case of closed-loop MU-MIMO, the STA can indicate the feedback channel information according to the MAC layer.

Multi-Antenna Scheme for Uplink Transmission Channel

The uplink multi-antenna transmission mode supported by this part includes:

Mode 1: open-loop SU-MIMO
Mode 2: closed-loop SU-MIMO

4. Signaling/Feedback Transmission Channel

Here, the signaling/feedback transmission channel refers to the channel used for transmission of signaling and/or feedback of the channel.

In case of STA time-division multiplexing resources, $b_{54}$ $b_{53}$ ... $b_{49}$ indicates the starting of the transmission of packet data and its demodulation pilot from the OFDM symbol with the index of $D(b_{54}\ b_{53}\ ...\ b_{49})$ in the STA resource group. $D(b_{54}\ b_{53}\ ...\ b_{49})$ is the decimal that $b_{54}\ b_{53}\ ...\ b_{49}$ corresponds to, in which, $b_{54}$ is most significant bit and $b_{49}$ is the least significant bit. In the STA resource group, OFDM symbol 0 and OFDM symbol $D(b_{54}\ b_{53}\ ...\ b_{49})-1$ are used for signaling or feedback transmission, and the transmission format is independent from the indication in 0. Its corresponding transmission format is shown as 0.

TABLE 5

Format of signaling/feedback transmission

| | |
|---|---|
| Coding | Convolution code, 1/2 code rate |
| Flow number | Single flow |
| Modulation | QPSK |
| Space-time coding | Forbidden |
| common demodulation pilot | Format 1 (Table 2 and Table 4) |
| Transmission mode | open-loop SU-MIMO |

In addition to the service transmission resources assigned by multiplexing 0, the signaling/feedback transmission can assign the dedicated signaling/feedback transmission resources through the following the broadcast signaling.

Figure 32:
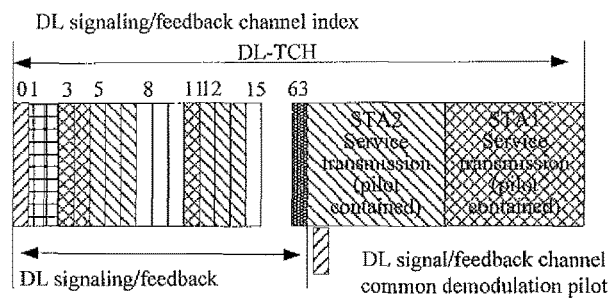
FIG. 32 is a schematic diagram indicating the downlink signaling/feedback transmission channel reuses the DL-TCH resources.

Downlink Signaling/Feedback Transmission Channel:

The downlink signaling/feedback transmission channel reuses the DL-TCH resources, as shown in FIG. 32. All the downlink signaling/feedback transmission channels share one demodulation pilot.

Figure 33:
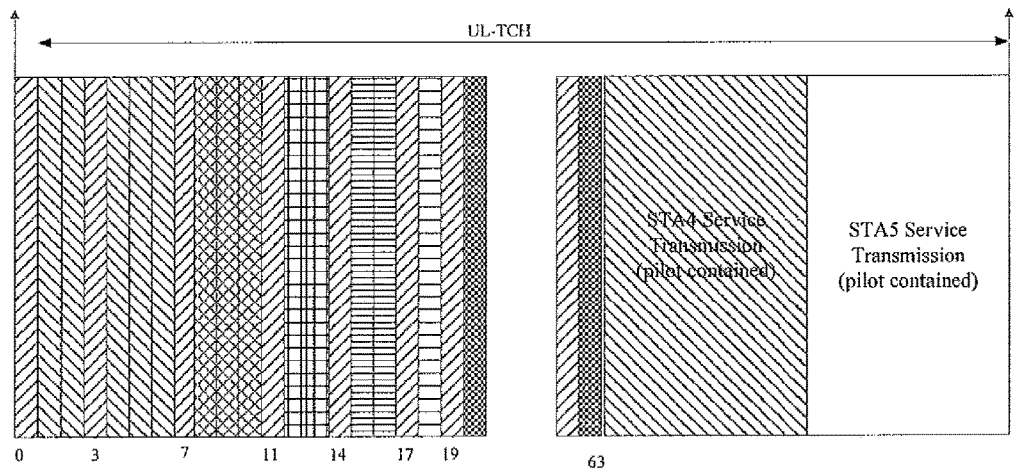
FIG. 33 is a structural diagram indicating the first downlink signaling/feedback channel.
Figure 34:
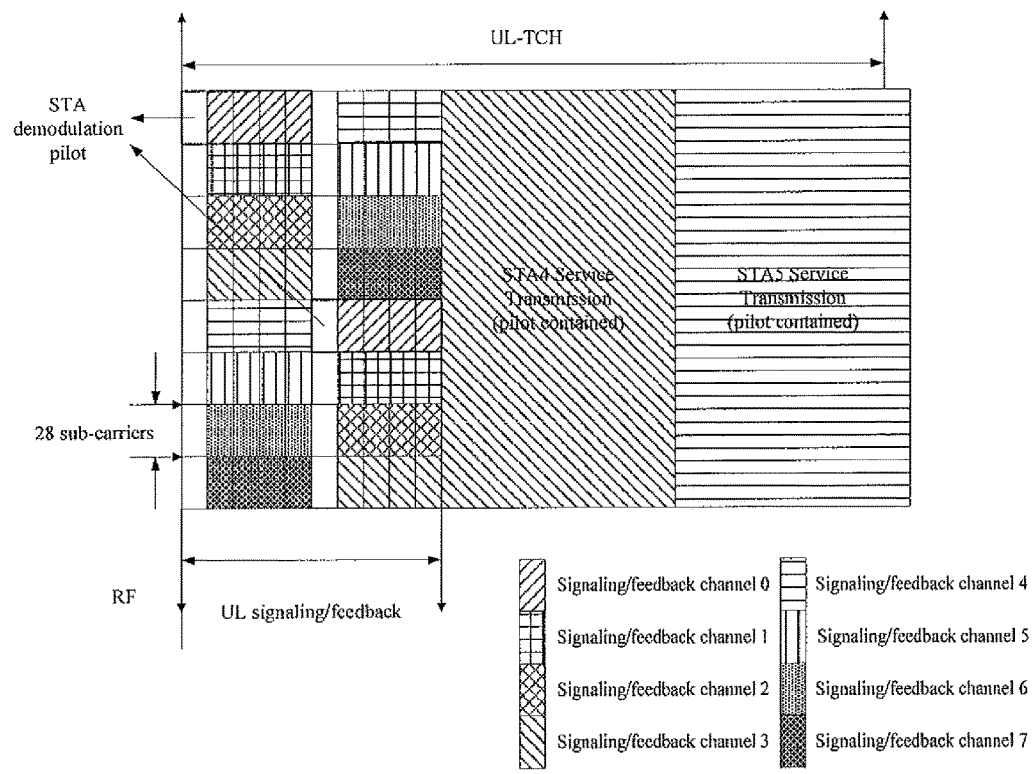
FIG. 34 is a structural diagram indicating the second downlink signaling/feedback channel.

Uplink Signaling/Feedback Transmission Channel:

The uplink signaling/feedback transmission channel reuses the UL-TCH resources. The uplink signaling/feedback transmission channel can support two types of structures, as shown in FIG. 33 and FIG. 34 respectively. In Format 2 in FIG. 34, each basic resource block is $28_{subc} \times 8_{symbol}$ (excluding the phase tracking pilot). Among which, the first 4 OFDM symbols and later 4 OFDM symbols carry out frequency hopping as shown in the diagram.

Resource Indication of Signaling/Feedback Transmission Channel:

In each frame, signaling/feedback transmission channel informs all the STAs of the resources occupied by the DL-TCH and UL-TCH through the CCH broadcast scheduling signaling in the method of broadcast. Such broadcast scheduling signaling uses the control channel resources, having the same block size as the control channel scheduling signaling, and use the same transmission format (See Table 2). CRC check of Broadcast scheduling signaling uses the BSTAID scrambling defined by the MAC layer. Specific definitions of field are shown in Table 6.

TABLE 6

Definitions of signaling field of the resource indication of signaling/feedback transmission channel

| Bit | Definition | |
|---|---|---|
| | DL | UL |
| $b_3 b_2 b_1 b_0$ | broadcast type $b_3 b_2 b_1 b_0 = 0000$, resource indication of downlink signaling/feedback channel $b_3 b_2 b_1 b_0 = 0001$, resource indication of uplink signaling/feedback channel | |
| $b_7 b_6 b_5 b_4$ | 20 MHz sub-channel Bitmap, multiple sub-channels can set the same signaling/feedback channel | |
| $b_{16} b_{15} \ldots b_8$ | Starting OFDM symbol of resource group of the signaling/feedback channel, field value: 0~510 | |
| $b_{22} b_{21} \ldots b_{17}$ | Reserved | |

TABLE 6-continued

Definitions of signaling field of the resource indication of signaling/feedback transmission channel

| Bit | Definition | |
|---|---|---|
| | DL | UL |
| $b_{28} b_{27} \ldots b_{23}$ | The symbols that the signaling/feedback channel occupies, field value: 1~63 | |
| $b_{30} b_{29}$ | reserved | 00: Format 1 01: Format 2 10~11: Reserved |
| $b_{31}$ | 0: downlink broadcast channel assignment is valid; 1: downlink broadcast channel assignment is invalid | reserved |
| $b_{36} b_{35} \ldots b_{32}$ | starting index of signaling/feedback channel that the downlink broadcast channel occupies, field value: 1~31 | |
| $b_{39} b_{38} b_{37}$ | number of the signaling/feedback channel that the downlink broadcast channel occupies, field value: 1~7 | |
| $b_{55} b_{54} \ldots b_{40}$ | Reserved | |
| $b_{71} b_{70} \ldots b_{56}$ | 16-bit CRC is scrambled by BSTAID | |

Among which, the number of OFDM symbols that the downlink signaling feedback channel occupies is $D(b_{28} b_{27} \ldots b_{23})$, and the OFDM symbol with the index 0 is the resource occupied by the common demodulation pilot. The CRC is defined the same as in Table 1.

Signaling/Feedback Transmission Channel Assignment:

Through the signaling shown in Table 7, the CAP assigns the signaling/feedback transmission channel for the STA.

TABLE 7

Definitions of assignment signaling field of the signaling/feedback transmission channel

| Bit | Definition | |
|---|---|---|
| | DL | UL |
| $b_3 b_2 b_1 b_0$ | broadcast type $b_3 b_2 b_1 b_0 = 0010$, downlink signaling/feedback channel assignment $b_3 b_2 b_1 b_0 = 0011$, uplink signaling/feedback channel assignment | |
| $b_7 b_6 b_5 b_4$ | Reserved | |
| $b_{31} b_{30} \ldots b_8$ Channel 1 | $b_{19} b_{18} \ldots b_8$, indicating STA ID $b_{22} b_{21} b_{20}$, reserved $b_{28} b_{27} \ldots b_{23}$, indicating the starting position index of such STA on the signaling/feedback channel, field value ranges from 0~63. $b_{31} b_{30} b_{29}$, indicating the number of occupied signaling/feedback channel, field value: 1~7; field value = 0 indicates such channel indicates that the channel is invalid. | |
| $b_{55} b_{54} \ldots b_{32}$ Channel 2 | $b_{43} b_{42} \ldots b_{32}$, indicating STA ID $b_{46} b_{45} b_{44}$, reserved $b_{52} b_{51} \ldots b_{47}$, indicating the starting position index of such STA on the signaling/feedback channel, field value ranges from 0~63. $b_{55} b_{54} b_{53}$, indicating the number of occupied signaling/feedback channel, field value: 1~7; field value = 0 indicates such channel indicates that the channel is invalid. | |
| $b_{71} b_{70} \ldots b_{56}$ | 16-bit CRC is scrambled by BSTAID | |

Among which:

For the downlink signaling feedback transmission channel, $D(b_{28}\ b_{27}\ \ldots\ b_{23})$ indicates the $1^{st}$ OFDM symbol that corresponds to the downlink signaling feedback transmission channel for the STA, and $D(b_{28}\ b_{27}\ \ldots\ b_{23})=0$ indicates the common demodulation pilot of the downlink signaling feedback transmission channel, and is an invalid indication.

For Format 1 of the uplink signaling feedback transmission channel, $D(b_{28}\ b_{27}\ \ldots\ b_{23})$ indicates the $1^{st}$ OFDM symbol that corresponds to the uplink signaling feedback transmission channel for the STA, and an OFDM symbol corresponding to $D(b_{28}\ b_{27}\ \ldots\ b_{23})-1$ is the demodulation pilot of the uplink signaling feedback transmission channel for the STA. For Format 1, $D(b_{28}\ b_{27}\ \ldots\ b_{23})=0$ is the invalid indication.

For Format 2 of the uplink signaling feedback transmission channel, $D(b_{28}\ b_{27}\ \ldots\ b_{23})$ indicates the index of the uplink signaling feedback transmission channel for the STA, and $D(b_{28}\ b_{27}\ \ldots\ b_{23})=0$ indicates the signaling/feedback channel 0.

For the downlink signaling feedback transmission channel and Format 1 of the uplink signaling feedback transmission channel, each OFDM symbol represents a signaling/feedback channel; and for Format 2 of the uplink signaling feedback transmission channel, each resource block represents a signaling/feedback channel.

5. Uplink and Downlink Sounding Channel

Downlink Sounding Channel:

When $b_{64}=1$ in the system information field SICH, it indicates that this frame is configured with the downlink sounding channel. The specific position of the downlink sounding channel in the downlink transmission channel and the pilot pattern of the downlink sounding channel is indicated by the BCF frame on the MAC layer (Table 2).

Downlink Detection Pilot Pattern:

The number of logic antenna ports that can be supported by the downlink sounding channel is 1~8, with the pilot pattern as follows:

TABLE 8

| | | Detection pilot pattern | |
|---|---|---|---|
| Index | $N_{tx}$ | SPI | $SP_{num}$ |
| 1 | 1 | 4 | 1 |
| 2 | 2 | 4 | 1 |
| 3 | 3 | 4 | 1 |
| 4 | 4 | 4 | 1 |
| 5 | 5 | 4 | 2 |
| 6 | 6 | 4 | 2 |
| 7 | 7 | 4 | 2 |
| 8 | 8 | 4 | 2 |

Table 9 defines the position of a sub-carrier corresponding to each pilot symbol in the demodulation pilot pattern.

TABLE 9

Position of detection pilot

| Carrier aggregation mode | Bandwidth | Detection pilot sub-carrier set |
|---|---|---|
| 1 | 20 MHz | $SC_{sp}^{ti} = [\pm(1+ti-(l-1)\cdot SPI), \pm(1+SPI+ti-(l-1)\cdot SPI), \ldots, \pm(N+ti-(l-1)\cdot SPI)]_{l=\lfloor \frac{ti}{SPI} \rfloor + 1}$ <br><br> $N = 1 + SPI \cdot \lfloor (N_{sr} - ti + (l-1) \cdot SPI - 1)/SPI \rfloor$ <br> $SPI = 4$ <br> $ti = 0 \sim 7$ <br> $N_{sr} = 115$ |
| | 40 MHz | $SC_{sp}^{ti} = \begin{cases} 128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor + 1} \\ -128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor + 1} \end{cases}$ <br><br> $N = 1 + SPI \cdot \lfloor (N_{sr} - ti + (l-1) \cdot SPI - 1)/SPI \rfloor$ <br> $SPI = 4$ <br> $ti = 0 \sim 7$ <br> $N_{sr} = 115$ |
| | 80 MHz | $SC_{sp}^{ti} = \begin{cases} 384 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor + 1} \\ 128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor + 1} \\ -128 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor + 1} \\ -384 + [\pm(1+ti-(l-1)\cdot SPI)), \pm(1+SPI+ti-(l-1)\cdot SPI)), \ldots, \pm(N+ti-(l-1)\cdot SPI))]_{l=\lfloor \frac{ti}{SPI} \rfloor + 1} \end{cases}$ <br><br> $N = 1 + SPI \cdot \lfloor (N_{sr} - ti + (l-1) \cdot SPI - 1)/SPI \rfloor$ <br> $SPI = 4$ <br> $ti = 0 \sim 7$ <br> $N_{sr} = 115$ |

TABLE 9-continued

Position of detection pilot

| Carrier aggregation mode | Bandwidth | Detection pilot sub-carrier set |
|---|---|---|
| 2 | 40 MHz | $SC_{sp}^{ti} = [\pm(1 + ti - (l-1) \cdot SPI), \pm(1 + SPI + ti - (l-1) \cdot SPI), \ldots, \pm(N + ti - (l-1) \cdot SPI)]_{l=\lfloor \frac{ti}{SPI} \rfloor + 1}$ <br> $N = 1 + SPI \cdot \lfloor (N_{sr} - ti + (l-1) \cdot SPI - 1)/SPI \rfloor$ <br> $SPI = 4$ <br> $ti = 0 \sim 7$ <br> $N_{sr} = 243$ |
|  | 80 MHz | $SC_{sp}^{ti} = [\pm(1 + ti - (l-1) \cdot SPI), \pm(1 + SPI + ti - (l-1) \cdot SPI), \ldots, \pm(N + ti - (l-1) \cdot SPI)]_{l=\lfloor \frac{ti}{SPI} \rfloor + 1}$ <br> $N = 1 + SPI \cdot \lfloor (N_{sr} - ti + (l-1) \cdot SPI - 1)/SPI \rfloor$ <br> $SPI = 4$ <br> $ti = 0 \sim 7$ <br> $N_{sr} = 499$ |

Among which, $SC_{sp}^{ti}$ is the sub-carrier index set that the ti antenna port detection pilot occupies; $l=0, 1, \ldots, SP_{num}-1$ indicates the OFDM symbol that the detection pilot occupies.

The downlink detection sequence generates:

The pilot sequence generation polynomial is $1+X^{11}+X^{15}$. The generating sequence obtains the pilot symbol sequence $\{s_i\}$ $i=0, 1, \ldots, 32767$ by the BPSK modulation. The initial status of register is:

[0 0 1 0 1 0 1 1 $a_6$ $a_5$ $a_4$ $a_3$ $a_2$ $a_1$ $a_0$]

MSB is on the left, and LSB is on the right, $a_6$ $a_5$ ... $a_0$ is the MAC address lowest 7 bits of the CAP.

The detection pilot is mapped to the time frequency resources according to the following rules. Now make:

```
i = 231 · l + (k+115)
In the formula: k = -115,...,+115; l = 0,1,...,SP_num -1.
i = 0
for l = 0 : 1 : SP_num -1
    for k = -115 : 1 :+115
        if k ∈ SC_sp^ti
            p^ti_{k,l} = s_i
        else
            p^ti_{k,l} = 0
        end
        i = i+1
    end
end
```

Uplink Sounding Channel
Port of Uplink Detection Pilot
The port of uplink detection pilot is shown in Table 10.

TABLE 10

Port index of uplink detection pilot

| Sub-carrier block index | Position of pilot port sub-carrier | Port index of uplink detection pilot | | | |
|---|---|---|---|---|---|
| | | OFDM symbol 0 | OFDM symbol 1 | OFDM symbol 2 | OFDM symbol 3 |
| 0 | [±1, ±5, ..., ±113] | 0 | 4 | 8 | 12 |
| 1 | [±2, ±6, ..., ±114] | 1 | 5 | 9 | 13 |
| 2 | [±3, ±7, ..., ±115] | 2 | 6 | 10 | 14 |
| 3 | [±4, ±8, ..., ±112] | 3 | 7 | 11 | 15 |

Assignment of Uplink Sounding Channel

CAP assigns the uplink sounding channel for the STA through the signaling indicated in Table 11.

TABLE 11

Definition of assignment signaling field of the uplink sounding channel

| Bit | Definition | |
|---|---|---|
| $b_3b_2b_1b_0$ | broadcast type <br> $b_3b_2b_1b_0$-0111, resource indication of uplink sounding channel | |
| $b_7b_6b_5b_4$ | reserved | |
| $b_{23}b_{22} \ldots b_8$ | Port 1 | $b_{19}b_{18} \ldots b_8$, STA ID <br> $b_{23}b_{22} \ldots b_{20}$, port index of uplink detection pilot |
| $b_{39}b_{38} \ldots b_{24}$ | Port 2 | $b_{35}b_{34} \ldots b_{24}$, STA ID <br> $b_{39}b_{38} \ldots b_{36}$, port index of uplink detection pilot |
| $b_{55}b_{54} \ldots b_{40}$ | Port 3 | $b_{51}b_{50} \ldots b_{40}$, STA ID <br> $b_{55}b_{54} \ldots b_{52}$, port index of uplink detection pilot |
| $b_{71} b_{70} \ldots b_{56}$ | 16-bit CRC is scrambled by BSTAID | |

Among which, port index of uplink detection pilot indicates the detection pilot port of the STA antenna 0. If the STA is the multi-antenna configuration, the port index of uplink detection pilot of other antenna is as follows:

$$SP_{ti}^{UL} = D(b_k b_{k-1}, \ldots, b_{k-3}) + ti(ti=0,1,\ldots,7)$$

Among which, $D(b_k b_{k-1} \ldots b_{k-3})$ indicates the decimal that $b_k b_{k-1} \ldots b_{k-3}$ corresponds to.

Uplink Detection Pilot Sequence:

The pilot sequence generation polynomial is $1+X^{11}+X^{15}$. The generating sequence obtains the pilot symbol sequence $\{s_i\}$ $i=0, 1, \ldots, 32767$ by BPSK modulation. The initial status of register is:

[0 0 1 0 1 0 1 1 $a_6$ $a_5$ $a_4$ $a_3$ $a_2$ $a_1$ $a_0$]

MSB is on the left, and LSB is on the right, $a_6$ $a_5$ ... $a_0$ is the MAC address lowest 7 bits of the CAP.

The uplink detection pilot port set assigned by the CAP for the STA is: $SP_{port}^{ti} = \{(k,l) | k \in [-115,+115], l \in [0,3]\}$, in which k is the sub-carrier index in Table 10, l is the OFDM symbol index in Table 10, ti is the STA antenna port index, and port is the port index of uplink detection pilot. The uplink detection pilot is mapped to the time frequency resources according to the following rules. Now make:

```
        i = 231 · l + (k+115)
In the formula: k = -115,..., +115 , l = 0,1,2,3
i = 0
for l = 0 : 1 : 3
    for k = -115 : 1 : +115
        if {k,l} ∈ {SP_port^ti |ti = 0,1,...,N_tx -1}
            p^{k,l}_port = s_i
        else
            p^{k,l}_port = 0
        end
        i = i+1
    end
end
```

6. Uplink Scheduling Request Channel

Figure 35:
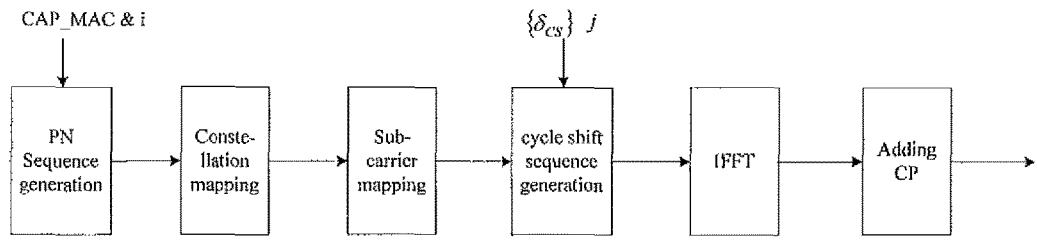
FIG. 35 is a schematic diagram indicating the generating method of uplink scheduling request channel.

The uplink scheduling request signal is generated by the method as shown in FIG. 35.

In the diagram, CAP_MAC indicates the lowest 7 bits of MAC address of the CAP, i is the PN sequence index (0≤i<4), $\{\delta_{CS}\}$ is the parameter set of cyclic shift, is parameter index of cyclic shift (0≤j<8).

Generation of PN Sequence

Figure 36:
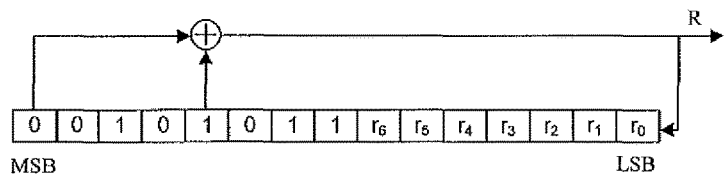
FIG. 36 is a block diagram indicating a PN sequence feeding back the shift register sequence with the maximum length linear.

PN sequence uses the generating polynomial $1+X^{11}=X^{15}$ to feed back the shift register sequence with the maximum length linear, with its block diagram shown in FIG. 36.

Initial value of the register $r_{init}=[00101011 r_6 r_5 r_4 r_3 r_2 r_1 r_0]_b$. MSB is on the left, and LSB is on the right; In which, $[r_6 r_5 r_4 r_3 r_2 r_1 r_0]_b$=CAP_MAC, which is the MAC address lowest 7 bits of the CAP.

Modulation Mapping

The sequence $S_i$ obtains the sequence $C_i$ by the BPSK modulation.

Sub-Carrier Mapping

The sequence $C_i$ carries out the sub-carrier mapping according to the following formula, and obtains the sequence $M_i$.

$$M_{i,k} = \begin{cases} C_{i,k+112} & \text{if } -112 \le k < 0 \\ C_{i,k+111} & \text{if } 1 \le k < 113 \\ 0 & \text{otherwise} \end{cases}$$

Frequency Domain Cyclic Shift

Carry out the cyclic shift in the formula below to the sequence $M_i$ after sub-carrier mapping, to carry out the sequence $$T^j_{i,k} = M_{i,k} e^{-j \frac{2\pi k \delta^j_{CS}}{N_{IFFT}}}$$

In the formula: $N_{IFFT}$ is the point number of IFFT, $$k \in \left[-\frac{N_{IFFT}}{2}, \frac{N_{IFFT}}{2} - 1\right],$$

$\delta_{CS}^j$ is the parameter of cyclic shift, and the unit is the number of sampling point. For the 20 MHz system, $N_{IFFT}$=256, $\{\delta_{CS}\}$={0 32 64 96 128 160 192 224}.

Resource Assignment of Independent Resource Request Frame

Through the signaling shown in Table 12, the CAP assigns the UL-TCH resources occupied by the independent resource request frame for the STA.

TABLE 12

Resource assignment of resource request frame

| Bit | Definition |
|---|---|
| $b_3 b_2 b_1 b_0$ | broadcast type |
| | $b_3 b_2 b_1 b_0$ = 0110, independent resource request frame (assign resources for the independent resource request frame) |
| $b_7 b_6 b_5 b_4$ | reserved |
| $b_{23} b_{22} \ldots b_8$ Assignment 1 | $b_9 b_8$ = 00, corresponding to the scheduling request of the first OFDM symbol of the UL-SRCH |
| | $b_9 b_8$ = 01, corresponding to the scheduling request of the second OFDM symbol of the UL-SRCH |
| | $b_9 b_8$ = 10, corresponding to the scheduling request of the third OFDM symbol of the UL-SRCH |
| | $b_9 b_8$ = 11, corresponding to the scheduling request of the fourth OFDM symbol of the UL-SRCH |
| | $b_{11} b_{10}$, PN sequence index, field value: 0~3 |
| | $b_{14} b_{13} b_{12}$, PN sequence frequency cyclic shift index |
| | 000 cyclic shift 0, 001 cyclic shift 32, and the like, 111 cyclic shift 224 |
| | $b_{17} b_{16} b_{15}$, lowest 3-bit indication of system frame number generated by scheduling request |
| | $b_{23} b_{22} \ldots b_{18}$, indicating the starting position index of the resources assigned by the scheduling request on the signaling/feedback channel, field value ranges from 1~63, field value = 0 indicates invalid indication |
| $b_{39} b_{38} \ldots b_{24}$ Assignment 2 | $b_{25} b_{24}$, defined same as $b_9 b_8$ |
| | $b_{27} b_{26}$, PN sequence index, field value: 0~3 |
| | $b_{30} b_{29} b_{28}$, PN sequence frequency cyclic shift index |
| | 000 cyclic shift 0, 001 cyclic shift 32, and the like, 111 cyclic shift 224 |
| | $b_{33} b_{32} b_{31}$, lowest 3-bit indication of system frame number generated by scheduling request |
| | $b_{39} b_{38} \ldots b_{34}$, indicating the starting position index of the resources assigned by the scheduling request on the signaling/feedback channel, field value ranges from 1~63, field value = 0 indicates invalid indication |

TABLE 12-continued

Resource assignment of resource request frame

| Bit | Definition |
| --- | --- |
| $b_{55}b_{54} \ldots b_{40}$ Assignment 3 | $b_{41}b_{40}$, defined same as $b_9b_8$<br>$b_{43}b_{42}$, PN sequence index, field value: 0~3<br>$b_{46}b_{45}b_{44}$, PN sequence frequency cyclic shift index<br>000 cyclic shift 0, 001 cyclic shift 32, and the like, 111 cyclic shift 224<br>$b_{49}b_{48}b_{47}$, lowest 3-bit indication of system frame number generated by scheduling request<br>$b_{55}b_{54} \ldots b_{50}$, indicating the starting position index of the resources assigned by the scheduling request on the signaling/feedback channel, field value ranges from 1~63, field value = 0 indicates invalid indication |
| $b_{71}b_{70} \ldots b_{56}$ | 16-bit CRC is scrambled by BSTAID |

7. Uplink Random Access Channel

Generation of Random Access Signal

The generation of random access signal is same as that of the uplink scheduling request signal. The sequence index number and cyclic shift index number $\{i,j\}$ of uplink random access signal are selected by each STA randomly.

Figure 37:
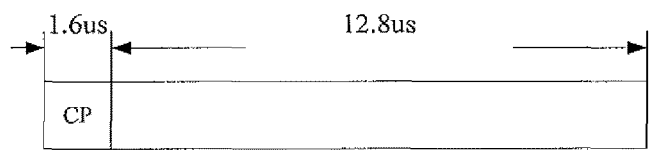
FIG. 37 is a structural diagram indicating the first uplink random access channel.

Format of Random Access Channel:

Format 1 is shown in FIG. 37, $\{\delta_{CS}\}$=(0 1.6 us 3.2 us 4.8 us 6.4 us 8.0 us 9.6 us 11.2 us)

Figure 38:
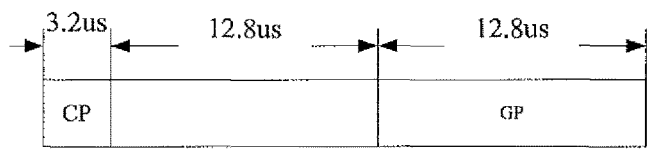
FIG. 38 is a structural diagram indicating the second uplink random access channel.

Format 2 is shown in FIG. 38, $\{\delta_{CS}\}$={0 3.2us 6.4us 9.6us}

Figure 39:
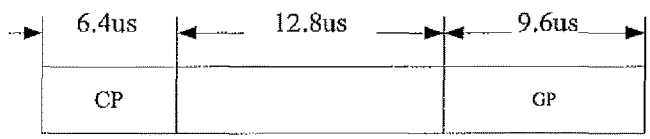
FIG. 39 is a structural diagram indicating the third uplink random access channel.

Format 3 is shown in FIG. 39, $\{\delta_{CS}\}$={0 6.4us}

The Resource Assignment of Random Access Request Frame:

Through the signaling shown in Table 13, the CAP assigns the UL-TCH resources occupied by the random access request frame for the STA.

TABLE 13

Resource assignment of random access request frame

| Bit | Definition |
| --- | --- |
| $b_3b_2b_1b_0$ | broadcast type<br>$b_3b_2b_1b_0$ = 0100, random access request(assign resources for the random access request frame) |
| $b_7b_6b_5b_4$ | reserved |
| $b_{31}b_{30} \ldots b_8$ Assignment 1 | $b_9b_8$, PN sequence index, field value 0~3<br>$b_{12}b_{11}b_{10}$, PN sequence frequency cyclic shift index<br>000 cyclic shift 0, 001 cyclic shift 32, and the like, 111 cyclic shift 224<br>$b_{15}b_{14}b_{13}$, The system's frame number of random access generation is minimum 3 bits<br>$b_{25}b_{24} \ldots b_{16}$, transmission timing advance<br>$b_{31}b_{30} \ldots b_{26}$, starting position index of the resources assigned by the random access request in the signaling/feedback channel, field value ranges from 1~63, field value = 0 indicates the invalid indication |
| $b_{55}b_{54} \ldots b_{32}$ Assignment 2 | $b_{33}b_{32}$, PN sequence index, field value 0~3<br>$b_{36}b_{35}b_{34}$, PN sequence frequency cyclic shift index<br>000 cyclic shift 0, 001 cyclic shift 32, and the like, 111 cyclic shift 224<br>$b_{39}b_{38}b_{37}$, the system's frame number of random access generation is minimum 3 bits<br>$b_{49}b_{48} \ldots b_{40}$, transmission timing advance<br>$b_{55}b_{54} \ldots b_{50}$, starting position index of the resources assigned by the random access request in the signaling/feedback channel, field value ranges from 1~63, field value = 0 indicates the invalid indication |
| $b_{71}b_{70} \ldots b_{56}$ | 16-bit CRC is scrambled by BSTAID |

Among which, transmit the timing advance as $D(b_{i+5} b_{i+4} \ldots b_i) \cdot N$, unit: number of sample point. The timing advance is in the unit of 100 ns, if the sampling clock is 20 MHz, N=2.

Resource Assignment of the Random Access Response Frame:

Through the signaling shown in Table 14, the CAP assigns the UL-TCH resources occupied by the random access response frame for the STA,

TABLE 14

Resource assignment of random access response frame

| Bit | Definition |
|---|---|
| $b_3b_2b_1b_0$ | broadcast type<br>$b_3b_2b_1b_0$ = 0101, random access response frame (assign resources for the random access response frame) |
| $b_7b_6b_5b_4$ | reserved |
| $b_{23}b_{22} \ldots b_8$<br>Assignment 1 | $b_9b_8$, PN sequence index, field value 0~3<br>$b_{12}b_{11}b_{10}$, PN sequence frequency cyclic shift index<br>000 cyclic shift 0, 001 cyclic shift 32, and the like, 111 cyclic shift 224<br>$b_{15}b_{14}b_{13}$, the system's frame number of random access generation is minimum 3 bits<br>$b_{21}b_{20} \ldots b_{16}$, indicates the index of the resources assigned by the random access response at starting position of the signaling/feedback channel, field value ranges from 1~63, field value = 0 indicates the invalid indication<br>$b_{23}b_{22}$, reserved |
| $b_{39}b_{38} \ldots b_{24}$<br>Assignment 2 | $b_{25}b_{24}$, PN sequence index, field value 0~3<br>$b_{28}b_{27}b_{26}$, PN sequence frequency cyclic shift index<br>000 cyclic shift 0, 001 cyclic shift 32, and the like, 111 cyclic shift 224<br>$b_{31}b_{30}b_{29}$, the system's frame number of random access generation is minimum 3 bits<br>$b_{37}b_{36} \ldots b_{32}$, indicates the index of the resources assigned by the random access response at starting position of the signaling/feedback channel, field value ranges from 1~63, field value = 0 indicates the invalid indication<br>$b_{39}b_{38}$, reserved |
| $b_{55}b_{54} \ldots b_{40}$<br>Assignment 3 | $b_{41}b_{40}$, PN sequence index, field value 0~3<br>$b_{44}b_{43}b_{42}$, PN sequence frequency cyclic shift index<br>000 cyclic shift 0, 001 cyclic shift 32, and the like, 111 cyclic shift 224<br>$b_{47}b_{46}b_{45}$, the system's frame number of random access generation is minimum 3 bits<br>$b_{53}b_{52} \ldots b_{48}$, indicates the index of the resources assigned by the random access response at starting position of the signaling/feedback channel, field value ranges from 1~63, field value = 0 indicates the invalid indication<br>$b_{55}b_{54}$, reserved |
| $b_{71}b_{70} \ldots b_{56}$ | 16-bit CRC is scrambled by BSTAID |

Uplink Power Control

Open-Loop Power Control

Considering the reciprocity of the uplink and downlink channel of the TDD system, the open-loop power control can be used.

$$P_{STA} = \min\{P_{STA\_MAX}, PL_{OL} + C/N + 10\log_{10}(BW)\} \text{ (dBm)}$$

In the formula:

$PL_{OL}$: transmission path loss estimate. It can be estimated according to the receiving signal power of the STA and the sending power of the CAP. The sending power of the CAP is indicated in the BCF frame on the MAC layer.

C/N carrier to noise ratio that different MCS corresponds to.

BW: transmission bandwidth assigned by the CAP for the STA.

Closed-Loop Control:

TABLE 15

Closed-loop control signaling

| Bit | Definition |
|---|---|
| $b_3b_2b_1b_0$ | broadcast type<br>$b_3b_2b_1b_0$ = 1000, closed-loop control link control |
| $b_7b_6b_5b_4$ | reserved |
| $b_{55}b_{54} \ldots b_8$<br>indication | $b_{19}b_{18} \ldots b_8$, STAID<br>$b_{29}b_{28} \ldots b_{20}$, timing advance<br>$b_{31}b_{30}$, reserved<br>$b_{39}b_{38} \ldots b_{32}$, transmission power is adjusted to<br>$b_{39}b_{38} \ldots b_{32}$ indicates the decimal n with the symbol, and the unit is dBm. Among which, |

TABLE 15-continued

Closed-loop control signaling

| Bit | Definition |
|---|---|
|  | n = −128~127 (the negative part is expressed in complement form).<br>$b_{55}b_{54} \ldots b_{40}$, reserved |
| $b_{71}b_{70} \ldots b_{56}$ | 16-bit CRC is scrambled by BSTAID |

The Fifth Embodiment

The embodiment in the present invention provides a resource indication method used to indicate the signaling and/or feedback transmission resources, including:

Step 1: generating the scheduling signaling carrying the indication information that indicates the resources for the signaling and/or feedback transmission in the user resource group; where the user resource group is used for the user service data transmission;

Step 2: Sending the scheduling signaling.

Among which, the scheduling signaling further carries the indication information that indicates the starting position and the length of the user resource group.

In the embodiment of the present invention, the resources for the signaling and/or feedback transmission is multiplexed with user transmission resources, and accordingly the signaling feedback channel is multiplexed with the transmission channel according to the resource scheduling. The format of the scheduling signaling can be referred to in Table 2, $b_{54} b_{53} \ldots b_{49}$ indicates that the service transmission is started with the transmission of packet data and its demodulation pilot from the OFDM symbol with an index of D($b_{54}$ $b_{53} \ldots b_{49}$) in the STA resource group. $D(b_{54} b_{53} \ldots b_{49})$ is the decimal that $b_{54} b_{53} \ldots b_{49}$ corresponds to, in which, $b_{54}$ is the most significant bit and $b_{49}$ is the least significant bit. Correspondingly, as shown in FIG. 33, in the user resource group, OFDM symbols 0 to $D(b_{54} b_{53} \ldots b_{49})-1$ are used for signaling or feedback transmission; the transmission of the packet data and its demodulation pilot is started from the OFDM symbol with an index of $D(b_{54} b_{53} \ldots b_{49})$ in the STA resource group.

When transmitting the signaling and/or feedback information, the transmission is conducted according to a signaling and/or feedback transmission format predetermined by both parties.

To realize the above resource indication method, the embodiment in the present invention also provides a resource indication device, including:

an encapsulating module which is used to generate a scheduling signaling, carrying indication information that indicates resources for the signaling and/or feedback transmission in the user resource group; wherein the user resource group is used for user service data transmission; and a sending module which is used to send the scheduling signaling.

Among which, the scheduling signaling also carries the indication information that indicates the starting position and a length of the user resource group.

Among which, the scheduling signaling also indicates the transmission in accordance with the preset signaling and/or feedback transmission format.

Correspondingly, the embodiment in the present invention also provides a data sending method, used to receive the above scheduling signaling, so that the transmission is carried out, and the method includes:

Step 1: receiving a scheduling signaling carrying the indication information that indicates the resources for signaling and/or feedback transmission in the user resource group; where the user resource group is used for user service data transmission; and Step 2: transmitting the signaling and/or feedback message at the corresponding position in the user resource group according to the indication information.

Among which, in transmitting the data, the transmission is conducted according to the preset signaling and/or feedback transmission format.

To realize the above data sending method, the embodiment in the present invention also provides a data sending device, including:

a receiving module which is used to receive the scheduling signaling carrying the indication information that indicates the resources for signaling and/or feedback transmission in a user resource group; where the user resource group is used for user service data transmission; and a sending module which is used to transmit a signaling and/or feedback message at the corresponding position in the user resource group according to the indication information.

Among which, the sending module is used for transmission according to the preset signaling and/or feedback transmission format.

A Sixth Embodiment

The embodiment in the present invention provides a resource indication method used to indicate signaling and/or feedback transmission resources, including:

Step 1: generating a first scheduling signaling carrying the information that indicates the resources for the signaling and/or feedback transmission; and Step 2: sending the first scheduling signaling.

Among which, the information that indicates the signaling and/or feedback transmission includes the starting position and a length.

Among which, the information that indicates the signaling and/or feedback transmission includes the format used to indicate the resource multiplexing manner.

Among which, the resource multiplexing manner can be a time-division multiplexing, frequency-division multiplexing, time frequency multiplexing or code division multiplexing manner.

Among which, the information that indicates the signaling and/or feedback transmission includes the indication of a sub-channel or sub-carrier applicable to the first scheduling signaling in the spectrum aggregation mode.

After the above Step 2, the method further includes Step 3 and Step 4:

Step 3: generating a second scheduling signaling carrying the information for assigning the resources for the signaling and/or feedback transmission, to indicate the resources for signaling and/or feedback transmission assigned for each user; and Step 4: sending the second scheduling signaling.

Among which, the information for assigning the resources for the signaling and/or feedback transmission includes one or more user identifiers STAIDs, as well as the starting position and the length of the resources of the corresponding STA in the signaling and/or feedback transmission.

Among which, the STAID is used for unique identification of an STA.

Among which, the STAID can also be the broadcast ID. The broadcast ID refers to an ID shared by all the STAs, and each STA can receive the corresponding signaling through the broadcast ID.

Among which, the length of the STA may be indicated through indicating the number of the signaling and/or feedback channels that the STA occupies. The unit length of each signaling and/or feedback channel is 1 OFDM symbol (Mode 1, that is, a time-division multiplexing manner) or 1 unit resource block (Mode 2, that is, a time frequency multiplexing manner).

In the embodiment of the present invention, the resources for the signaling and/or feedback transmission is independent from the user transmission resources. Specifically, the first scheduling signaling of the embodiment in the present invention can be shown as in Table 6, and the second scheduling signaling can be shown in Table 7. Both of the types of transmission modes shown in FIG. 33 and FIG. 34 are supported.

To realize the above resource indication method, the embodiment in the present invention also provides a resource indication device, including:

a first encapsulating module which is used to generate a first scheduling signaling carrying the information that indicates the resources for the signaling and/or feedback transmission; and a first sending module which is used to send the first scheduling signaling.

Among which, the information that indicates the resources for the signaling and/or feedback transmission includes the starting position and the length of the resources.

Among which, the information that indicates the resources for the signaling and/or feedback transmission includes the format used to indicate the resource multiplexing manner.

Among which, the resource multiplexing manner is a time-division multiplexing, frequency-division multiplexing, time frequency multiplexing or code division multiplexing manner.

Among which, the information that indicates the resources for the signaling and/or feedback transmission includes the indication of a sub-channel or a sub-carrier applicable to the first scheduling signaling in the spectrum aggregation mode.

The above resource indication device also includes:

a second encapsulating module which is used to generate the second scheduling signaling carrying the information for assigning the resources for the signaling and/or feedback transmission, to indicate the resources of signaling and/or feedback transmission assigned for each user; and a second sending module which is used to send the second scheduling signaling.

Among which, the information for assigning the resources for the signaling and/or feedback transmission includes one or more user identifiers STAIDs, as well as the starting position and the length of the resources of the corresponding STA in the signaling and/or feedback transmission.

Among which, the STAID is used for unique identification of an STA.

Among which, the STAID can also be the broadcast ID.

Among which, the length of the STA is indicated through indicating the number of the signaling and/or feedback channels that the STA occupies. The unit length of each signaling and/or feedback channel is 1 OFDM symbol (See FIG. 33 for Mode 1) or 1 unit resource block (See FIG. 34 for Mode 2).

It should be understood that the specific order or hierarchy of the steps in the process disclosed is only an example of the exemplary method. It should be understood that the specific order or hierarchy of the steps in the process may be re-arranged based on design preferences, without departing from the scope of the invention. The appended method claims provide various step factors in an exemplary order, but are not limited to the specific order or hierarchy.

In the above detailed description, various features are combined in a single embodiment for the sake of simplification of the disclosure. This disclosing manner should not be interpreted as reflecting such an intention that: the embodiment of the claimed subject requires more features than those stated clearly in each claim. On the contrary, as reflected in the appended claims, the invention may be in a state with less features than all features of a single disclosed embodiment. Therefore, the appended claims are hereby incorporated in the detailed description clearly, and each claim independently presents an individual preferred implementation solution of the invention.

The above description includes the examples of one or more embodiments. However, it is impossible to exhaust all potential combinations of the components and methods in describing the above embodiments, but it should be understood by one skilled in the art that components and methods of each embodiment may be further combined and arranged. Therefore, the embodiments described herein intend to contemplate all such changes, modifications and variations that fall into the scope of the appended claims. In addition, the term "comprise" used in the specification or the claims is similar to the term "include", just like the interpretation of the term "include" in the claims as a connection word.

Additionally, any term "or" used in the claims or the specification intends to represent a "nonexclusive or".

The invention claimed is:

1. A resource scheduling method, comprising:
scheduling resources according to a transmission demand; and
configuring a frame structure which has an unfixed frame length and matches with the scheduled resources;
wherein
at least a preamble sequence and a system information channel are configured in the frame structure; the preamble sequence is used to realize synchronization; the system information channel is used to carry the information indicating the frame structure, when there is a demand on uplink transmission, uplink transmission resources are scheduled according to the demand on uplink transmission, to configure an uplink transmission channel in the frame structure, and when there is a demand on downlink transmission, downlink transmission resources are scheduled according to the demand on downlink transmission, to configure a downlink transmission channel in the frame structure;
and wherein
when there is the demand on uplink transmission, a downlink sounding channel and a channel quality information (CQI) feedback channel are configured in the frame structure, where the downlink sounding channel is used by a circuit access point (CAP) to send a downlink sounding signal to a station (STA), and the CQI feedback channel is used by the STA to feed back downlink CQI measured according to the downlink sounding signal to the CAP; and when scheduling the uplink transmission resources according to the demand on uplink transmission, uplink CQI is determined according to the downlink CQI fed back by the STA based on uplink and downlink reciprocity, and the uplink transmission resources are scheduled in combination with the uplink CQI; or,
when there is the demand on uplink transmission, a downlink sounding channel, a CQI feedback channel and a CSI feedback channel are configured in the frame structure, where the downlink sounding channel is used by the CAP to send a downlink sounding signal to the STA, the CQI feedback channel is used by the STA to feed back downlink CQI measured according to the downlink sounding signal to the CAP, and a channel status information (CSI) feedback channel is used by the STA to feed back downlink CSI measured according to the downlink sounding signal to the CAP; and when scheduling the uplink transmission resources according to the demand on uplink transmission, uplink CQI is determined from the downlink CQI fed back by the STA and uplink CSI is determined from the downlink CSI fed back by the STA based on uplink and downlink reciprocity, and the uplink transmission resources are scheduled in combination with the uplink CQI and the uplink CSI; or,
when there is the demand on uplink transmission, an uplink sounding channel, a downlink sounding channel and a CQI feedback channel are configured in the frame structure, where the uplink sounding channel is used by the STA to send an uplink sounding signal to the CAP, the downlink sounding channel is used by the CAP to send a downlink sounding signal to the STA, and the CQI feedback channel is used by the STA to feed back downlink CQI measured according to the downlink sounding signal to the CAP; and when scheduling the uplink transmission resources according to the demand on uplink transmission, the uplink sounding signal is measured on the uplink sounding channel to calculate uplink channel status information CSI, uplink CQI is determined according to the downlink CQI fed back by the STA based on uplink and downlink reciprocity, and the uplink transmission resources are scheduled in combination with the uplink CQI and uplink CSI; or, when there is the demand on uplink transmission, the uplink sounding channel, a downlink sounding channel and a CSI feedback channel are configured in the frame structure, where an uplink sounding channel is used by the STA to send an uplink sounding signal to the CAP, the downlink sounding channel is used by the CAP to send a downlink sounding signal to the STA, and the CSI feedback channel is used by the STA to feed back downlink CSI measured according to the downlink sounding signal to the CAP; and when scheduling the uplink transmission resources according to the demand on uplink transmission, the uplink sounding signal is measured on the uplink sounding channel to calculate uplink channel quality information CQI, uplink CSI is determined according to the downlink CSI fed back by the STA based on uplink and downlink reciprocity, and the uplink transmission resources are scheduled in combination with the uplink CQI and the uplink CSI; or when there is the demand on downlink transmission, an uplink sounding channel used by the STA to send an uplink sounding signal to the CAP is configured in the frame structure; and when scheduling the downlink transmission resources according to the demand on downlink transmission, the uplink sounding signal is measured on the uplink sounding channel to calculate uplink CQI, downlink CQI is determined based on uplink and downlink reciprocity, and the downlink transmission resources are scheduled in combination with the determined downlink CQI; or, when there is the demand on downlink transmission, an uplink sounding channel used by the STA to send an uplink sounding signal to the CAP is configured in the frame structure; and when scheduling the downlink transmission resources according to the demand on downlink transmission, the uplink sounding signal is measured on the uplink sounding channel to calculate uplink CQI and uplink CSI, downlink CQI and downlink CSI are obtained based on uplink and downlink reciprocity, and the downlink transmission resources are scheduled in combination with the downlink CQI and the downlink CSI; or, when there is the demand on downlink transmission, an uplink sounding channel, a downlink sounding channel and a CQI feedback channel are configured in the frame structure, wherein the uplink sounding channel is used by the STA to send an uplink sounding signal to the CAP, a downlink sounding channel is used by the CAP to send the downlink sounding signal to the STA, and the CQI feedback channel is used by the STA to feed back downlink CQI measured by the downlink sounding signal to the CAP; and when scheduling the downlink transmission resources according to the demand on downlink transmission, the uplink sounding signal is measured on the uplink sounding channel to calculate uplink CSI, downlink CSI is determined based on uplink and downlink reciprocity, and the downlink transmission resources are scheduled according to the downlink CSI and the downlink CQI fed back by the STA.

2. The method of claim 1, wherein, the demand on uplink transmission includes one or more of a demand on uplink service transmission, a demand on uplink signaling transmission and a demand on the feedback of a downlink service;

the uplink transmission channel configured according to the demand on uplink transmission includes one or more of an uplink service transmission channel, an uplink signaling channel and a downlink service feedback channel;

the demand on downlink transmission includes one or more of a demand on downlink service transmission, a demand on downlink signaling transmission and a demand on the feedback of an uplink service; and the downlink transmission channel configured according to the demand on downlink transmission includes one or more of a downlink service transmission channel, a downlink signaling channel and an uplink service feedback channel.

3. The method of claim 1, further comprising:

configuring a control channel in the frame structure, to indicate assignment and scheduling of transmission resources and a transmission format of a channel occupying the transmission resources.

4. The method of claim 1, wherein, configuring an uplink scheduling request channel in the frame structure, wherein the uplink scheduling request channel is used by the STA to send an uplink scheduling request, to request for transmission resources which are used to report to the CAP the demand on uplink transmission.

5. The method of claim 1, wherein, configuring a random access channel in the frame structure, and the random access channel is used by the STA to access and establish a relation with the CAP.

6. A resource scheduling device, comprising: a hardware processor, and a communication unit for signal transmission, the processor being configured to:

schedule resources according to a transmission demand; and configure a frame structure which has an unfixed frame length and matches with the scheduled resources; wherein, the hardware processor configures at least a preamble sequence and a system information channel in the frame structure;

wherein, the preamble sequence is used to realize synchronization, and the system information channel is used to carry information indicating the frame structure;

the hardware processor is used to schedule the uplink transmission resources according to a demand on uplink transmission, to configure an uplink transmission channel in the frame structure; and further used to schedule the downlink transmission resources according to a demand on downlink transmission, and configures a downlink transmission channel in the frame structure;

and wherein the hardware processor is adapted to, when there is the demand on uplink transmission, configure a downlink sounding channel and a CQI feedback channel in the frame structure, where the downlink sounding channel is used by a CAP to send a downlink sounding signal to a STA, and the CQI feedback channel is used by the STA to feed back downlink CQI measured by the downlink sounding signal to the CAP; and when scheduling the uplink transmission resources according to the demand on uplink transmission, determine uplink CQI according to the downlink CQI fed back by the STA based on uplink and downlink reciprocity, and schedule the uplink transmission resources in combination with the uplink CQI; or, the hardware processor is adapted to, when there is the demand on uplink transmission, configure a downlink sounding channel, a CQI feedback channel and a CSI feedback channel in the frame structure, where the downlink sounding channel is used by the CAP to send a downlink sounding signal to the STA, the CQI feedback channel is used by the STA to feed back downlink CQI measured according to the downlink sounding signal to the CAP, and a CSI feedback channel is used by the STA to feed back downlink CSI measured according to the downlink sounding signal to the CAP; and when scheduling the uplink transmission resources according to the demand on uplink transmission, determine uplink CQI according to the downlink CQI fed back by the STA based on uplink and downlink reciprocity, determine uplink CSI according to the downlink CSI fed back by the STA, and schedule the uplink transmission resources in combination with the uplink CQI and the uplink CSI; or, the hardware processor is adapted to, when there is the demand on uplink transmission, configure the uplink sounding channel, a downlink sounding channel and a CQI feedback channel in the frame structure, wherein an uplink sounding channel is used by the STA to send an uplink sounding signal to the CAP, the downlink sounding channel is used by the CAP to send a downlink sounding signal to the STA, and the CQI feedback channel is used by the STA to feed back downlink CQI measured by the downlink sounding signal to the CAP; and when scheduling the uplink transmission resources according to the demand on uplink transmission, measure the uplink sounding signal according to the demand on uplink transmission to calculate uplink channel status information CSI, determine uplink CQI according to the downlink CQI fed back by the STA based on uplink and downlink reciprocity, and schedule the uplink transmission resources in combination with the uplink CQI and uplink CSI; or, the hardware processor is adapted to, when there is the demand on uplink transmission, configure an uplink sounding channel, a downlink sounding channel and a CSI feedback channel in the frame structure, wherein the uplink sounding channel is used by the STA to send an uplink sounding signal to the CAP, the downlink sounding channel is used by the CAP to send a downlink sounding signal to the STA, and the CSI feedback channel is used by the STA to feed back downlink CSI measured by the downlink sounding signal to the CAP; and when scheduling the uplink transmission resources according to the demand on uplink transmission, measure the uplink sounding signal according to the demand on uplink transmission to calculate uplink channel quality information CQI, determine uplink CSI according to the downlink CSI fed back by the STA based on uplink and downlink reciprocity, and schedule the uplink transmission resources in combination with the uplink CQI and the uplink CSI; or the hardware processor is adapted to, when there is the demand on downlink transmission, configure an uplink sounding channel in the frame structure, and the uplink sounding channel is used by the STA to send an uplink sounding signal to the CAP; and when scheduling the downlink transmission resources according to the demand on downlink transmission, measure the uplink sounding signal on the uplink sounding channel to calculate uplink CQI, determine downlink CQI based on uplink and downlink reciprocity, and schedule the downlink transmission resources in combination with the determined downlink CQI; or, the hardware processor is adapted to, when there is the demand on uplink transmission, configure an uplink sounding channel in the frame structure, wherein the uplink sounding channel is used by the STA to send an uplink sounding signal to the CAP; and when scheduling the downlink transmission resources according to the demand on downlink transmission, measure the uplink sounding signal according to the demand on uplink transmission to calculate uplink CQI and uplink CSI, determine downlink CQI and downlink CSI based on uplink and downlink reciprocity, and schedule the downlink transmission resources in combination with the downlink CQI and downlink CSI; or, the hardware processor is adapted to, when there is the demand on downlink transmission, configure an uplink sounding channel, a downlink sounding channel and a CQI feedback channel in the frame structure, wherein the uplink sounding channel is used by the STA to send an uplink sounding signal to the CAP, the downlink sounding channel is used by the CAP to send a downlink sounding signal to the STA, and the CQI feedback channel is used by the STA to feed back downlink CQI measured by the downlink sounding signal to the CAP; and when scheduling the downlink transmission resources according to the demand on downlink transmission, measure the uplink sounding signal on the uplink sounding channel to calculate uplink CSI, determine downlink CSI based on uplink and downlink reciprocity, and schedule the downlink transmission resources according to the downlink CSI and the downlink CQI fed back by the STA.

7. The device of claim 6, wherein, the demand on uplink transmission includes one or more of a demand on uplink service transmission, a demand on uplink signaling transmission and a demand on the feedback of a downlink service;

the uplink transmission channel includes one or more of an uplink service transmission channel, an uplink signaling channel and a downlink service feedback channel;

the demand on downlink transmission includes one or more of a demand on downlink service transmission, a demand on downlink signaling transmission and a demand on the feedback of an uplink service; and the downlink transmission channel includes one or more of a downlink service transmission channel, a downlink signaling channel and an uplink service feedback channel.

8. The device of claim 6, wherein, the hardware processor is adapted to further configure an uplink scheduling request channel in the frame structure, wherein the uplink scheduling request channel is used by the STA to send an uplink scheduling request, to request for transmission resources which are used to report to the CAP the demand on uplink transmission.

9. The device of claim 6, wherein, the hardware processor is adapted to configure a random access channel in the frame structure, and the random access channel is used by the STA to access and establish a relation with the CAP.

10. The device of claim 6, wherein,
the hardware processor is further used to configure the control channel in the frame structure, to indicate assignment and scheduling of transmission resources and the transmission format of a channel occupying the transmission resources.

\* \* \* \* \*